(12) United States Patent
Ballaguet et al.

(10) Patent No.: US 9,943,802 B1
(45) Date of Patent: Apr. 17, 2018

(54) ENHANCEMENT OF CLAUS TAIL GAS TREATMENT WITH MEMBRANE AND REDUCING STEP

(71) Applicant: Saudi Arabian Oil Company, Dhahran (SA)

(72) Inventors: Jean-Pierre R. Ballaguet, Dhahran (SA); Milind M. Vaidya, Dhahran (SA); Feras Hamad, Dhahran (SA); Sebastien A. Duval, Dhahran (SA); Iran D. Charry-Prada, Dhahran (SA)

( * ) Notice: Subject to any disclaimer, the term of this patent is extended or adjusted under 35 U.S.C. 154(b) by 0 days.

(21) Appl. No.: 15/457,338

(22) Filed: Mar. 13, 2017

(51) Int. Cl.
| | | |
|---|---|---|
| *B01D 53/22* | (2006.01) | |
| *B01D 53/40* | (2006.01) | |
| *B01D 53/48* | (2006.01) | |
| *B01D 53/52* | (2006.01) | |
| *B01D 53/62* | (2006.01) | |
| *B01D 53/74* | (2006.01) | |
| *B01D 53/75* | (2006.01) | |
| *C01B 17/04* | (2006.01) | |

(Continued)

(52) U.S. Cl.
CPC ......... *B01D 53/226* (2013.01); *B01D 53/229* (2013.01); *B01D 53/265* (2013.01); *B01D 53/52* (2013.01); *C01B 17/0456* (2013.01); *C01B 17/164* (2013.01)

(58) Field of Classification Search
CPC ...... B01D 53/22; B01D 53/229; B01D 53/40; B01D 53/48; B01D 53/52; B01D 53/62; B01D 53/526; B01D 53/74; B01D 53/75; B01D 53/76; B01D 53/8603; B01D 2257/304; B01D 2257/504; B01D 2311/00; B01D 2311/26; B01D 2311/2638; C01B 17/04; C01B 17/0404; C01B 17/0473; C01B 17/16; C01B 17/164
See application file for complete search history.

(56) References Cited

U.S. PATENT DOCUMENTS

| | | |
|---|---|---|
| 3,199,955 A | 8/1965 | Conroy et al. |
| 3,503,186 A | 3/1970 | Ward |
| 3,819,806 A | 6/1974 | Mayer et al. |

(Continued)

OTHER PUBLICATIONS

Amo et al. "Low-Quality Natural Gas Sulfur Removal/Recovery" by MTR Membrane Technology and Research, Inc.; DOE Report Contract No. DE-AC21-92MC28133—01 Jan. 29, 1998; (pp. 1-107).

(Continued)

*Primary Examiner* — Timothy C Vanoy
(74) *Attorney, Agent, or Firm* — Bracewell LLP; Constance Gall Rhebergen

(57) ABSTRACT

A method for removing sulfur-containing compounds from a sulfur recovery unit (SRU) tail gas stream includes the steps of introducing the SRU tail gas stream to a reducing unit to produce a membrane feed, the reducing unit configured to reduce the sulfur-containing compounds to hydrogen sulfide, introducing the membrane feed to a hydrogen sulfide membrane unit, the hydrogen sulfide membrane unit comprising a membrane, wherein the membrane feed comprises hydrogen sulfide, allowing the membrane feed to contact a feed side of the membrane such that hydrogen sulfide permeates through the membrane to a permeate side, and collecting the retentate gases that fail to permeate through the membrane to produce a stack feed, wherein the stack feed comprises retentate gases.

23 Claims, 11 Drawing Sheets

(51) Int. Cl.
  *C01B 17/16*   (2006.01)
  *B01D 53/26*   (2006.01)

(56)             References Cited

U.S. PATENT DOCUMENTS

| | | | |
|---|---|---|---|
| 3,928,547 | A | 12/1975 | Wilkalis et al. |
| 4,039,650 | A | 8/1977 | Daley |
| 4,117,100 | A | 9/1978 | Hellmer et al. |
| 5,002,743 | A | 3/1991 | Kokkonen et al. |
| 5,071,451 | A | 12/1991 | Wijmans |
| 5,089,033 | A | 2/1992 | Wijmans |
| 5,129,921 | A | 7/1992 | Baker et al. |
| 5,147,550 | A | 9/1992 | Wijmans et al. |
| 5,199,962 | A | 4/1993 | Wijmans |
| 5,205,843 | A | 4/1993 | Kaschemekat et al. |
| 5,256,295 | A | 10/1993 | Baker et al. |
| 5,256,296 | A | 10/1993 | Baker et al. |
| 5,306,476 | A * | 4/1994 | Jalan ............... B01D 53/228 423/220 |
| 5,374,300 | A | 12/1994 | Kaschemekat et al. |
| 5,445,669 | A | 8/1995 | Nakabayashi et al. |
| 5,558,698 | A | 9/1996 | Baker et al. |
| 5,755,855 | A | 5/1998 | Baker et al. |
| 5,851,265 | A | 12/1998 | Burmaster et al. |
| 8,524,189 | B2 | 9/2013 | Chatterjee et al. |
| 8,574,539 | B2 | 11/2013 | Schoonebeek et al. |
| 9,593,015 | B2 * | 3/2017 | Ballaguet ............... B01J 19/24 |
| 2004/0120874 | A1 | 6/2004 | Zauderer |

OTHER PUBLICATIONS

Froschauer, C., et al. "No matter of course: Ionic liquids as SO2-selective gas absorbers." (2013). pp. 30-43.

Hu, Xing-Bang, et al. "Impact of a-d-glucose pentaacetate on the selective separation of CO 2 and SO 2 in supported ionic liquid membranes." Green Chemistry 14.5 (2012): 1440-1446.

Huang, Kuan, et al. "Facilitated separation of CO 2 and SO 2 through supported liquid membranes using carboxylate-based ionic liquids." Journal of Membrane Science 471 (2014): 227-236.

Jiang, Yingying, et al. "Permeability and selectivity of sulfur dioxide and carbon dioxide in supported ionic liquid membranes." Chinese Journal of Chemical Engineering 17.4 (2009): 594-601.

Kim et al. "Separation performance of PEBAX/PEI hollow fiber composite membrane for SO 2/CO 2/N 2 mixed gas." Chemical Engineering Journal 233 (2013): 242-250.

Luis, et al. "Zero solvent emission process for sulfur dioxide recovery using a membrane contactor and ionic liquids." Journal of Membrane Science 330.1 (2009): 80-89.

Luis, et al. "Sulfur dioxide non-dispersive absorption in N, N-dimethylaniline using a ceramic membrane contactor." Journal of chemical technology and biotechnology 83.11 (2008): 1570-1577.

Shen, J-N. et al. "Preparation of a facilitated transport membrane composed of carboxymethyl chitosan and polyethylenimine for CO2/N2 separation." International journal of molecular sciences 14.2 (2013): 3621-3638.

Toy et al. "CO2 Capture Membrane Process for Power Plant Flue Gas." DOE Cooperative Agreement No. DE-NT0005313, and R. T. I. International. (2012). pp. 1-76.

Turk, B. S., et al. "Novel technologies for gaseous contaminants control." Contract DE-AC26-99FT40675 for US DOE by Research Triangle Institute, Research Triangle Park, North Carolina, Sep. (2001). (pp. 1-122).

* cited by examiner

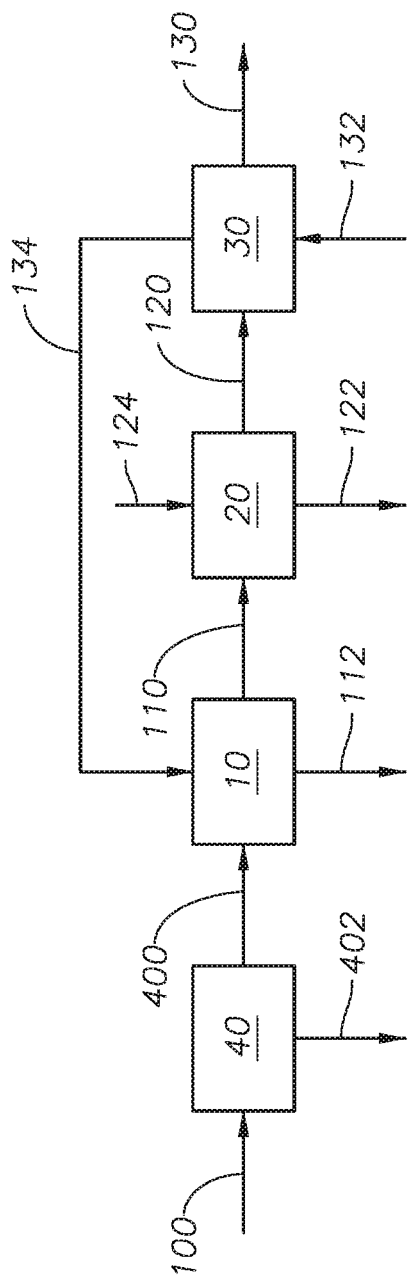
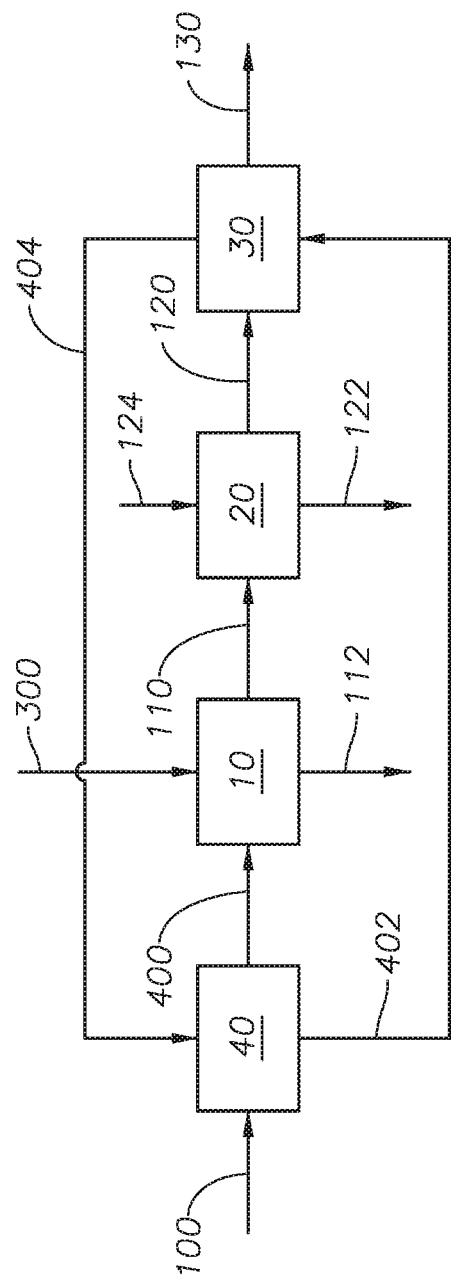

ENHANCEMENT OF CLAUS TAIL GAS TREATMENT WITH MEMBRANE AND REDUCING STEP

TECHNICAL FIELD

This invention relates to a system and method for improving sulfur recovery from a sulfur recovery unit. More specifically, this invention provides a system and method for treating acid gas streams and minimizing sulfur dioxide emissions therefrom.

BACKGROUND OF THE ART

As part of natural gas processing and hydro-treatment of oil fractions, a large amount of hydrogen sulfide ($H_2S$) is produced. The $H_2S$ is toxic and therefore is converted to elemental sulfur (S), which is a more practical and safer state for handling and transportation. With more stringent fuel regulations and increasing environmental concerns, together with the need to process sourer crude oils and natural gases, sulfur recovery has become one of the leading issues in emission reduction. Elemental sulfur is the ultimate state of recovery of the sulfur species.

The conversion of $H_2S$ into elemental sulfur is performed in a sulfur recovery unit (SRU). The level of sulfur recovery is increasingly emphasized as the need to minimize the amount of sulfur compounds released to atmosphere from the recovery unit needs to be reduced in order to meet the mandated legal limits. The most common conversion process, for this conversion, is known as the modified Claus treatment process or alternately the Claus unit or modified Claus unit.

The modified Claus treatment process is a combination of thermal and catalytic processes that are used for converting gaseous $H_2S$ into elemental sulfur.

Claus unit feed gases have a wide range of compositions. Most of the feed gases originate from absorption processes using various solvents (amine, physical or hybrid solvents) to extract hydrogen sulfide from the by-product gases of petroleum refining, natural gas processing, and also tar sands, coal gasification and other industries. The other gas plant or refinery source of $H_2S$ is the sour water stripper unit.

The first process is a thermal process (that is, in the absence of catalyst) in a reaction furnace. The feed gas to the Claus unit is burned in the reaction furnace using sufficient combustion air, or oxygen enriched air to burn a stoichiometric one-third of the contained $H_2S$. The reaction furnace pressure is maintained at about 1.5 bars (35-70 kPa above atmospheric pressure) and the temperature is maintained at about 900-1,350° C. in a "no-preheat" operation case. The $H_2S$ from the feed gas is thermally converted into elemental sulfur, along with sulfur dioxide ($SO_2$). Sulfur yield is typically around 65%-72% depending on the operation mode of the SRU. Increasing the elemental sulfur yield in the reaction furnace and subsequently the condenser is advantageous as it reduces the later load on the catalytic reactors. The reaction furnace operation is designed to maximize sulfur recovery in consideration of the feed composition, by adjusting air/oxygen feed, reaction temperature, pressure, and residence time. In addition, the reaction furnace can destroy contaminants, such as hydrocarbons, that are present in the feed gas stream. Such contaminants pose problems for the catalytic reactors through the development of carbon-sulfur compounds that can lead to plugging or deactivation of the catalyst beds.

The hot reaction product gas from the reaction furnace, containing sulfur vapor, can be used to produce high pressure steam in a waste heat boiler, which also results in cooling the product gas. The product gas is then further cooled and condensed in a heat exchanger, while producing additional low pressure steam. The condensed liquid sulfur is separated from the remaining unreacted gas in the outlet end of the condenser and sent to a sulfur pit or other collection area.

The separated gas then enters the catalytic process of the Claus unit. The catalytic process contains between two and three catalytic reactors. Following the sulfur condenser, the separated gas is reheated and enters the first catalytic reactor, which is maintained at an average temperature of about 305° C. In the first catalytic reaction about 20% of the $H_2S$ in the feed gas is converted into elemental sulfur through a reaction with the $SO_2$. The temperature is limited by the exit temperature to avoid catalytic bed damages and thermodynamic considerations. The outlet product gas from the first catalytic reactor is cooled, in a second condenser, which can also produce steam. Again, the condensed liquid sulfur is separated from the remaining unreacted gas in the outlet end of the second condenser and sent to sulfur storage. The separated gas from the second condenser is sent to another re-heater and the sequence of gas reheat, catalytic reaction, condensation and separation of liquid sulfur from unreacted gas is repeated for the second and third catalytic reactors at successively lower reactor temperatures. About 5% and 3% of the $H_2S$ in the feed gas are converted into elemental sulfur respectively in the second reactor and third reactors.

Finally, the gas stream is released to atmosphere via a stack after passing through an incinerator which oxidizes any remaining sulfur species into $SO_2$. In addition, the flue gas compounds include water, nitrogen, oxygen, sulfide dioxide and eventually carbon dioxide. The eventual presence of carbon dioxide results from the acid gas composition ($CO_2$ and $H_2S$ are recovered from natural gas during a sweetening process, such as an amine process). Incinerator temperature and gas temperature in the refractory lined stack are high enough (far above gas dew point) to avoid corrosion and help with quick $SO_2$ dissemination in the surrounding air. Moreover, the stack is designed to make sure $SO_2$ concentration at ground level is below the local regulatory limit.

For a well-designed and well-operated Claus sulfur recovery plant having three catalytic reactors, an overall sulfur conversion of 96-98% can be achieved depending on the feed gas composition. To achieve higher conversion, a tail gas treatment unit must be added to further process the exhaust gas upstream of or as an alternative to an incinerator. Tail gas treatment units are polishing units. Currently available tail gas treatment units can be effective at achieving up to 99.2% recovery, but can add significant capital cost to the Claus treatment unit, often on the same order of magnitude as the Claus unit itself.

Tail gas treatment technologies that have been developed include, but are not limited to, the Scot® process, Highsulf™, BSR/MDEA™, Sultimate™, Bechtel TGTU, and Technip TGTU. The choice of tail gas treatment unit installed depends on the conversion targeted as cost is directly linked to the required conversion level. While the Scot process can reach 99.9% sulfur recovery, the added cost and unit complexity makes this process unfeasible when the Claus feed is not highly concentrated with hydrogen sulfide, e.g., unless greater than 55%. In addition to increase operating and capital costs, these technologies can require significant physical footprint for the various process vessels, columns, pumps, and storage vessels necessary for operation.

Therefore, a process which minimizes $SO_2$ being released to atmosphere without requiring excessive amounts of energy, equipment and materials, or process shutdown is desired. Preferably, such a process, would maintain the overall sulfur capacity of the Claus unit, while increasing the overall sulfur recovery efficiency.

SUMMARY

This invention relates to a system and method for improving sulfur recovery from a sulfur recovery unit. More specifically, this invention provides a system and method for treating acid gas streams and minimizing sulfur dioxide emissions therefrom.

In one aspect of the present invention, a method for removing sulfur-containing compounds from a sulfur recovery unit (SRU) tail gas stream is provided. The method includes the steps of introducing the SRU tail gas stream to a reducing unit to produce a membrane feed, the reducing unit is configured to reduce the sulfur-containing compounds to hydrogen sulfide, introducing the membrane feed to a hydrogen sulfide membrane unit, the hydrogen sulfide membrane unit includes a membrane, the membrane feed includes hydrogen sulfide, allowing the membrane feed to contact a feed side of the membrane such that hydrogen sulfide permeates through the membrane to a permeate side, collecting the retentate gases that fail to permeate through the membrane to produce a stack feed, wherein the stack feed includes retentate gases.

In certain aspects, the membrane is selected from the group consisting of a hydrogen sulfide-selective membrane and an acid gas-selective membrane. In certain aspects, the step of introducing the SRU tail gas stream to a reducing unit to produce a membrane feed, further includes the steps of introducing the SRU tail gas stream to a reduction reactor of the reducing unit, introducing a reducing agent to the reduction reactor, allowing the sulfur-containing compounds to react with the reducing agent in reduction reactions to produce a reduced stream, wherein the reduction reactions reduce the sulfur-containing compounds to hydrogen sulfide, wherein the reduced stream includes non-condensing gases and water vapor, introducing the reduced stream to a reduction separator, and separating the non-condensing gases from the water vapor in the reduction separator to produce the membrane feed and a waste water stream, wherein the membrane feed includes the non-condensed gases, the non-condensed gases include hydrogen sulfide, and the waste water stream includes condensed water. In certain aspects, the method further includes the steps of supplying a sweep air feed to the permeate side of the membrane, collecting the hydrogen sulfide that permeates the membrane in the sweep air feed to produce a hydrogen sulfide enriched air, and introducing the hydrogen sulfide enriched air to a sulfur recovery unit, the sulfur recovery unit configured to produce the SRU tail stream. In certain aspects, the method further includes the steps of introducing an acid gas feed to an enrichment unit, where the acid gas feed includes hydrogen sulfide and carbon dioxide, allowing the hydrogen sulfide to separate from the carbon dioxide to produce an enriched feed and a carbon dioxide rich stream, wherein the enriched feed includes hydrogen sulfide, wherein the carbon dioxide rich stream includes carbon dioxide, and introducing the enriched feed to the sulfur recovery unit. In certain aspects, the method further includes the steps of introducing an acid gas feed to an enrichment unit, where the acid gas feed includes hydrogen sulfide and carbon dioxide, introducing a membrane recycle to the enrichment unit, where the membrane recycle includes hydrogen sulfide and carbon dioxide, allowing the hydrogen sulfide to separate from the carbon dioxide in the enrichment unit to produce an enriched feed and a carbon dioxide rich stream, where the enriched feed includes hydrogen sulfide and the carbon dioxide rich stream includes carbon dioxide, supplying the carbon dioxide rich stream to the permeate side of the membrane of hydrogen sulfide membrane unit, collecting the hydrogen sulfide that permeates through the membrane to the permeate side in the carbon dioxide rich stream to produce the membrane recycle, and introducing the enriched feed to a sulfur recovery unit, the sulfur recovery unit configured to produce the SRU tail gas stream. In certain aspects, the method further includes the steps of forming a hydrogen sulfide recycle stream from the hydrogen sulfide that permeates the membrane of the hydrogen sulfide membrane unit, where the hydrogen sulfide recycle stream includes hydrogen sulfide. In certain aspects, the method further includes the steps of mixing the hydrogen sulfide recycle stream with an air feed to form a diluted recycle stream, where the diluted recycle stream includes hydrogen sulfide and air, and introducing the diluted recycle stream to a sulfur recovery unit configured to produce the SRU tail gas stream. In certain aspects, the method further includes the steps of introducing the hydrogen sulfide recycle stream to an enrichment unit, introducing an acid gas feed to the enrichment unit, where the acid gas feed includes hydrogen sulfide and carbon dioxide, allowing the hydrogen sulfide to separate from the carbon dioxide in the enrichment unit to produce an enriched feed and a carbon dioxide rich stream, where the enriched feed includes hydrogen sulfide and the carbon dioxide rich stream includes carbon dioxide, and introducing the enriched feed to a sulfur recovery unit configured to produce the SRU tail gas stream. In certain aspects the method further includes the steps of mixing the hydrogen sulfide recycle stream with an acid gas feed to produce a mixed feed, wherein the mixed feed includes hydrogen sulfide and carbon dioxide, and introducing the mixed feed to an enrichment unit, and allowing the hydrogen sulfide to separate from the carbon dioxide in the enrichment unit to produce an enriched feed and a carbon dioxide rich stream, where the enriched feed includes hydrogen sulfide and where the carbon dioxide rich stream includes carbon dioxide. In certain aspects the method further includes the steps of introducing an acid gas feed to an enrichment unit, where the acid gas feed includes hydrogen sulfide and carbon dioxide, allowing the hydrogen sulfide to separate from the carbon dioxide in the enrichment unit to produce an enriched feed and carbon dioxide rich stream, where the enriched feed includes hydrogen sulfide, where the carbon dioxide rich stream includes carbon dioxide, mixing the hydrogen sulfide recycle stream with the enriched feed to produce a mixed enriched feed, and introducing the mixed enriched feed to a sulfur recovery unit configured to produce the SRU tail gas stream. In certain aspects the method further includes the steps of introducing an acid gas feed to a carbon dioxide membrane unit, the carbon dioxide membrane unit includes a carbon dioxide-selective membrane, where the acid gas feed includes carbon dioxide and hydrogen sulfide, allowing the acid gas feed to contact a feed side of the carbon dioxide-selective membrane such that carbon dioxide permeates through the carbon dioxide-selective membrane to a permeate side, collecting the carbon dioxide that permeates the carbon dioxide-selective membrane to form a carbon dioxide permeate, where the carbon dioxide permeate includes carbon dioxide and hydrogen sulfide, collecting feed gases that fail to permeate the carbon dioxide-selective membrane to form a hydrogen sulfide retentate, where the hydrogen sulfide retentate includes hydrogen sulfide, introducing the carbon dioxide permeate to an enrichment unit, allowing the hydrogen sulfide to separate from the carbon dioxide in the enrichment unit to produce an enriched feed and carbon dioxide rich stream, where the enriched feed includes hydrogen sulfide, where the carbon dioxide rich stream includes carbon dioxide, mixing the hydrogen sulfide recycle stream, the enriched feed and the hydrogen sulfide retentate to produce a hydrogen sulfide rich feed, and introducing the hydrogen sulfide rich feed to a sulfur recovery unit configured to produce the SRU tail gas stream. In certain aspects the method further includes the steps of mixing the hydrogen sulfide recycle stream and an acid gas feed to produce a mixed feed, where the mixed feed includes hydrogen sulfide and carbon dioxide, introducing the mixed feed to a carbon dioxide membrane unit, the carbon dioxide membrane unit includes a carbon dioxide-selective membrane, allowing the acid gas feed to contact a feed side of the carbon dioxide-selective membrane such that carbon dioxide permeates through the carbon dioxide-selective membrane to a permeate side, collecting the carbon dioxide that permeates the carbon dioxide-selective membrane to form a carbon dioxide permeate, collecting feed gases that fail to permeate the carbon dioxide-selective membrane to form a hydrogen sulfide retentate, where the hydrogen sulfide retentate includes hydrogen sulfide, introducing the carbon dioxide permeate to an enrichment unit to produce an enriched feed and a carbon dioxide rich stream, where the enriched feed includes hydrogen sulfide and where the carbon dioxide rich stream includes carbon dioxide, mixing the enriched feed and the hydrogen sulfide retentate to produce a combined feed, and introducing the combined feed to a sulfur recovery unit, the sulfur recovery unit configured to produce the SRU tail gas stream.

In a second aspect a method for removing sulfur-containing compounds from a sulfur recovery unit (SRU) tail gas stream is provided. The method includes the steps of introducing the SRU tail gas stream to a reducing unit to produce a membrane feed, the reducing unit configured to reduce the sulfur-containing compounds to hydrogen sulfide, introducing the membrane feed to an acid gas membrane unit to produce an acid gas retentate, the acid gas membrane unit includes an acid gas-selective membrane, allowing the membrane feed to contact the acid gas-selective membrane such that acid gases permeate the acid gas-selective membrane to a permeate side, supplying a steam feed to the permeate side of the acid gas-selective membrane, wherein the steam feed includes a low pressure de-aerated steam, collecting the acid gases that permeate the acid gas-selective membrane in the steam feed to produce an acid gas permeate, wherein the acid gas permeate includes acid gases and water vapor, collecting the retentate gases that fail to permeate the membrane in an acid gas retentate, where the acid gas retentate includes the retentate gases, introducing the acid gas permeate to a water condenser, the water condenser configured to separate water vapor from the acid gases, allowing the water vapor to condense in the water condenser to produce a sour water stream and an acid gas rich stream, wherein the sour water stream includes condensed water and the acid gas rich stream includes acid gases, wherein the acid gases include carbon dioxide and hydrogen sulfide, introducing the acid gas rich stream to an enrichment unit, allowing the hydrogen sulfide to separate from the carbon dioxide in the enrichment unit to produce an enriched feed and a carbon dioxide rich stream, where the enriched feed includes hydrogen sulfide, where the carbon dioxide rich stream includes carbon dioxide, introducing the enriched feed to a sulfur recovery unit configured to produce the SRU tail gas stream.

In certain aspects the method further includes the steps of introducing the acid gas retentate to a feed side of a hydrogen sulfide membrane unit, the hydrogen sulfide membrane unit includes a membrane, allowing the acid gas retentate to contact the membrane such that hydrogen sulfide permeates the membrane to a permeate side, supplying a sweep air feed to the permeate side of the membrane, collecting the hydrogen sulfide that permeates membrane in the sweep air feed to produce a sulfur recovery unit feed, and introducing the sulfur recovery unit feed to the sulfur recovery unit.

In a third aspect an apparatus to remove sulfur-containing compounds from a sulfur recovery unit tail gas stream is provided. The apparatus includes a reducing unit configured to reduce the sulfur-containing compounds to hydrogen sulfide to produce a membrane feed, and a hydrogen sulfide membrane unit fluidly connected to the reducing unit, the hydrogen sulfide membrane unit includes a membrane, wherein the membrane feed contacts a feed side of the membrane such that hydrogen sulfide present in the membrane feed permeates through the membrane to a permeate side, wherein the retentate gases that fail to permeate the membrane exit the hydrogen sulfide membrane unit as a stack feed.

In certain aspects, the reducing unit includes a reduction reactor configured to react sulfur-containing compounds present in the SRU tail gas stream and a reducing agent to produce a reduced stream, where the reduced stream includes hydrogen sulfide and water vapor and a reduction separator, the reduction separator configured to condense the water vapor in the reduced stream to produce a waste water stream and the membrane feed. In certain aspects, an enrichment unit fluidly connected to a sulfur recovery unit, the enrichment unit configured to produce an enriched feed, and the sulfur recovery unit, the sulfur recovery unit fluidly connected to the reducing unit, the sulfur recovery unit configured to produce the SRU tail gas stream.

In certain aspects the apparatus further includes a carbon dioxide membrane unit in fluid communication with the enrichment unit, the carbon dioxide membrane unit includes a carbon dioxide-selective membrane, the carbon dioxide membrane unit configured to produce a carbon dioxide permeate and a hydrogen sulfide retentate.

In a fourth aspect, an apparatus to remove sulfur-containing compounds from a sulfur recovery unit tail gas stream is provided. The apparatus including a reducing unit configured to reduce the sulfur-containing compounds to hydrogen sulfide to produce a membrane feed, and an acid gas membrane unit fluidly connected to the reducing unit, the acid gas membrane unit includes an acid gas-selective membrane, wherein the membrane feed contacts a feed side of the acid gas-selective membrane such that acid gases permeate through the acid gas-selective membrane to a permeate side, where the retentate gases that fail to permeate the acid gas-selective membrane exit the acid gas membrane unit as an acid gas retentate.

In certain aspects, the apparatus further includes an enrichment unit fluidly connected to a sulfur recovery unit, the enrichment unit configured to produce an enriched feed, and the sulfur recovery unit, the sulfur recovery unit fluidly connected to the reducing unit, the sulfur recovery unit configured to produce the SRU tail gas stream. In certain aspects, the apparatus further includes a carbon dioxide membrane unit in fluid communication with the enrichment unit, the carbon dioxide membrane unit includes a carbon dioxide-selective membrane, the carbon dioxide membrane unit configured to produce a carbon dioxide permeate and a hydrogen sulfide retentate. In certain aspects the apparatus further includes a hydrogen sulfide membrane unit fluidly connected to the acid gas membrane unit, the hydrogen sulfide membrane unit includes a membrane, wherein the acid gas retentate contacts a feed side of the membrane such that hydrogen sulfide permeates through the membrane to a permeate side, wherein the retentate gases that fail to permeate the membrane exit the hydrogen sulfide membrane as a stack feed.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

FIG. 4 is a process flow diagram of an embodiment of the method to recover sulfur.

FIG. 5 is a process flow diagram of an embodiment of the method to recover sulfur.

DETAILED DESCRIPTION

Figure 1:
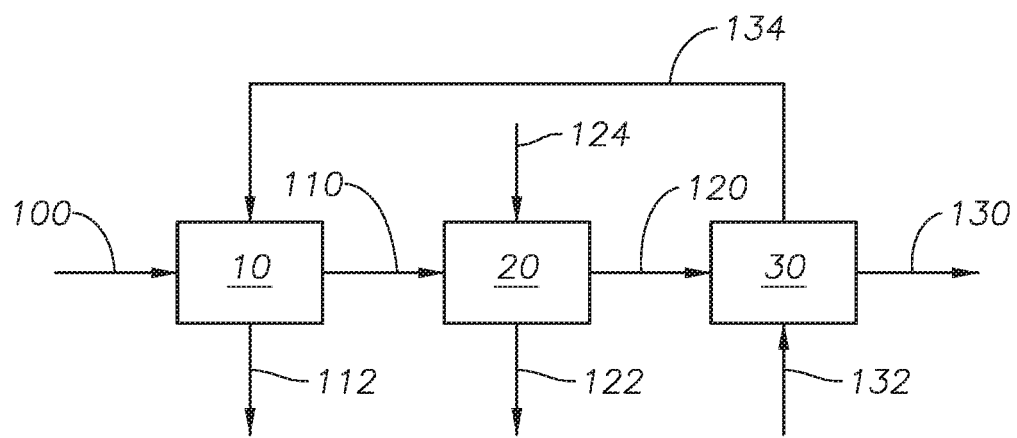
FIG. 1 is a process flow diagram of the method to recover sulfur.

While the invention will be described with several embodiments, it is understood that one of ordinary skill in the relevant art will appreciate that many examples, variations and alterations to the apparatus and methods described herein are within the scope and spirit of the invention. Accordingly, the exemplary embodiments of the invention described herein are set forth without any loss of generality, and without imposing limitations, on the claimed invention.

As used herein, "sulfur-containing compounds" refers to compounds that contain sulfur that can be products or reactants in the reactions of the sulfur recovery unit. Sulfur-containing compounds does not include hydrogen sulfide as the presence of those compounds can be called out separately. The term sulfur-containing compounds is meant to be a catchall for sulfur containing-compounds, other than hydrogen sulfide. Examples of sulfur-containing compounds include, but are not limited to, sulfur dioxide, carbonyl sulfur, carbon disulfide, and combinations of the same.

As used here, "allowable sulfur dioxide emission limit" refers to a rate of release of sulfur dioxide into the atmosphere. The rate of release can be mandated by federal, state, or local agencies.

As used here, "air" refers to the collective gases that constitute earth's atmosphere. Air contains nitrogen, oxygen, argon, carbon dioxide, and water vapor. Unless otherwise indicated, oxygen-enriched air is considered air with an oxygen content of greater than 21% by volume on a dry basis. Unless otherwise indicated, the use of the term air includes all of the gases listed.

As used here, "overall recovery of sulfur" or "sulfur recovery" refers to the percentage of sulfur removed based on the amount of sulfur present in the acid gas feed stream. A recovery of 99.0% means that 99.0% of the sulfur in the acid gas feed stream is recovered as part of the recovered sulfur stream.

As used here, "permeate," as a verb means to spread through or flow through or pass through a membrane of a membrane unit. As an example, liquids and gases can permeate a membrane. As a noun, permeate can refer to the liquids and gases that have permeated the membrane of a membrane unit.

As used here, "Claus catalytic stage" refers to the combination of a reheater, catalytic reactor, and condenser. The feed to the Claus catalytic stage is heated in the reheater to ensure the temperature is above the condensation point of sulfur. The heated stream is then fed to the catalytic reactor, where a Claus catalytic reaction to produce elemental sulfur from hydrogen sulfide and sulfur dioxide occurs over a catalyst. The product from the Claus catalytic reaction is introduced to a condenser, where the elemental sulfur is condensed and separated from the stream as liquid sulfur.

"As used here, "sweep" as used herein refers to a gas stream that passes continuously by a membrane, such that the permeate does not sit statically against the permeate side of the membrane, but is collected by the gas stream, the sweep can provide the driving force for the separation.

As used here, "reducing," "reduction," or "reduction reactions" refers to a chemical reaction where a reactant gains electrons through the gain of a hydrogen atom.

The apparatus and methods described here describe the conversion of sulfur-containing compounds in a tail gas stream from a sulfur recovery unit to hydrogen sulfide, the separation of the hydrogen sulfide in a hydrogen sulfide-selective membrane, and the recycle of the hydrogen sulfide to the inlet of the sulfur recovery unit. The conversion of sulfur-containing compounds can be achieved by reducing the sulfur-containing compounds. A sweep air feed can be supplied to sweep the permeate side of the hydrogen sulfide-selective membrane prior to being supplied to the reaction furnace of the sulfur recovery unit, and in doing so the sweep air feed becomes a hydrogen sulfide enriched air feed to the reaction furnace. The sweep air lowers the hydrogen sulfide concentration on the permeate side of the membrane, thereby causing more hydrogen sulfide to be drawn into the membrane from the membrane feed and sent, along with the sweep air feed, to the sulfur recovery unit. With the sweep air feed, the hydrogen sulfide concentration on the permeate side is lower than the hydrogen sulfide on the feed side of the membrane.

The sweep air and the hydrogen sulfide enriched air feed recovers a fraction of the sulfur-containing compounds that would otherwise have been released to the atmosphere through an incinerator stack, and by recovering the sulfur-containing compounds and directing the hydrogen sulfide enriched air feed to the sulfur recovery unit. The process provides controlled slippage of sulfur-containing compounds to the atmosphere from an incinerator in order to meet environmental regulations or other process targets. In at least one embodiment, the use of the reducing unit in series with the hydrogen sulfide-selective membrane minimizes sulfur-containing compounds from the sulfur recovery system. In one embodiment, the membrane recovers hydrogen sulfide from the tail gas of the reducing unit before the tail gas is fed to an incinerator. The recovered hydrogen sulfide is collected by sweeping the permeate side with an air stream, which creates a hydrogen sulfide rich air stream. In at least one embodiment, the hydrogen sulfide rich air stream can be fed to the reaction furnace of the Claus process, along with a raw air feed, and an acid gas stream. In at least one embodiment, the use of the hydrogen sulfide-selective membrane improves the Claus unit operability and efficiency to maximize elemental sulfur recovery and minimizes emissions of sulfur-containing compounds from an incinerator. In at least one embodiment, the hydrogen sulfide-selective membrane and reducing unit can be retrofitted to an existing Claus unit or modified Claus process, regardless of the Claus unit and tail gas treatment unit.

Advantageously, the sulfur recovery system can improve the capability of a sulfur recovery unit and can reduce the costs to build and operate, thereby improving the overall economics of a sulfur recovery system.

The use of the hydrogen sulfide-selective membrane is based upon gas component separation with membranes that exhibit durable high $H_2S/CO_2$ and $H_2S/N_2$ selectivity. These selective membranes minimize recirculation of inert gases potentially present in the flue gas, such as $CO_2$ and $N_2$. The hydrogen sulfide-selective membrane produces a hydrogen sulfide-concentrated permeate fraction, which can be fed to the reaction furnace of the Claus unit along with the air supply. The hydrogen sulfide-selective membrane also produces an hydrogen sulfide-depleted residue (retentate) fraction, which can be fed to the incinerator.

In addition to hydrogen sulfide-selective membranes, the sulfur recovery system can include carbon dioxide-selective membranes and acid gas-selective membranes. Membrane performance is characterized by membrane permeability and is dictated by flux and selectivity for a specific gas molecule. Separation is dependent on the physicochemical interaction of gases with the polymeric membrane. Permeance is expressed in gas permeation units (GPU) and permeability is expressed in Barrer. Examples of membranes include membranes made from polydimethylsiloxane (PDMS), polyphosphazenes, PEBAX® (polyether block amide), polyamide-polyether block copolymers, cellulose acetate, cellulose acetate impregnated with TEG-DME, cellulose diacetate, cellulose triacetate, Nafion® 117, Nafion® 115, Nafion® 1110, Nafion® dispersion grades (including D520 D521 D1020 D1021 D2020 D2021), rubbery Nafion®, sulfonated polyimides, sulfonated polymers, supported ionic liquid membranes (SILMs), polycarbonate, membrane contactors, polyethylene glycol (PEG), polyacrylate, sulfolane, polytrimethylsilyl methyl methacrylate (PTMSMMA), and 3-methylsulfolane blend membranes. Membranes in the sulfur recovery system can include facilitated transport membranes. Properties of membranes are shown in Table 1.

TABLE 1

Properties of Membranes for H2S/CO2, CO2/H2S and CO2/N2 selectivity

| Membrane Material | $CO_2$ permeability (Barrer) | $H_2S$ permeability (Barrer) | N2 permeability (Barrer) | $CO_2/H_2S$ Selectivity | $H_2S/CO_2$ Selectivity | CO2/N2 Selectivity |
|---|---|---|---|---|---|---|
| PDMS | 3,200 | 5080 | 400 | 0.63 | 1.6 | 8 |
| Pebax Type Membranes | | | | | | |
| Pebax ® 1657 | 69 | 255 | 1.53 | 0.27 | 3.7 | 45 |
| Pebax ® 1074 | 122 | 561 | — | 0.22 | 4.6 | — |
| Pebax ® 4011 | 140 | 31 | 2.02 | 0.22 | 4.6 | 69 |
| Pebax ® 4011 (pure gas data) | 1750 | 180 | — | 0.1028 | 9.5 | — |
| DuPont ™ 9918 | 28 | 3.5 | — | 8 | 0.125 | — |
| Teflon ® AF1600 | 580 | 85 | — | 6.8 | 0.147 | — |
| Teflon ® AF2400 | 2,300 | 383 | — | 6 | 0.17 | — |
| Cytop | 17 | 459 | — | 0.037 | 27 | — |
| Polyphosphazene 1 | 7.5 | 14.1 | — | 0.53 | 1.89 | — |
| Polyphosphazene 2 | 152.3 | 587.6 | — | 0.26 | 3.85 | — |
| Polyphosphazene 3 | 250 | 1130 | 4 | 0.22 | 4.6 | 62.5 |
| BMImBF4 (Ionic Liquid Membrane) | ~6 | ~800 | — | 0.0075 | 133 | — |
| ILM (Immobilized Liquid Membrane) 2M K3PO4 | 1000 | 33,0000 | — | — | 330 | — |
| Facilitated Transport Membranes | | | | | | |
| Poly(vinylbenzyltrimethylammonium chloride), PVBTAF | — | — | — | 0.0925 | 10.8 | 835 |
| Swollen chitosan membranes @ 110° C. | 483 | — | 1.93 | — | — | 250 |

TABLE 1-continued

Properties of Membranes for H2S/CO2, CO2/H2S and CO2/N2 selectivity

| Membrane Material | CO$_2$ permeability (Barrer) | H$_2$S permeability (Barrer) | N2 permeability (Barrer) | CO$_2$/H$_2$S Selectivity | H$_2$S/CO$_2$ Selectivity | CO2/N2 Selectivity |
|---|---|---|---|---|---|---|
| Swollen chitosan membranes with Arginine salt @ 150° C. | 1282 | — | 2.48 | — | — | 516 |
| Hydrogel films of a crosslinked, vinyl alcohol/acrylic acid salt copolymer impregnated with an aqueous carrier solution @ 25° C. | — | — | — | — | — | 1859 to 143 with different ligands |
| Formaldehyde crosslinked polyvinyl alcohol with polyallyl amine with 2-Aminoisobutyric acid (AIBA) potassium salt (AIBA·K) as CO2 carriers | — | — | — | — | — | 200 |
| Carboxymethyl Chitosan and Polyethylenimine @ 160° C. | — | — | — | — | — | 325 |
| polyethylenimine/ poly(vinyl alcohol) blend membrane @ 140° C. | — | — | — | — | — | 160 |

Ionic liquid membranes are membranes that are doped with liquid ionic compounds (LICs). Preferably, the liquid ionic compounds have non-nucleophilic anions, such non-nucleophilic anions increase the hydrogen sulfide content in the permeate by preferential solubility, permeability and selectivity of the components in the LICs. The use of LICs as the membranes takes advantage of low vapor pressure avoiding the loss of the liquids due to evaporation from the pores of the membrane and the preferential solubility of hydrogen sulfide in ionic liquids. Exemplary SILM membranes include membranes impregnated with carboxylate-based ILs (including mono-carboxylates and dicarboxylates), membranes impregnated with 1-butyl-3-methylimidazolium 2-formylbenzenesulfonate (BMIM OFBS), membranes impregnated with 1-allyl-3-methylimidazolium 2-formylbenzenesulfonate (AMIM OFBS), [N222] [dimalonate] IL supported on polyethersulfone (PES), and [emim][BF4] IL supported on polyethersulfone (PES).

One of skill in the art will appreciate that the size, permeability, and selectivity of membranes are design features based on the requirements of the system. While in general the larger the surface area, the greater the recovery, there is a tipping point at which the economics make it unfeasible to increase the surface area of the membrane. The type of membrane selected is in consideration of the desired permeability and selectivity of the membrane, the acid gas feed composition, and the available air for sweeping.

Referring to FIG. 1 a sulfur recovery system is provided. Acid gas feed 100 and hydrogen sulfide enriched air feed 134 are introduced to sulfur recovery unit 10. Acid gas feed 100 can be any source of acid gas or sour gas, containing H$_2$S, CO$_2$, and combinations thereof. In certain embodiments, acid gas feed 100 can include H$_2$O. Acid gas feed 100 can contain H$_2$S concentration in an amount greater than 1 percent (%) by weight on a dry basis, alternately 10% by weight on a dry basis, alternately 25% by weight on a dry basis, alternately greater than 40% by weight on a dry basis, alternately greater than 55% by weight on a dry basis, alternately greater than 70% by weight on a dry basis, greater than 75% by weight on a dry basis, alternately greater than 80% by weight on a dry basis, and alternately greater than 99% by weight on a dry basis. As used herein "on a dry basis" means as calculated without water or water vapor.

Sulfur recovery unit 10 can be a conventional Claus process or a modified Claus process or any known process for recovering elemental sulfur from H$_2$S. In some embodiments, sulfur recovery unit 10 can be operated in straight mode, in which acid gas feed 100 is fed entirely to a reaction furnace (not shown) of sulfur recovery unit 10. In at least one embodiment, acid gas feed 100 has a H$_2$S concentration of between 50% by weight on a dry basis and 100% by weight on a dry basis and sulfur recovery unit 10 can be operated in straight mode. In some embodiments, sulfur recovery unit 10 can be operated in split mode, in which, with reference to FIG. 2, acid gas feed 100 can be split into furnace feed 200 and split feed 202. Furnace feed 200 can be fed to the reaction furnace (not shown) of thermal unit 12 and split feed 202 can be fed to condenser 14. Thermal unit 12 can include the reaction furnace and a waste heat boiler (not shown), condenser 14, and catalytic unit 16. Acid gas feed 100 can be split by any splitting means known in the art, such as a tee fitting or valves. In at least one embodiment, acid gas feed 100 has a H$_2$S concentration of between 20% by weight on a dry basis and 50% by weight on a dry basis and sulfur recovery unit 10 can be operated in split mode. In at least one embodiment, acid gas feed 100 has a H$_2$S concentration between 10 wt % and 20% and sulfur recovery unit 10 can be operated in split mode with a pre-heating stage (not shown) upstream of sulfur recovery unit 10 to pre-heat furnace feed 100 and split feed 202.

Referring to FIG. 1, sulfur recovery unit 10 produces recovered sulfur stream 112 and sulfur recovery unit (SRU) tail stream 110. Recovered sulfur stream 112 is a liquid stream of elemental sulfur sent to storage or a sulfur pit for further use or processing. Without being bound to a particular theory, it is believed that the stable form of sulfur that can be separated as a liquid from the process is $S_8$. SRU tail stream 110 can include unreacted hydrogen sulfide, sulfur-containing compounds, $CO_2$, air, and combinations thereof. SRU tail stream 110 can be fed to reducing unit 20 along with reducing agent 124.

Figure 1A:
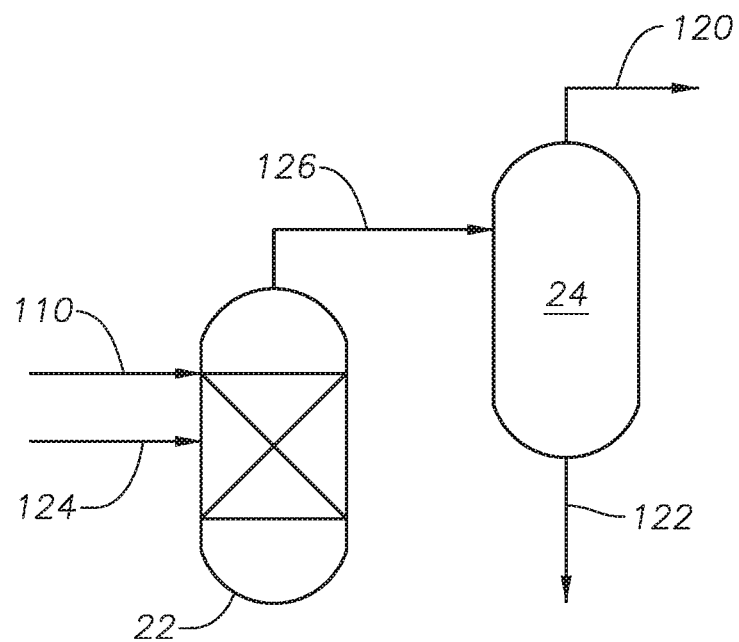
FIG. 1a is a detail process flow diagram of an embodiment of reducing unit 20.

Reducing unit 20 can be any system capable of reducing the sulfur-containing compounds to hydrogen sulfide. With reference to FIG. 1a an embodiment of reducing unit 20 is provided. SRU tail stream 110 and reducing agent 124 can be introduced to reduction reactor 22 to produce reduced stream 126. Reduction reactor 22 can be any type of reactor in which a reduction reaction can occur to reduce the sulfur-containing compounds to hydrogen sulfide. In at least one embodiment, the conversion rate of sulfur-containing compounds to hydrogen sulfide is equal to or greater than 95%, alternately equal to or greater than 99%, alternately equal to or greater than 99.5%, alternately equal to or greater than 99.9%, alternately equal to or greater than 99.99%, and alternately 100%. In at least one embodiment, reduction reactor 22 is a hydrogenation reactor. Reduction reactor 22 can include a catalyst. Reducing agent 124 can be any gas stream containing hydrogen. Examples of reducing agent 124 can include a stream of hydrogen gas and a stream of fuel gas.

Reduced stream 126 can include hydrogen sulfide, water vapor, $CO_2$, air, and combinations thereof. In at least one embodiment, reduced stream 126 can include trace amounts of sulfur-containing compounds. Reduced stream 126 can be fed to reduction separator 24.

Reduction separator 24 is any type of separation device capable of condensing water vapor present in reduced stream 126 as liquid water in order to remove a portion of water present in reduced stream 126 to produce waste water 122 and membrane feed 120. Examples of the reduction separator can include a vapor-liquid separator, a flash drum, a knock-out pot, knock-out drum, and a quench tower. Waste water 122 contains the water condensed in reduction separator 24. In at least one embodiment, waste water 122 can include impurities or entrained gases. Waste water 122 can be sent to be further processed or collected for storage. Membrane feed 120 contains those gases that do not condense in reduction separator 24. Membrane feed 120 can be fed to the feed side of hydrogen sulfide membrane 30. Membrane feed 120 can include hydrogen sulfide, $CO_2$, air, and combinations thereof. In at least one embodiment, membrane feed 120 can include the portion of water vapor not condensed in reduction separator 24. In at least one embodiment, membrane feed 120 can include trace amounts of sulfur-containing compounds.

Hydrogen sulfide membrane 30 is any membrane unit capable of separating hydrogen sulfide from membrane feed 120. The membrane in hydrogen sulfide membrane 30 can be any membrane able to separate one or more gases from a feed mixture generating a permeate containing a specific gas enriched stream. In at least one embodiment, hydrogen sulfide membrane 30 can include a hydrogen sulfide-selective membrane that can separate hydrogen sulfide from a feed mixture generating a permeate containing a hydrogen sulfide enriched stream. In at least one embodiment, hydrogen sulfide membrane 30 can include an acid gas-selective membrane that can separate hydrogen sulfide and carbon dioxide from a feed mixture generating a permeate containing hydrogen sulfide and carbon dioxide.

Membrane feed 120 contacts the feed side of the membrane of hydrogen sulfide membrane 30. In at least one embodiment, hydrogen sulfide present in membrane feed 120 permeates through a hydrogen sulfide-selective membrane of hydrogen sulfide membrane 30 to the permeate side of the membrane. In at least one embodiment, hydrogen sulfide and carbon dioxide present in membrane feed 120 permeate through an acid gas-selective membrane of hydrogen sulfide membrane 30 to the permeate side of the membrane. The gases on the permeate side of the membrane are collected in sweep air feed 132 to produce hydrogen sulfide enriched air 134.

Sweep air feed 132 is any source of air, oxygen, or oxygen enriched air. In at least one embodiment of the present invention, an oxygen enrichment membrane system (not shown) can be utilized to create oxygen enriched air from a raw air stream, where oxygen enrichment membrane system uses an oxygen selective membrane to separate oxygen from an air stream. The oxygen enrichment membrane system can be any system of membranes capable of extracting oxygen from an air stream to provide enriched air or a pure oxygen stream. The oxygen enrichment membrane system can be those known to one of skill in the art. The oxygen enriched air can be used as sweep air feed 132 to hydrogen sulfide membrane 30. Sweep air feed 132 provides a continuous stream of air to sweep the permeate side of hydrogen sulfide membrane 30. The flow rate of sweep air feed 132 can be determined based on the air needs of the overall system or of each unit operation, the composition of acid gas feed 100, the membrane characteristics of hydrogen sulfide membrane 30, the target rate for sulfur-containing compound in stack feed 130, the allowable sulfur dioxide emission rate of $SO_2$ in the outlet of an incinerator, or combinations of the same. In at least one embodiment, sweep air feed 132 enhances separation and collection of the hydrogen sulfide and carbon dioxide that permeates through the membrane of hydrogen sulfide membrane 30. Sweep air feed 132 drives the hydrogen sulfide to permeate from membrane feed 120 across the membrane of hydrogen sulfide membrane 30. In at least one embodiment, sweep air feed 132 can be an oxygen enriched air in a system where sulfur recovery unit 10 is achieving recovery of sulfur of greater than 94%. The explosive limit for hydrogen in sulfide in air with 21% oxygen is 4.3%; for an oxygen enriched air the explosive limit is less than 4.3%. The stream used for sweep air feed 132 can be determined based on the recovery efficiency of sulfur recovery unit 10 and the need to stay below the explosive limit of hydrogen sulfide in oxygen.

The gases that reach the permeate side of hydrogen sulfide membrane 30 blend with sweep air feed 132 and the combined stream exits hydrogen sulfide membrane 30 as hydrogen sulfide enriched air 134. In at least one embodiment, hydrogen sulfide enriched air 134 can include hydrogen sulfide and air. In at least one embodiment, hydrogen sulfide enriched air 134 can include hydrogen sulfide, carbon dioxide, and air. In at least one embodiment, hydrogen sulfide enriched air 134 can include sulfur-containing compounds. Hydrogen sulfide enriched air 134 is fed to the reaction furnace of sulfur recovery unit 10. Hydrogen sulfide and the oxygen present from the air are reactants in the Claus reaction in the reaction furnace to recover elemental sulfur.

Pressure changing devices can be included upstream and downstream of hydrogen sulfide membrane 30 to increase or decrease the pressure of membrane feed 120 or hydrogen sulfide enriched air 134. Examples of pressure changing devices can include compressors, blowers, turbines, and others.

Oxygen enrichment of the combustion air to the reaction furnace of sulfur recovery unit 10 improves, for example increases, capacity and improves the ability to handle contaminants. Without being bound to a particular theory, it is believed that the capacity of the reaction furnace is increased with oxygen enrichment due to the need for less gas flow (the more oxygen in the stream, the lower the overall flow needed) into the reaction furnace of sulfur recovery unit 10. Expanding capacity with oxygen enrichment can be used for handling extra acid gas loading at significantly reduced capital expense. Increased oxygen content in the reaction furnace of sulfur recovery unit 10 increases flame temperature, which helps destroy contaminants and increase sulfur recovery. In at least one embodiment, an oxygen selective membrane system is advantageous over other types of oxygen recovery units because it does not require significant operating costs due to high energy demands.

The remaining gases from membrane feed 120 that do not permeate the membrane in hydrogen sulfide membrane 30 form the retentate and exit hydrogen sulfide membrane 30 as stack feed 130. Stack feed 130 can be fed to a further processing unit such as a thermal oxidizer, a SCOT process, or an incinerator. The unit for further processing can be a thermal oxidizer or a SCOT process to increase the rate of sulfur recovery. Advantageously, where the further processing unit is a SCOT process, the presence of hydrogen sulfide membrane 30 removes large amounts of hydrogen sulfide reducing the load on the SCOT process. In at least one embodiment, the incinerator can be any type of incinerator capable of heating the remaining gases in stack feed 130 for dissemination in the atmosphere. The species in the outlet from the incinerator can be oxidized to their final oxidation state in the incinerator, such that the concentration of sulfur dioxide in the outlet from the incinerator can be less than an allowable sulfur dioxide emission limit, alternately less than 75 parts-per-billion per hour (ppb/hr), alternately less than 50 ppb/hr, and alternately less than 10 ppb/hr. In at least one embodiment of the present invention, the concentration of sulfur dioxide in the outlet from the incinerator is less than 75 ppb/hr. Advantageously, this system can be mounted on an existing sulfur recovery unit without the need for additional rotating equipment or machinery.

Returning to FIG. 2, an embodiment of the sulfur recovery unit is described. Thermal unit 12 includes a reaction furnace (not shown). Hydrogen sulfide enriched air 134 and furnace feed 200 are introduced into the reaction furnace of thermal unit 12. In at least one embodiment, thermal unit 12 includes a waste heat boiler, such that the outlet of the reaction furnace is introduced to the waste heat boiler. The waste heat boiler can recover heat from the reaction furnace outlet stream to produce cooled outlet 212 and steam. Cooled outlet 212 exits the waste heat boiler and is introduced to condenser 14.

Condenser 14 condenses sulfur vapor in cooled outlet 212 to produce condensed sulfur stream 224. Condensed sulfur stream 224 includes liquid elemental sulfur condensed in condenser 14. The gases that do not condense in condenser 14 exit condenser 14 as non-condensed stream 214. Non-condensed stream 214 can contain hydrogen sulfide, water vapor, $CO_2$, air, and combinations thereof. Non-condensed stream 214 is fed to catalytic unit 16. Catalytic unit 16 can include two or three Claus catalytic stages. The sulfur produced and condensed in catalytic unit 16 exits the system as processed sulfur 226. Processed sulfur 226 and condensed sulfur stream 224 can be mixed to produce recovered sulfur 112. Processed sulfur 226 and condensed sulfur stream 224 can be mixed using any mixing device capable mixing two streams. Examples of mixing devices include mixing tees, static mixers and other mixers known in the art.

Figure 2:
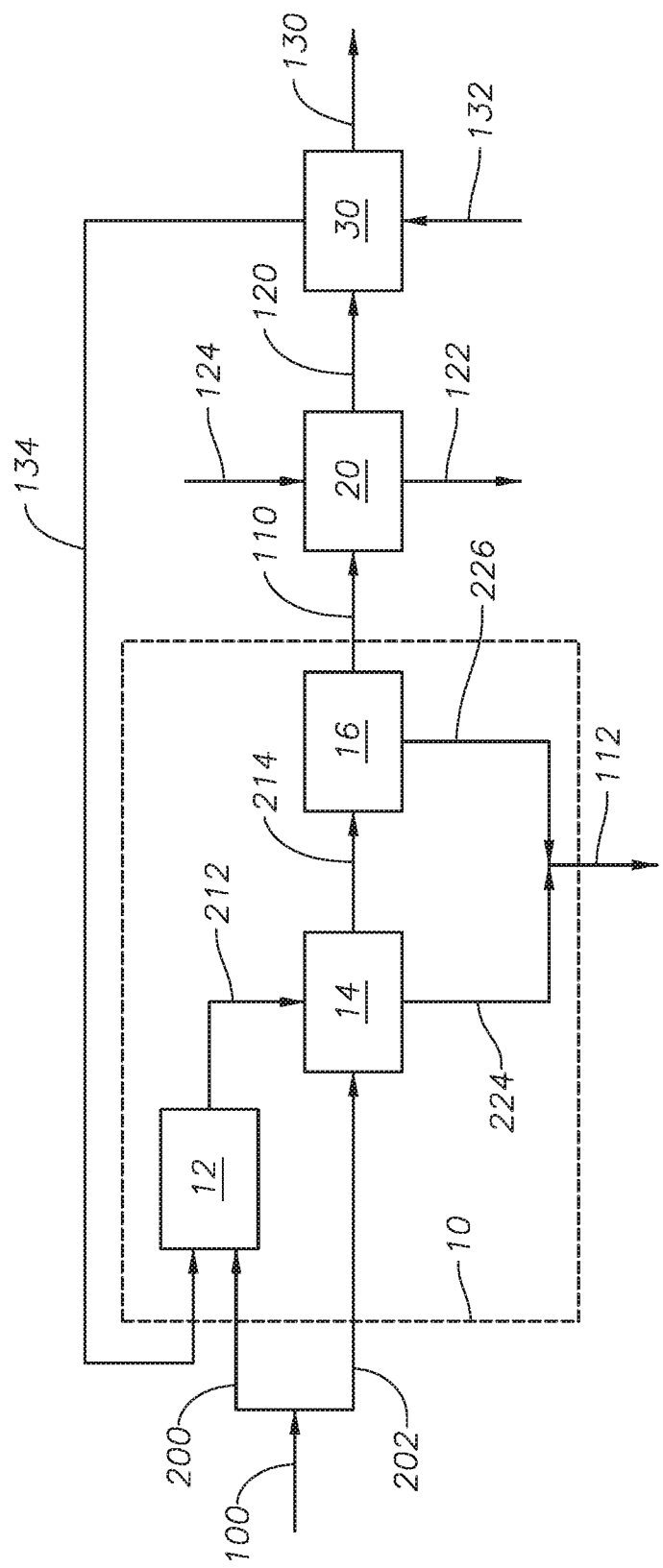
FIG. 2 is a process flow diagram of an embodiment of the method to recover sulfur.
Figure 3:
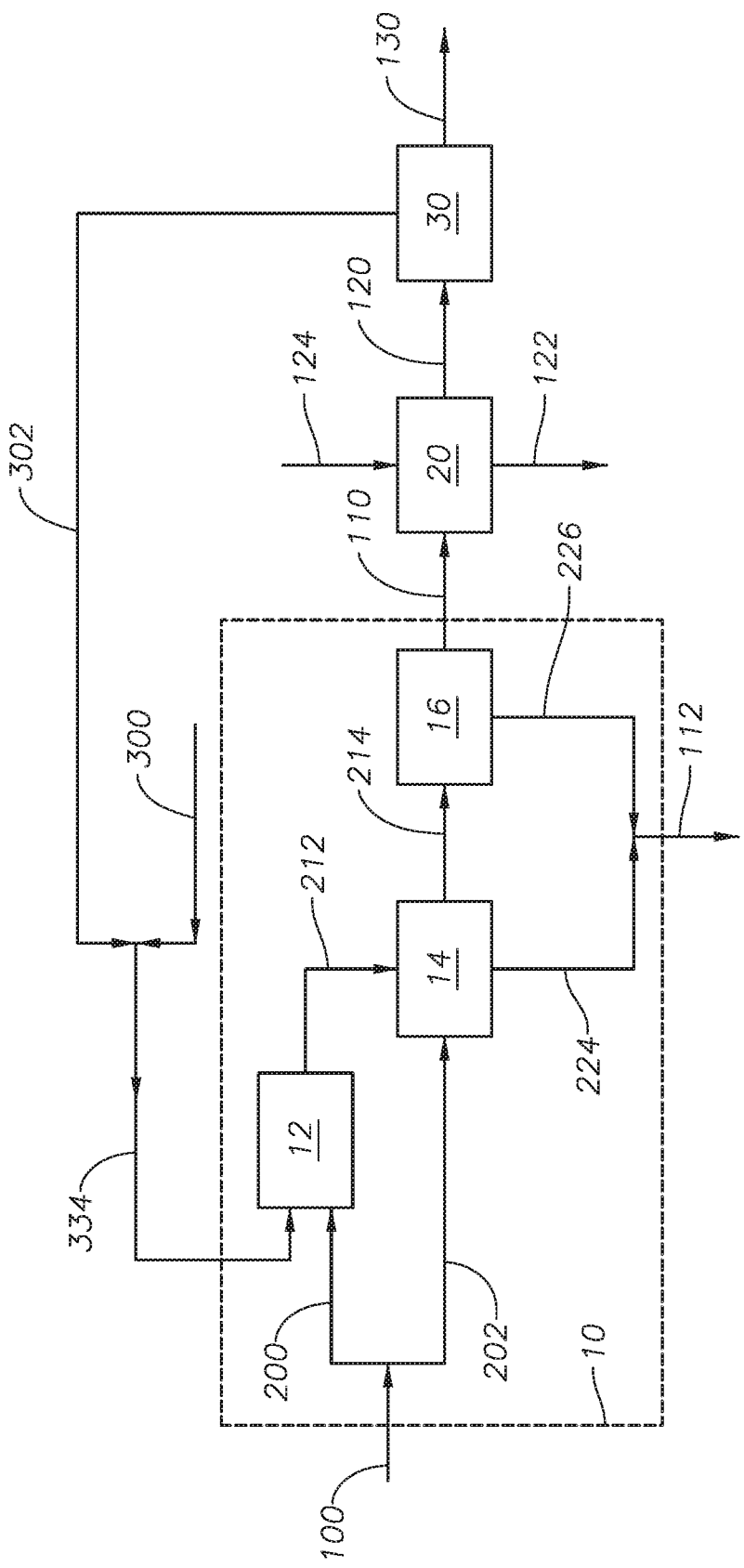
FIG. 3 is a process flow diagram of an embodiment of the method to recover sulfur.

Referring to FIG. 3, an embodiment of sulfur recovery system is described with reference to FIG. 1 and FIG. 2. FIG. 3 provides an embodiment in which sulfur recovery unit 10 is operated in split mode and hydrogen sulfide membrane 30 is in the absence of a sweep stream. In at least one embodiment, hydrogen sulfide membrane 30 can be a pressure-driven membrane unit in the absence of a sweep feed. In at least one embodiment, where the hydrogen sulfide membrane 30 is a pressure-driven membrane unit the pressure on the permeate side of the membrane can be set between −10 pounds per square inch gauge (psig) and 10 psig, alternately between −10 psig and 1 psig, and alternately between −7 psig and 1 psig. In at least one embodiment, where hydrogen sulfide membrane 30 is a pressure-driven membrane unit the pressure on the feed side of the membrane can be set between 10 psig and 80 psig and alternately between 16 psig and 75 psig. The hydrogen sulfide that permeates the membrane of hydrogen sulfide membrane 30 exits as hydrogen sulfide recycle 302. Hydrogen sulfide recycle 302 can be mixed with air feed 300 to produce diluted recycle stream 334. Diluted recycle stream 334 can be introduced to the reaction furnace of thermal unit 12. In at least one embodiment, the use of a pressure-driven membrane unit as hydrogen sulfide membrane 30 with vacuum on the permeate side enables the collection of more hydrogen sulfide with a smaller membrane surface area than membrane in the absence of a vacuum.

Referring to FIG. 4, an embodiment of the sulfur recovery system is described with reference to FIG. 1. Enrichment unit 40 can be included as part of sulfur recovery system to increase the concentration of hydrogen sulfide in the feed stream to sulfur recovery unit 10. Enrichment unit 40 allows for bulk separation of hydrogen sulfide. In at least one embodiment, enrichment unit is included when the concentration of hydrogen sulfide in acid gas feed 100 is between 10% by weight on a dry basis and 40% by weight on a dry basis. In at least one embodiment where enrichment unit 40 is included, sulfur recovery unit 10 can be operated in straight mode. In at least one embodiment, acid gas feed 100 can be introduced to enrichment unit 40 to produce carbon dioxide rich stream 402 and enriched feed 400. Enrichment unit 40 can be any acid gas enrichment system capable of increasing the concentration of hydrogen sulfide in an outlet stream. In at least one embodiment, enrichment unit 40 is an acid gas enrichment process that uses an amine in an aqueous solution to remove hydrogen sulfide from a gas stream. Examples of amines that can be used in enrichment unit 40 include diethanolamine (DEA), monoethanolamine (MEA), methyldiethanolamine (MDEA), diisopropanolamine (DIPA), and aminoethoxyethanol (diglycolamine) (DGA). In at least one embodiment, enrichment unit 40 is an acid gas enrichment process that uses MDEA in an aqueous solution to remove hydrogen sulfide form a gas stream. Enriched feed 400 is a gas stream containing an increased concentration of hydrogen sulfide as compared to acid gas feed 100. Separation and the selectivity for hydrogen sulfide is based on the kinetics of absorption, where hydrogen sulfide has a faster reaction time with tertiary amine as compared carbon dioxide, such that hydrogen sulfide can be bulk separated. Carbon dioxide rich stream 402 is a gas stream containing the gases separated. Carbon dioxide rich stream 402 can include carbon dioxide, water vapor, and hydrogen sulfide. In at least one embodiment, carbon dioxide rich stream 402 contains less than 10 parts-per-million weight (ppmw) hydrogen sulfide. In at least one embodiment, carbon dioxide rich stream 402 can include saturated water vapor. Carbon dioxide rich stream 402 can be vented to atmosphere, introduced to further processing, fed to storage or collection, or treated for re-injection to the sulfur recovery system. Advantageously, separating inert carbon dioxide from the feed to sulfur recovery unit 10 increases reaction efficiency in sulfur recovery unit 10. The presence of inert gases lowers the flame temperature in the reaction furnace. Reduced concentrations of inert gases in the reaction furnace increases the flame temperature, which results in increased conversion of sulfur-containing compounds to elemental sulfur and increased destruction of hydrocarbons. In the absence of step to separate carbon dioxide from the feed to sulfur recovery unit, the feed to sulfur recovery unit 10 can require a pre-heating if the feed to the reaction furnace is too rich in $CO_2$. In at least one embodiment, enrichment unit 40 can be added to recover carbon dioxide from acid gas feed 100.

In at least one embodiment, as shown in FIG. 5 with reference to FIG. 1 and FIG. 4, carbon dioxide rich stream 402 can be used as the sweep stream to hydrogen sulfide membrane 30. Carbon dioxide rich stream 402 can be used as the driving force to sweep hydrogen sulfide that permeates through hydrogen sulfide membrane 30. The hydrogen sulfide is collected by carbon dioxide rich stream 402 to produce membrane recycle 404. Membrane recycle 404 can be fed to enrichment unit 40. Using carbon dioxide rich stream 402 as the sweep stream in hydrogen sulfide membrane 30 creates a concentration driven separation because the concentration of hydrogen sulfide is lower on the permeate side than on the feed side. The concentration driven separation causes hydrogen sulfide to permeate through hydrogen sulfide-selective membrane due to the lower concentration on the permeate side. In at least one embodiment, carbon dioxide rich stream 402 is in the absence of oxygen such that no additional oxygen will enter enrichment unit 40 through membrane recycle 404. Avoiding oxygen in enrichment 40 is advantageous to avoid negative reactions between the amine and oxygen which would make the amine unavailable for use in separating hydrogen sulfide. Due to the low permeation of nitrogen through hydrogen sulfide membrane 30, a negligible amount of nitrogen is present in membrane recycle 404.

Figure 6:
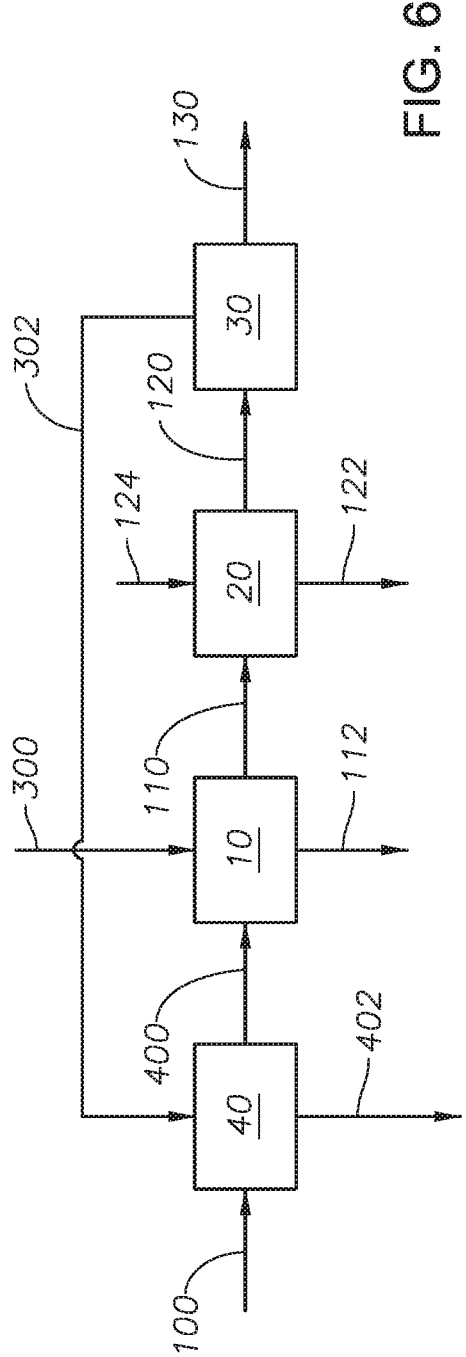
FIG. 6 is a process flow diagram of an embodiment of the method to recover sulfur.

Referring to FIG. 6, an embodiment of sulfur recovery system is described, with reference to FIG. 1, FIG. 3 and FIG. 4, that includes an enrichment unit 40. Hydrogen sulfide membrane 30 is in the absence of a sweep stream. Hydrogen sulfide recycle 302 can be introduced to enrichment unit 40.

Figure 7:
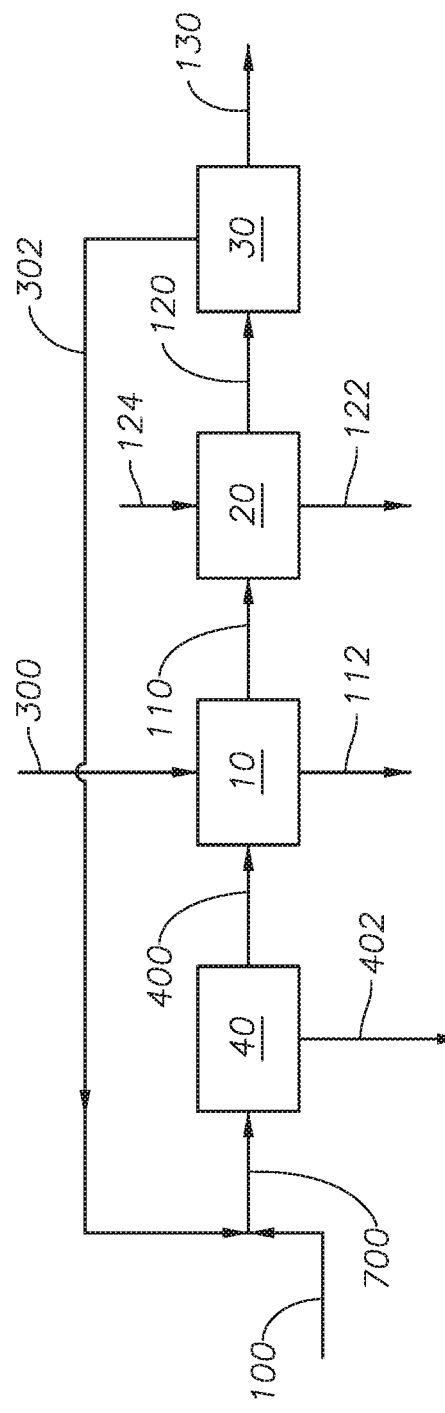
FIG. 7 is a process flow diagram of an embodiment of the method to recover sulfur.

Referring to FIG. 7, an embodiment of sulfur recovery system is described, with reference to FIG. 1 and FIG. 6. In at least one embodiment, hydrogen sulfide recycle 302 is mixed with acid gas feed 100 to produce mixed feed 700 upstream of enrichment unit 40. Mixed feed 700 can be introduced to sulfur recovery unit 10. In at least one embodiment, the configuration described with reference to FIG. 7 can be selected when maximum recovery of both carbon dioxide and hydrogen sulfide from acid gas feed 100 is desired.

The configurations described with reference to FIG. 5, FIG. 6 and FIG. 7 can be selected based on the limit of carbon dioxide to sulfur recovery unit 10. In at least one embodiment, where sulfur recovery unit 10 is operated in straight mode carbon dioxide in the feed to sulfur recovery unit 10 can be maintained at less than or equal to 50 wt %. In at least one embodiment, where sulfur recovery unit 10 is operated in split mode carbon dioxide in the feed to sulfur recovery unit can be maintained at less than or equal to 80 wt %. Therefore, the arrangements described with reference to FIG. 5, FIG. 6, and FIG. 7 can be selected based on the resulting carbon dioxide concentration in hydrogen sulfide recycle 302 and membrane recycle 404 to maintain a carbon dioxide concentration below the upper limit of carbon dioxide to sulfur recovery unit 10. In at least one embodiment, hydrogen sulfide membrane 30 includes an acid gas-selective membrane resulting in hydrogen sulfide recycle 302 having a concentration of carbon dioxide. Removal of carbon dioxide for hydrogen sulfide recycle 302 is advantageous to maximum conversion in sulfur recovery unit 10.

Figure 8:
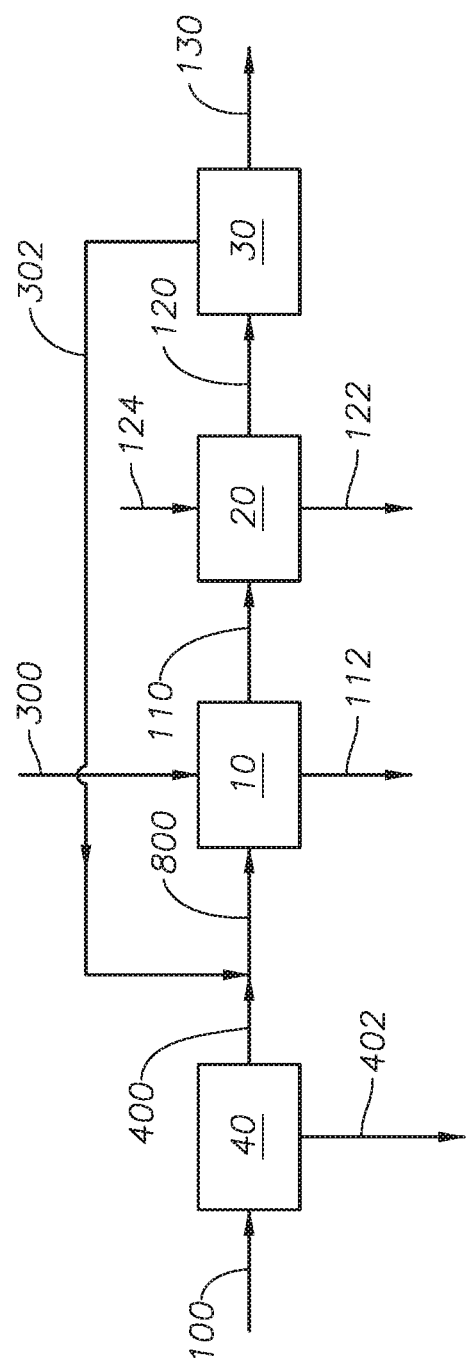
FIG. 8 is a process flow diagram of an embodiment of the method to recover sulfur.

Referring to FIG. 8, an embodiment of sulfur recovery system is described, with reference to FIG. 1 and FIG. 6, hydrogen sulfide recycle 302 can be mixed with enriched feed 400 to produce mixed enriched feed 800. Mixed enriched feed 800 can be introduced to sulfur recovery unit 10. In at least one embodiment, the configuration described with reference to FIG. 8 can be selected such that mixed enriched feed 800 has a concentration of hydrogen sulfide of at least 40% by weight on a dry basis. The embodiment described with reference to FIG. 8 can be selected when the concentration of carbon dioxide in mixed enriched feed 800 is less than 50% by weight when sulfur recovery unit 10 is operated in straight mode and alternately less than 80% by weight when sulfur recovery unit 10 is operated in split mode. In at least one embodiment, hydrogen sulfide membrane 30 includes a hydrogen sulfide-selective membrane and hydrogen sulfide recycle 302 includes a carbon dioxide concentration such that hydrogen sulfide recycle 302 can be mixed with enriched feed 400 without further processing before sulfur recovery unit 10.

Figure 9:
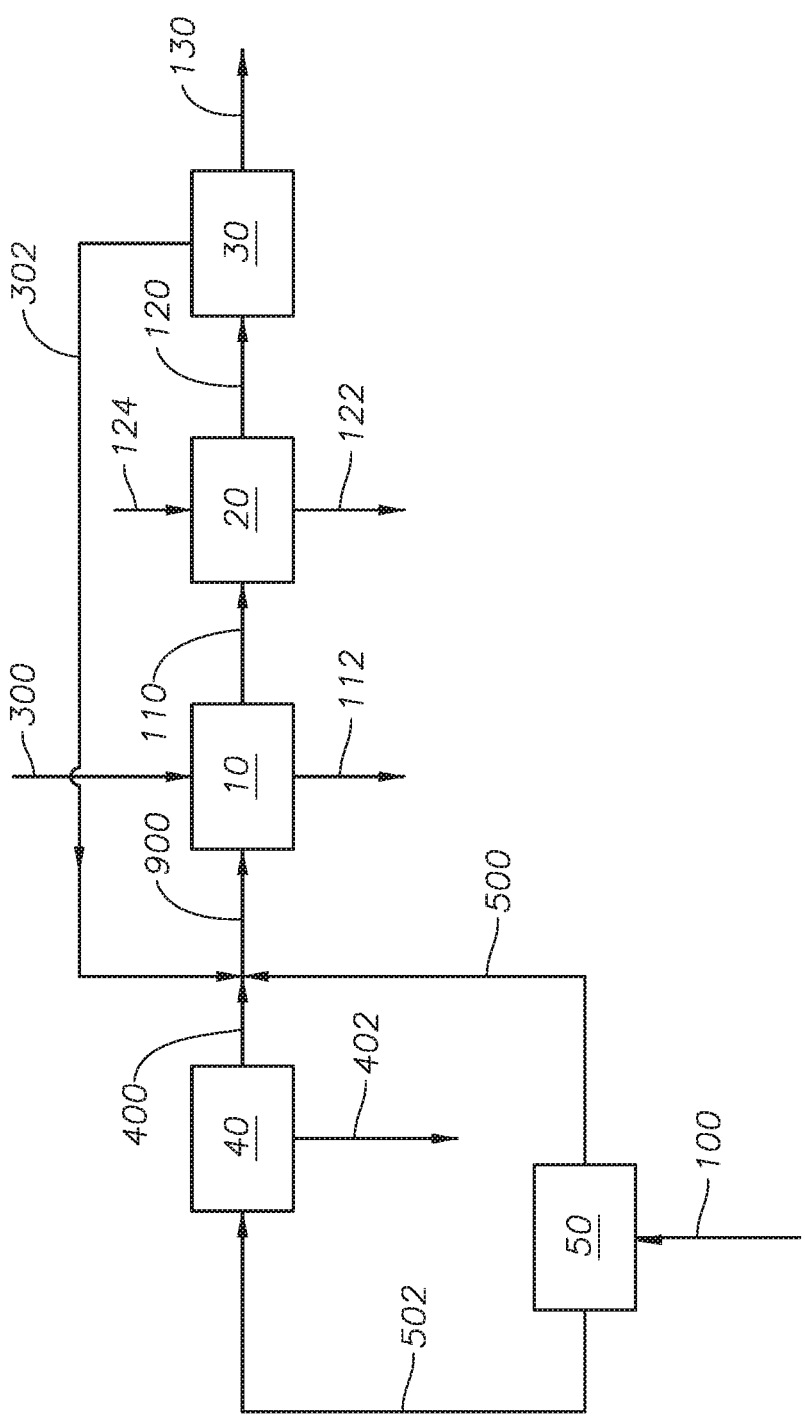
FIG. 9 is a process flow diagram of an embodiment of the method to recover sulfur.

Referring to FIG. 9, an embodiment of the sulfur recovery system is described with reference to FIG. 1 and FIG. 4. Acid gas feed 100 is introduced to carbon dioxide membrane unit 50 to produce hydrogen sulfide retentate 500 and carbon dioxide permeate 502. Carbon dioxide membrane unit 50 can achieve bulk separation of carbon dioxide. Carbon dioxide membrane unit 50 can include a carbon dioxide-selective membrane. In at least one embodiment, a pressure differential between the feed side and the permeate side of carbon dioxide membrane unit 50 is the driving force for separation. A pressure differential can be achieved by including a compressor on acid gas feed 100 or a vacuum and blower on carbon dioxide permeate 502. The carbon dioxide-selective membrane in carbon dioxide membrane unit 50 can be any membrane able to separate one or more gases from a feed mixture generating a permeate containing a specific gas enriched stream. The carbon dioxide-selective membrane in carbon dioxide membrane unit 50 can be any type of separation membrane able to separate carbon dioxide from acid gas feed 100 to generate a permeate containing carbon dioxide. Examples of carbon dioxide-selective membranes for use in carbon dioxide membrane unit 50 include amorphous fluoroplastic membranes, amorphous perfluoropolymer membranes, and Dupont 9918 polymeric membranes. Properties for select carbon dioxide-selective membranes are found in Table 1. In at least one embodiment, the carbon dioxide-selective membrane has a $CO_2/H_2S$ selectivity from between about 3.0 to about 8.0. In at least one embodiment, the carbon dioxide-selective membrane in carbon dioxide membrane unit 50 is different from the hydrogen sulfide-selective membrane in hydrogen sulfide membrane unit 30.

Carbon dioxide permeates through the carbon dioxide-selective membrane of carbon dioxide membrane unit 50 from the feed side to the permeate side and exits as carbon dioxide permeate 502. Carbon dioxide permeate 502 can include $CO_2$ and $H_2S$. In at least one embodiment, there is less than 10% by weight $H_2S$ in carbon dioxide permeate 502. Carbon dioxide permeate 502 can be fed to enrichment unit 40 to further separate hydrogen sulfide from carbon dioxide permeate 502.

The remaining gases that do not permeate the carbon dioxide-selective membrane exit carbon dioxide membrane unit 50 as hydrogen sulfide retentate 500. Hydrogen sulfide retentate 500 is rich in hydrogen sulfide. In at least one embodiment, hydrogen sulfide retentate contains greater than 90% by weight hydrogen sulfide, alternately greater than 80% by weight hydrogen sulfide, alternately greater than 70% by weight hydrogen sulfide, alternately greater than 60% by weight hydrogen sulfide, and alternately greater than 55% by weight hydrogen sulfide. Hydrogen sulfide retentate 500 can be mixed with enriched feed 400 and hydrogen sulfide recycle 302 to produce hydrogen sulfide rich feed 900. Hydrogen sulfide rich feed 900 can be introduced to the reaction furnace of sulfur recovery unit 10 along with air feed 300. Advantageously, the combination of enrichment unit 40 and carbon dioxide membrane unit 50 can achieve both bulk separation of carbon dioxide and bulk separation of hydrogen sulfide. The separation of carbon dioxide in carbon dioxide membrane unit 50 can result in a smaller size for enrichment unit 40.

Advantageously, the separation of $CO_2$ in carbon dioxide membrane unit 50 and enrichment unit 40 from acid gas feed 100 can result in a reduced size or reduced number of the Claus catalytic stages. Advantageously, removing carbon dioxide from the feed to sulfur recovery unit 10 reduces the equipment size and energy consumption of each unit of sulfur recovery unit 10 as the total volumetric flow that passes through sulfur recovery unit 10 is reduced. Advantageously, removing carbon dioxide from the feed to sulfur recovery unit 10 reduces the formation of carbonyl compounds in the reaction furnace of sulfur recovery unit 10. In at least one embodiment of the present invention, the system for recovering sulfur includes at least one, but less than three Claus catalytic stages without a reduction in the overall sulfur recovery.

Figure 10:
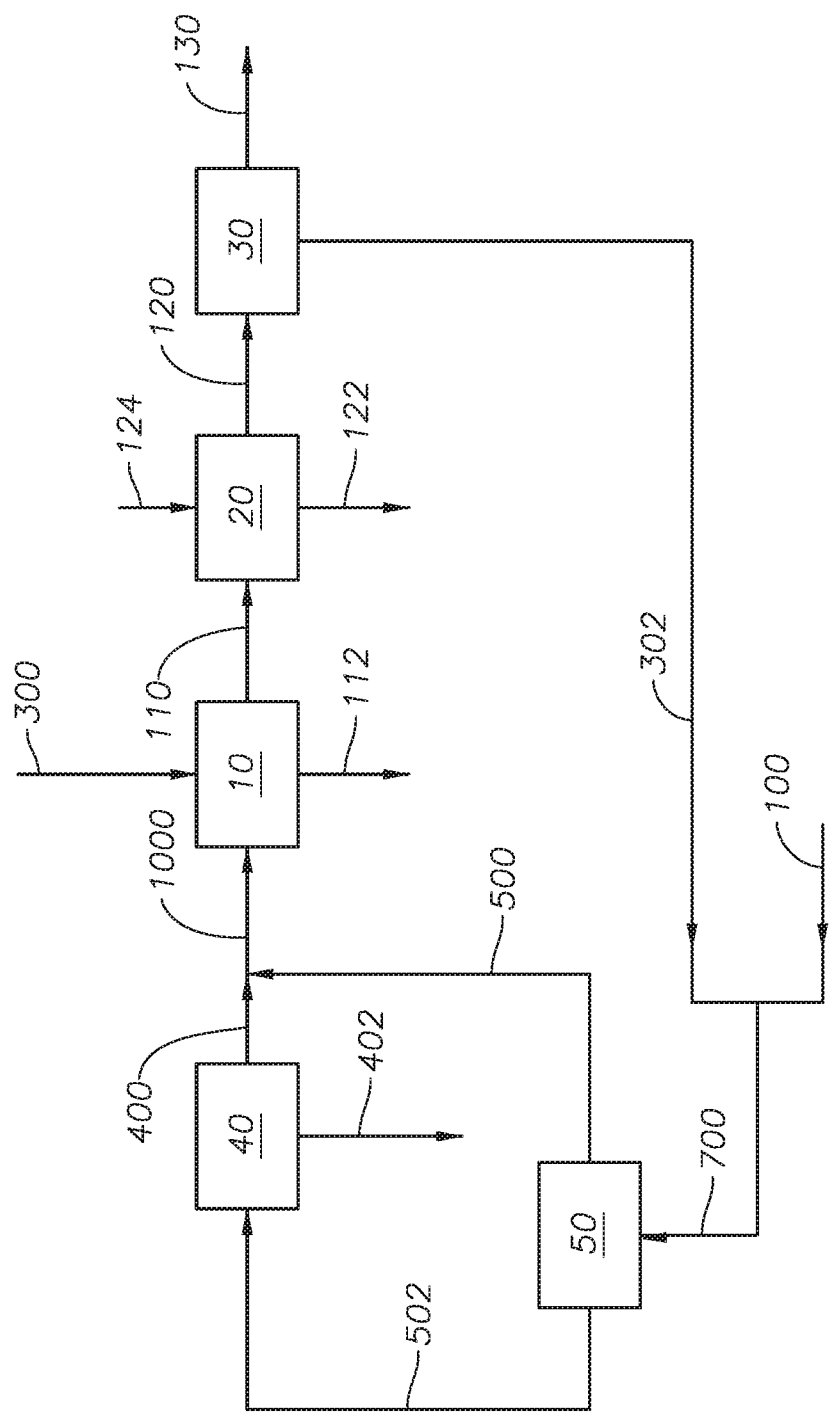
FIG. 10 is a process flow diagram of an embodiment of the method to recover sulfur.

Referring to FIG. 10, an embodiment of the sulfur recovery system is described with reference to FIG. 1, FIG. 7 and FIG. 9. Mixed feed 700 is introduced to carbon dioxide membrane unit 50.

The configurations described with reference to FIG. 9 and FIG. 10 can be used in embodiments where recovery of carbon dioxide is desired in addition to conversion of hydrogen sulfide to elemental sulfur. Carbon dioxide can be co-absorbed in enrichment unit 40 and without additional processing steps would be introduced to sulfur recovery unit 10. Recovering carbon dioxide in carbon dioxide rich stream 402 can increase the efficiency of sulfur recovery unit 10 and can decrease the amount of carbon dioxide vented to atmosphere.

Figure 11:
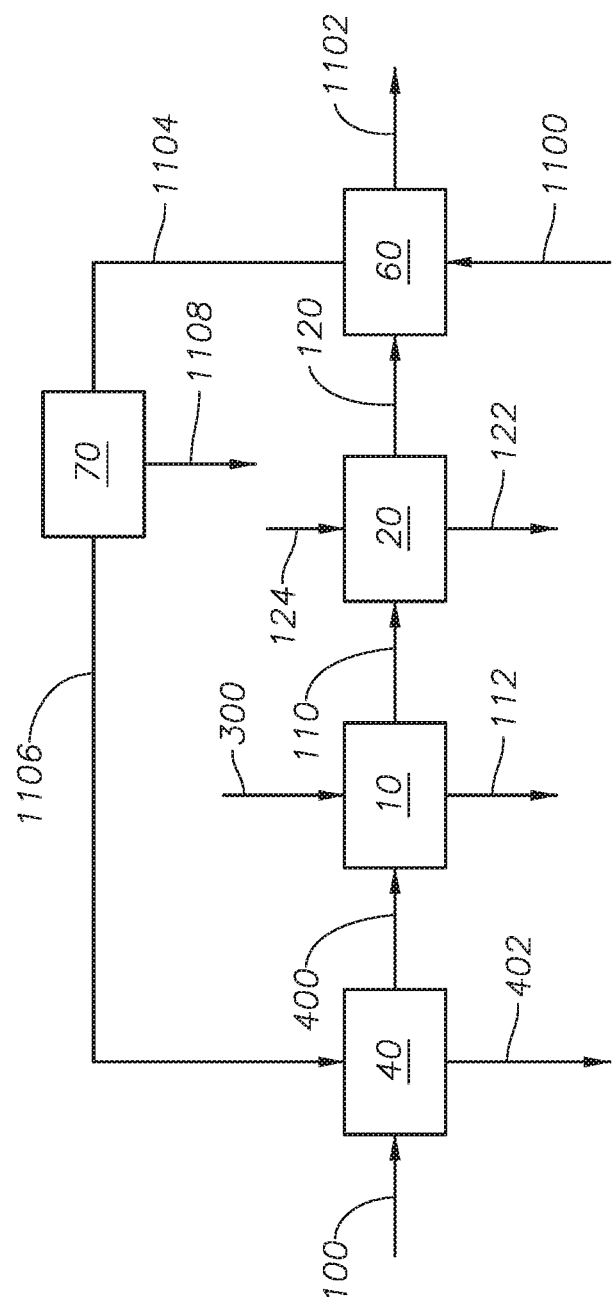
FIG. 11 is a process flow diagram of an embodiment of the method to recover sulfur.

Referring to FIG. 11, an embodiment of the sulfur recovery system is described with reference to FIG. 1 and FIG. 4. Membrane feed 120 is introduced to acid gas membrane unit 60 to produce acid gas retentate 1102 and acid gas permeate 1104. Acid gas membrane unit 60 can include an acid gas-selective membrane. The acid gas-selective membrane in acid gas membrane unit 60 can be any membrane with a selectivity for hydrogen sulfide and carbon dioxide over other gases in membrane feed 120. Steam feed 1100 can be used to sweep the permeate side of acid gas membrane unit 60. In at least one embodiment, steam feed 1100 is a low-pressure deeply de-aerated steam stream. As used throughout, "low-pressure deeply de-aerated steam" refers to a steam stream with less than 10 ppm oxygen at a temperature of 120° C. and pressure of 100 kPa. The use of de-aerated steam reduces the oxygen introduced to enrichment unit 40. In at least one embodiment, steam feed 1100 is in the absence of oxygen. The hydrogen sulfide and carbon dioxide that permeate through the acid gas-selective membrane of acid gas membrane unit 60 can be collected by the sweep of the steam feed 1100 to produce acid gas permeate 1104. Acid gas permeate 1104 can include hydrogen sulfide, carbon dioxide, water vapor, and combinations of the same. Acid gas permeate 1104 can be introduced to water condenser 70 to produce acid gas rich stream 1106 and sour water stream 1108. Water condenser 70 can be any device configured to separate the gases in acid gas permeate 1104 from the water vapor. Examples of devices include vapor-liquid separators and knock out drums. Sour water stream 1108 includes the water condensed in water condenser 70. In at least one embodiment, sour water stream 1108 can include entrained gases, such as hydrogen sulfide and carbon dioxide. Acid gas rich stream 1106 can include those gases separated in acid gas membrane unit 60. Acid gas rich stream 1106 can include hydrogen sulfide, carbon dioxide, water vapor, and combinations thereof. Acid gas rich stream 1106 can be fed to enrichment unit 40. Acid gas retentate 1102 can be sent to be further processed, stored, or sent to an incinerator. Acid gas membrane 60 can be used to increase recovery of carbon dioxide from membrane feed 120 which can reduce the amount of carbon dioxide in acid gas retentate 1102 which can reduce the amount of carbon dioxide emitted to the atmosphere.

Figure 12:
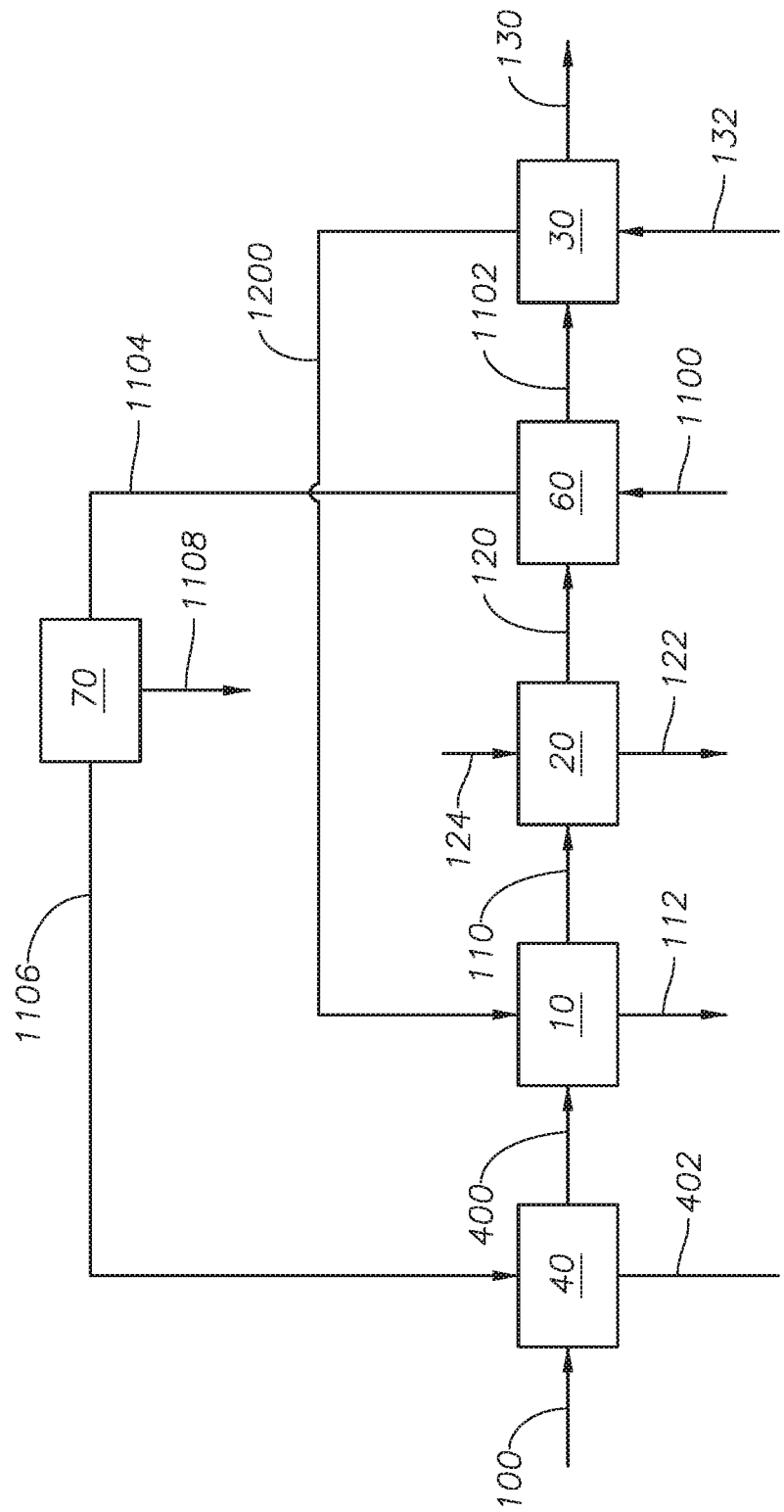
FIG. 12 is a process flow diagram of an embodiment of the method to recover sulfur.

In at least one embodiment, acid gas retentate 1102 can be further processed by being introduced to hydrogen sulfide membrane unit 30 as shown in FIG. 12. Referring to FIG. 12, an embodiment of the sulfur recovery system is described, and with reference to FIG. 1 and FIG. 11. Acid gas retentate 1102 is introduced to hydrogen sulfide membrane unit 30. The hydrogen sulfide in acid gas retentate 1102 permeates the membrane in hydrogen sulfide membrane 30 and is collected in sweep air feed 132 to form membrane air feed 1200. Membrane air feed 1200 can be introduced to the reaction furnace (not shown) of sulfur recovery unit 10. In at least one embodiment, acid gas membrane unit 60 is placed upstream of hydrogen sulfide membrane unit 30 to avoid oxygen in the air from sweep air feed 132 from entering enrichment unit 40. Avoidance of oxygen in enrichment unit 40 is advantageous because oxygen can alter the amine and lead to sulfur deposition within the amine process.

The embodiments described herein can increase the concentration of hydrogen sulfide to the sulfur recovery unit relative to acid gas feed 100, which can increase the flame temperature in the reaction furnace and result in increased conversion.

The overall recovery of sulfur can be greater than 99.0%, alternately greater than 99.2%, alternately greater than 99.4%, alternately greater than 99.6%, alternately greater than 99.8%, alternately greater than 99.9%. In at least one embodiment, hydrogen sulfide is not physically removed from the system, although hydrogen sulfide can be removed from certain streams and recovered in other streams.

With the use of instrumentation, the entire system can be monitored to minimize the sulfur-containing compounds being discharged in stack feed 130 to an incinerator. Minimizing the sulfur-containing compounds in stack feed 130 minimizes the sulfur dioxide produced in the incinerator and minimizes the sulfur dioxide released to atmosphere. Instrumentation can be used to measure the hydrogen sulfide in all of the feed and combined feed streams to sulfur recovery unit 10, including acid gas feed 100, hydrogen sulfide enriched air 134, hydrogen sulfide recycle 302, enriched feed 400, mixed enriched feed 800, hydrogen sulfide rich feed 900, and combined feed 1000. In at least one embodiment, the concentration of air in each of those streams and the air demand in sulfur recovery unit 10 can be monitored. The air to sulfur recovery unit 10 can be adjusted by adjusting the flow rates of sweep air feed 132 and air feed 300. In at least one embodiment, a tail gas analyzer can be used to monitor the concentration of components in the process streams.

In at least one embodiment, when the sulfur recovery system includes an enrichment unit and a hydrogen sulfide membrane with a sweep air is used to sweep the permeate side of the hydrogen sulfide membrane, the sweep air containing the permeated gases is not fed to the enrichment unit in order to avoid introducing oxygen to the enrichment unit.

EXAMPLES

The Examples illustrate the contribution of the membranes, the reducing unit, and the enrichment unit on sulfur recovery. The variations between Examples were the configuration of the sulfur recovery method, the membrane area and the composition of the acid gas feed. The membrane area was determined based on the membrane characteristics, the acid gas feed composition, and the temperature and the flow rate of the feed to the membrane.

Throughout the examples, references will be made to types of membranes for use in the various separation units. A hydrogen sulfide-selective membrane has selectivity for hydrogen sulfide over carbon dioxide. A carbon dioxide-selective membrane has selectivity for carbon dioxide over hydrogen sulfide. An acid gas-selective membrane has selectivity for hydrogen sulfide and carbon dioxide over nitrogen. Table 2 includes a list of selected properties for exemplary membranes useful in the membrane units of the present invention. The data in Table 2 was collected from independently developed data.

TABLE 2

| Membrane Properties for the Major Components | | | |
|---|---|---|---|
| Permanence (GPU)[1] | $H_2S$-selective Membrane | $CO_2$-selective Membrane | Acid Gas-selective Membrane |
| H2S | 254 | 6.4 | 127 |
| CO2 | 57 | 129 | 127 |
| N2 | 6.0 | 25.4 | 0.21 |

[1] 1 GPU = 10-6 cm3 (STP)/cm2.s.cmHg, or 3.35 × 10-10 mol/m2.s.Pa in SI unit. Permanence (Pressure Normalized flux) Unit The Examples were based on the configuration embodied in the figures and described.

Example 1

Figure 14:
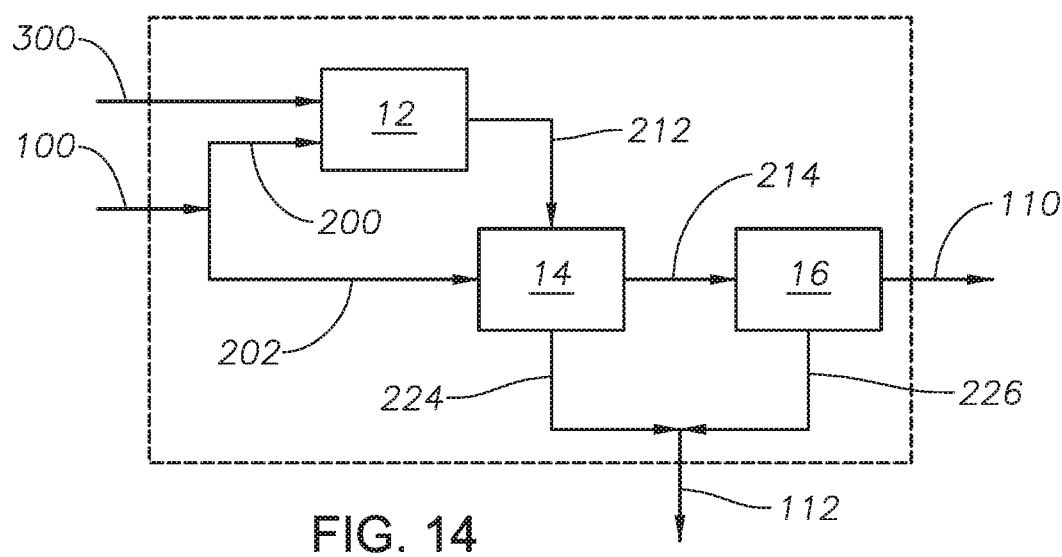
FIG. 14 is a process flow diagram of a sulfur recovery unit.

Example 1 was simulated based on the configuration embodied in FIG. 14, with reference to FIG. 2 as described and is a comparative example. The sulfur recovery unit is operated in split mode due to the low hydrogen sulfide content in acid gas feed 100. The simulation contained no membranes and no reducing unit. The simulation was based on catalytic unit 16 having three Claus catalytic stages in series. The reaction furnace outlet Claus process with three Claus catalytic stages in series. The reaction furnace temperature outlet was 2097° F. (1147° C.). The resulting concentrations of components for selected streams are shown in Table 2.

TABLE 3

| Heat and Mass Balance of Streams for Example 1. | | | | | | | |
|---|---|---|---|---|---|---|---|
| Stream | 100 | 300 | 212 | 224 | 226 | 110 | 112 |
| C1 | 0.0028 | 0.0000 | 0.0000 | 0.0000 | 0.0000 | 0.0011 | 0.0000 |
| C2 | 0.0014 | 0.0000 | 0.0000 | 0.0000 | 0.0000 | 0.0006 | 0.0000 |
| CO2 | 0.6915 | 0.0000 | 0.2868 | 0.0004 | 0.0004 | 0.4721 | 0.0000 |
| H2S | 0.2276 | 0.0000 | 0.0026 | 0.0003 | 0.0001 | 0.0057 | 0.0000 |
| N2 | 0.0000 | 0.7921 | 0.4862 | 0.0000 | 0.0000 | 0.3163 | 0.0000 |
| H2O | 0.0762 | 0.0099 | 0.1342 | 0.0229 | 0.0705 | 0.1972 | 0.0688 |
| O2 | 0.0000 | 0.1980 | 0.0000 | 0.0000 | 0.0000 | 0.0000 | 0.0000 |
| SO2 | 0.0000 | 0.0000 | 0.0751 | 0.0003 | 0.0000 | 0.0027 | 0.0000 |
| S2 | 0.0000 | 0.0000 | 0.0062 | 0.0000 | 0.0000 | 0.0000 | 0.0000 |
| S-Vap | 0.0000 | 0.0000 | 0.0000 | 0.0000 | 0.0000 | 0.0000 | 0.0000 |
| S-Liq | 0.0000 | 0.0000 | 0.0000 | 0.9761 | 0.9288 | 0.0000 | 0.9312 |
| Benzene | 0.0000 | 0.0000 | 0.0000 | 0.0000 | 0.0000 | 0.0000 | 0.0000 |
| Toluene | 0.0000 | 0.0000 | 0.0000 | 0.0000 | 0.0000 | 0.0000 | 0.0000 |
| Xylene | 0.0000 | 0.0000 | 0.0000 | 0.0000 | 0.0000 | 0.0000 | 0.0000 |
| E-Benzene | 0.0000 | 0.0000 | 0.0000 | 0.0000 | 0.0000 | 0.0000 | 0.0000 |
| COS | 0.0000 | 0.0000 | 0.0014 | 0.0000 | 0.0000 | 0.0003 | 0.0000 |
| CS2 | 0.0000 | 0.0000 | 0.0021 | 0.0000 | 0.0000 | 0.0002 | 0.0000 |
| H2 | 0.0000 | 0.0000 | 0.0019 | 0.0000 | 0.0000 | 0.0012 | 0.0000 |
| CO | 0.0000 | 0.0000 | 0.0035 | 0.0000 | 0.0000 | 0.0023 | 0.0000 |
| % S/Sfd | 100.00 | 0.00 | 40.03 | 4.81 | 89.34 | 5.88 | 94.12 |
| Molar Flow (MMSCFD) | 65 | 38 | 62 | 1 | 14 | 95 | 15 |
| Mass Flow (lb/hr) | 284243 | 120083 | 233835 | 2552 | 48762 | 353074 | 51259 |
| Pressure (psig) | 16 | 0 | 16 | 16 | 16 | 16 | 16 |
| Temp (° F.) | 135.0 | 135.0 | 700.0 | 360.0 | 260.6 | 260.6 | 312.3 |
| Comp (MW) | 1.6 | 1.6 | 1.6 | 1.6 | 1.6 | 1.6 | 1.6 |

The overall recovery of sulfur in Example 1 was 94.1%.

Example 2

Example 2 was simulated based on the configuration embodied in FIG. 2 and described above. Sulfur recovery unit 10 is operated in split mode due to the low $H_2S$ content in acid gas feed 100. The simulation was based on catalytic unit 16 having three Claus catalytic stages. The reaction furnace temperature outlet was 1838.9° F. (1004° C.). The permeate of hydrogen sulfide membrane 30 was swept with air in sweep air feed 132. The membrane in hydrogen sulfide membrane 30 was a hydrogen sulfide-selective membrane area with the permeability specified in Table 2 and with a total area of 61,642 square meters ($m^2$). The pressure of membrane feed 120 was 16 psig (280.6 kPa). The permeate pressure was set at −7 psig (53.1 kPa). The resulting concentrations of components for selected streams are shown in Table 4.

TABLE 4

Heat and Mass Balance of Streams for Example 2.

| Stream | 100 | 132 | 212 | 224 | 226 | 120 | 134 | 112 | 130 |
|---|---|---|---|---|---|---|---|---|---|
| C1 | 0.0028 | 0.0000 | 0.0000 | 0.0000 | 0.0000 | 0.0012 | 0.0001 | 0.0000 | 0.0013 |
| C2 | 0.0014 | 0.0000 | 0.0000 | 0.0000 | 0.0000 | 0.0006 | 0.0001 | 0.0000 | 0.0006 |
| CO2 | 0.6915 | 0.0000 | 0.3511 | 0.0004 | 0.0004 | 0.5852 | 0.1823 | 0.0000 | 0.5672 |
| H2S | 0.2276 | 0.0000 | 0.0027 | 0.0003 | 0.0001 | 0.0091 | 0.0083 | 0.0000 | 0.0051 |
| N2 | 0.0000 | 0.7921 | 0.4082 | 0.0000 | 0.0000 | 0.3409 | 0.5878 | 0.0000 | 0.3985 |
| H2O | 0.0762 | 0.0099 | 0.1578 | 0.0267 | 0.0743 | 0.0552 | 0.0711 | 0.0723 | 0.0215 |
| O2 | 0.0000 | 0.1980 | 0.0000 | 0.0000 | 0.0000 | 0.0000 | 0.1432 | 0.0000 | 0.0014 |
| SO2 | 0.0000 | 0.0000 | 0.0610 | 0.0002 | 0.0001 | 0.0000 | 0.0000 | 0.0000 | 0.0000 |
| S2 | 0.0000 | 0.0000 | 0.0055 | 0.0000 | 0.0000 | 0.0000 | 0.0000 | 0.0000 | 0.0000 |
| S-Vap | 0.0000 | 0.0000 | 0.0000 | 0.0000 | 0.0000 | 0.0000 | 0.0000 | 0.0000 | 0.0000 |
| S-Liq | 0.0000 | 0.0000 | 0.0000 | 0.9723 | 0.9251 | 0.0000 | 0.0000 | 0.9276 | 0.0000 |
| Benzene | 0.0000 | 0.0000 | 0.0000 | 0.0000 | 0.0000 | 0.0001 | 0.0000 | 0.0000 | 0.0000 |
| Toluene | 0.0000 | 0.0000 | 0.0000 | 0.0000 | 0.0000 | 0.0000 | 0.0000 | 0.0000 | 0.0000 |
| Xylene | 0.0000 | 0.0000 | 0.0000 | 0.0000 | 0.0000 | 0.0000 | 0.0000 | 0.0000 | 0.0000 |
| E-Benzene | 0.0000 | 0.0000 | 0.0000 | 0.0000 | 0.0000 | 0.0000 | 0.0000 | 0.0000 | 0.0000 |
| COS | 0.0000 | 0.0000 | 0.0017 | 0.0000 | 0.0000 | 0.0000 | 0.0000 | 0.0000 | 0.0000 |
| CS2 | 0.0000 | 0.0000 | 0.0026 | 0.0001 | 0.0000 | 0.0000 | 0.0000 | 0.0000 | 0.0000 |
| H2 | 0.0000 | 0.0000 | 0.0003 | 0.0000 | 0.0000 | 0.0000 | 0.0000 | 0.0000 | 0.0000 |
| CO | 0.0000 | 0.0000 | 0.0091 | 0.0000 | 0.0000 | 0.0076 | 0.0069 | 0.0000 | 0.0042 |
| % S/Sfd | 100.00 | 0.00 | 43.07 | 5.42 | 91.89 | 5.75 | 3.04 | 97.29 | 2.71 |
| Molar Flow (MMSCFD) | 65 | 40 | 78 | 1 | 14 | 94 | 54 | 16 | 79 |
| Mass Flow (lb/hr) | 284243 | 125756 | 298016 | 2878 | 50276 | 379831 | 184262 | 53099 | 321320 |
| Pressure (psig) | 16 | −7 | 16 | 16 | 16 | 16 | 16 | 16 | 16 |
| Temp (° F.) | 135.0 | 135.0 | 700.0 | 360.0 | 260.6 | 120.0 | 472.6 | 312.8 | 125.0 |
| Comp (MW) | 4.6 | 4.6 | 4.6 | 4.6 | 4.6 | 4.6 | 4.6 | 4.6 | 4.6 |

The overall recovery of sulfur in Example 2 was 97.3%. This is an increase in overall recovery of sulfur as compared to Example 1.

Example 3

Example 3 was simulated based on the configuration embodied in FIG. 3. Sulfur recovery unit 10 is operated in split mode due to the low $H_2S$ content in acid gas feed 100. The simulation was based on catalytic unit 16 having three Claus catalytic stages. The reaction furnace temperature outlet was 1492.3° F. (811.4° C.). The membrane in hydrogen sulfide membrane 30 was a hydrogen sulfide-selective membrane area with the permeability specified in Table 2 and with a total area of 61,642 $m^2$. The pressure of membrane feed 120 was 75 psig (618 kPa). The permeate pressure was set at 1 psig (108 kPa). The resulting concentrations of components for selected streams are shown in Table 5.

TABLE 5

Heat and Mass Balance of Streams for Example 3.

| Stream | 100 | 300 | 212 | 224 | 226 | 120 | 134 | 112 | 130 |
|---|---|---|---|---|---|---|---|---|---|
| C1 | 0.0028 | 0.0000 | 0.0000 | 0.0000 | 0.0000 | 0.0010 | 0.0003 | 0.0000 | 0.0012 |
| C2 | 0.0014 | 0.0000 | 0.0000 | 0.0000 | 0.0000 | 0.0005 | 0.0002 | 0.0000 | 0.0005 |
| CO2 | 0.6915 | 0.0000 | 0.4519 | 0.0004 | 0.0005 | 0.6260 | 0.3563 | 0.0000 | 0.5768 |
| H2S | 0.2276 | 0.0000 | 0.0017 | 0.0003 | 0.0001 | 0.0081 | 0.0083 | 0.0000 | 0.0042 |
| N2 | 0.0000 | 0.7921 | 0.3584 | 0.0000 | 0.0000 | 0.2999 | 0.4822 | 0.0000 | 0.4037 |
| H2O | 0.0762 | 0.0099 | 0.1157 | 0.0213 | 0.0604 | 0.0552 | 0.0294 | 0.0593 | 0.0088 |

TABLE 5-continued

Heat and Mass Balance of Streams for Example 3.

| Stream | 100 | 300 | 212 | 224 | 226 | 120 | 134 | 112 | 130 |
|---|---|---|---|---|---|---|---|---|---|
| O2 | 0.0000 | 0.1980 | 0.0000 | 0.0000 | 0.0000 | 0.0000 | 0.1138 | 0.0000 | 0.0000 |
| SO2 | 0.0000 | 0.0000 | 0.0522 | 0.0002 | 0.0001 | 0.0000 | 0.0000 | 0.0000 | 0.0000 |
| S2 | 0.0000 | 0.0000 | 0.0036 | 0.0000 | 0.0000 | 0.0000 | 0.0000 | 0.0000 | 0.0000 |
| S-Vap | 0.0000 | 0.0000 | 0.0000 | 0.0000 | 0.0000 | 0.0000 | 0.0000 | 0.0000 | 0.0000 |
| S-Liq | 0.0000 | 0.0000 | 0.0000 | 0.9777 | 0.9389 | 0.0000 | 0.0000 | 0.9407 | 0.0000 |
| Benzene | 0.0000 | 0.0000 | 0.0001 | 0.0000 | 0.0000 | 0.0001 | 0.0001 | 0.0000 | 0.0000 |
| Toluene | 0.0000 | 0.0000 | 0.0000 | 0.0000 | 0.0000 | 0.0000 | 0.0000 | 0.0000 | 0.0000 |
| Xylene | 0.0000 | 0.0000 | 0.0000 | 0.0000 | 0.0000 | 0.0000 | 0.0000 | 0.0000 | 0.0000 |
| E-Benzene | 0.0000 | 0.0000 | 0.0000 | 0.0000 | 0.0000 | 0.0000 | 0.0000 | 0.0000 | 0.0000 |
| COS | 0.0000 | 0.0000 | 0.0022 | 0.0000 | 0.0000 | 0.0000 | 0.0000 | 0.0000 | 0.0000 |
| CS2 | 0.0000 | 0.0000 | 0.0033 | 0.0001 | 0.0000 | 0.0000 | 0.0000 | 0.0000 | 0.0000 |
| H2 | 0.0000 | 0.0000 | 0.0000 | 0.0000 | 0.0000 | 0.0000 | 0.0000 | 0.0000 | 0.0000 |
| CO | 0.0000 | 0.0000 | 0.0109 | 0.0000 | 0.0000 | 0.0091 | 0.0094 | 0.0000 | 0.0047 |
| % S/Sfd | 100.00 | 0.00 | 43.89 | 4.03 | 93.81 | 6.05 | 3.87 | 97.81 | 2.18 |
| Molar Flow (MMSCFD) | 65 | 40 | 93 | 1 | 15 | 111 | 69 | 15 | 78 |
| Mass Flow (lb/hr) | 284243 | 125283 | 371402 | 2135 | 50879 | 458226 | 257647 | 52957 | 318295 |
| Pressure (psig) | 16 | 1 | 16 | 16 | 16 | 16 | 16 | 16 | 75 |
| Temp (° F.) | 135.0 | 135.0 | 700.0 | 360.0 | 260.6 | 120.0 | 272.0 | 312.5 | 125.0 |
| Comp (MW) | 9.2 | 9.2 | 9.2 | 9.2 | 9.2 | 9.2 | 9.2 | 9.2 | 9.2 |

The overall recovery of sulfur in Example 3 was 97.8%.

Example 4

Example 4 was simulated based on the configuration embodied in FIG. 2. The sulfur recovery unit is operated in split mode due to the low $H_2S$ content in acid gas feed 100. The simulation was based on a catalytic unit 16 having three Claus catalytic stages. The reaction furnace temperature outlet was 1656.9° F. (902.7° C.). The membrane in hydrogen sulfide membrane 30 was a hydrogen sulfide-selective membrane with the permeability specified in Table 2 and with a total area of 31,399 m². Hydrogen sulfide membrane 30 was swept with air in sweep air feed 132. The pressure of membrane feed 120 was 75 psig (618 kPa). The permeate pressure was set at 1 psig (108 kPa). The resulting concentrations of components for selected streams are shown in Table 6.

TABLE 6

Heat and Mass Balance of Streams for Example 4.

| Stream | 100 | 132 | 212 | 224 | 226 | 120 | 134 | 112 | 130 |
|---|---|---|---|---|---|---|---|---|---|
| C1 | 0.0028 | 0.0000 | 0.0000 | 0.0000 | 0.0000 | 0.0011 | 0.0002 | 0.0000 | 0.0013 |
| C2 | 0.0014 | 0.0000 | 0.0000 | 0.0000 | 0.0000 | 0.0005 | 0.0001 | 0.0000 | 0.0006 |
| CO2 | 0.6915 | 0.0000 | 0.3952 | 0.0004 | 0.0005 | 0.5992 | 0.2592 | 0.0000 | 0.5748 |
| H2S | 0.2276 | 0.0000 | 0.0028 | 0.0003 | 0.0001 | 0.0090 | 0.0103 | 0.0000 | 0.0038 |
| N2 | 0.0000 | 0.7921 | 0.3919 | 0.0000 | 0.0000 | 0.3236 | 0.5504 | 0.0000 | 0.4071 |
| H2O | 0.0762 | 0.0099 | 0.1287 | 0.0229 | 0.0656 | 0.0552 | 0.0343 | 0.0638 | 0.0060 |
| O2 | 0.0000 | 0.1980 | 0.0000 | 0.0000 | 0.0000 | 0.0000 | 0.1328 | 0.0000 | 0.0014 |
| SO2 | 0.0000 | 0.0000 | 0.0579 | 0.0002 | 0.0001 | 0.0000 | 0.0000 | 0.0000 | 0.0000 |
| S2 | 0.0000 | 0.0000 | 0.0052 | 0.0000 | 0.0000 | 0.0000 | 0.0000 | 0.0000 | 0.0000 |
| S-Vap | 0.0000 | 0.0000 | 0.0000 | 0.0000 | 0.0000 | 0.0000 | 0.0000 | 0.0000 | 0.0000 |
| S-Liq | 0.0000 | 0.0000 | 0.0000 | 0.9761 | 0.9337 | 0.0000 | 0.0000 | 0.9361 | 0.0000 |
| Benzene | 0.0000 | 0.0000 | 0.0001 | 0.0000 | 0.0000 | 0.0001 | 0.0001 | 0.0000 | 0.0000 |
| Toluene | 0.0000 | 0.0000 | 0.0000 | 0.0000 | 0.0000 | 0.0000 | 0.0000 | 0.0000 | 0.0000 |
| Xylene | 0.0000 | 0.0000 | 0.0000 | 0.0000 | 0.0000 | 0.0000 | 0.0000 | 0.0000 | 0.0000 |
| E-Benzene | 0.0000 | 0.0000 | 0.0000 | 0.0000 | 0.0000 | 0.0000 | 0.0000 | 0.0000 | 0.0000 |
| COS | 0.0000 | 0.0000 | 0.0019 | 0.0000 | 0.0000 | 0.0000 | 0.0000 | 0.0000 | 0.0000 |
| CS2 | 0.0000 | 0.0000 | 0.0029 | 0.0001 | 0.0000 | 0.0000 | 0.0000 | 0.0000 | 0.0000 |
| H2 | 0.0000 | 0.0000 | 0.0000 | 0.0000 | 0.0000 | 0.0000 | 0.0000 | 0.0000 | 0.0000 |
| CO | 0.0000 | 0.0000 | 0.0134 | 0.0000 | 0.0000 | 0.0111 | 0.0126 | 0.0000 | 0.0047 |
| % S/Sfd | 100.00 | 0.00 | 44.11 | 5.39 | 92.6 | 6.11 | 4.09 | 97.96 | 2.03 |
| Molar Flow (MMSCFD) | 65 | 40 | 83 | 1 | 15 | 101 | 59 | 16 | 78 |
| Mass Flow (lb/hr) | 284243 | 126702 | 324271 | 2855 | 50389 | 409866 | 210516 | 53187 | 319197 |
| Pressure (psig) | 16 | 1 | 16 | 16 | 16 | 16 | 16 | 16 | 75 |
| Temp (° F.) | 135.0 | 135.0 | 700.0 | 360.0 | 260.6 | 120.0 | 282.8 | 312.9 | 125.0 |
| Comp (MW) | 8.2 | 8.2 | 8.2 | 8.2 | 8.2 | 8.2 | 8.2 | 8.2 | 8.2 |

The overall recovery of sulfur in Example 4 was 98.0%.

Example 5

Figure 15:
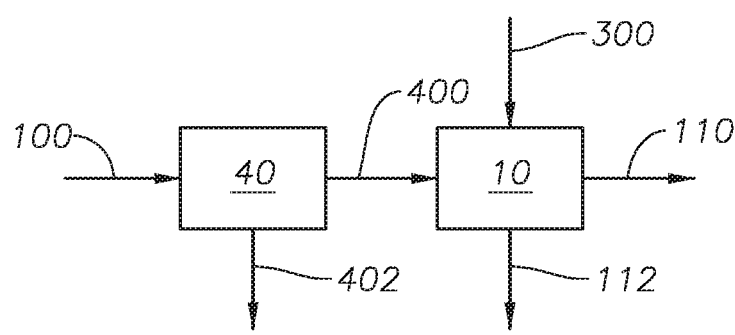
FIG. 15 is a process flow diagram of a sulfur recovery unit.

Example 5 was simulated based on the configuration embodied in FIG. 15 with reference to FIG. 1 and FIG. 4 as described and is a comparative example. Example 5 did not include a membrane or reducing unit. The simulation was based on sulfur recovery unit 10 having three Claus catalytic stages. The reaction furnace temperature outlet was 2111.2° F. (1155.1° C.). Air feed 300 provides the air to the reaction furnace of sulfur recovery unit 10. Enrichment unit 40 uses MDEA as the amine. The resulting concentrations of components for selected streams are shown in Table 7.

TABLE 7

Heat and Mass Balance of Streams for Example 5.

| Stream | 100 | 112 | 110 |
|---|---|---|---|
| C1 | 0.0028 | 0.0000 | 0.0000 |
| C2 | 0.0014 | 0.0000 | 0.0000 |
| CO2 | 0.6915 | 0.0000 | 0.2029 |
| H2S | 0.2276 | 0.0000 | 0.0051 |
| N2 | 0.0000 | 0.0000 | 0.5091 |
| H2O | 0.0762 | 0.0645 | 0.2721 |
| O2 | 0.0000 | 0.0000 | 0.0000 |
| SO2 | 0.0000 | 0.0000 | 0.0000 |
| S2 | 0.0000 | 0.0000 | 0.0000 |
| S-Vap | 0.0000 | 0.0000 | 0.0000 |
| S-Liq | 0.0000 | 0.9355 | 0.0000 |
| Benzene | 0.0000 | 0.0000 | 0.0000 |
| Toluene | 0.0000 | 0.0000 | 0.0000 |
| Xylene | 0.0000 | 0.0000 | 0.0000 |
| E-Benzene | 0.0000 | 0.0000 | 0.0000 |
| COS | 0.0000 | 0.0000 | 0.0000 |
| CS2 | 0.0000 | 0.0000 | 0.0000 |
| H2 | 0.0000 | 0.0000 | 0.0084 |
| CO | 0.0000 | 0.0000 | 0.0024 |
| %S/Sfd | 100.00 | 98.11 | 1.88 |
| Molar Flow (MMSCFD) | 65 | 16 | 55 |
| Mass Flow (lb/hr) | 284243 | 53291 | 171106 |
| Pressure (psig) | 16 | 16 | 16 |
| Temp (° F.) | 135.0 | 342.2 | 278.0 |
| Comp (MW) | 1.5 | 1.5 | 1.5 |

The overall recovery of sulfur in Example 5 was 98.1%.

Example 6

Example 6 was simulated based on the configuration embodied in FIG. 6 and described previously. The simulation was based on sulfur recovery unit 10 having three Claus catalytic stages. The reaction furnace temperature outlet was 2096.6° F. (1147° C.). The membrane in hydrogen sulfide membrane 30 was a hydrogen sulfide-selective membrane with the permeability specified in Table 2 and with a total area of 31,399 m². Hydrogen sulfide membrane 30 is in the absence of a sweep air stream. The pressure of membrane feed 120 was 16 psig (280.6 kPa). The permeate pressure was set at −10 psig (32.4 kPa). Enrichment unit 40 uses MDEA as the amine. The resulting concentrations of components for selected streams are shown in Table 8.

TABLE 8

Heat and Mass Balance of Streams for Example 6.

| Stream | 100 | 134 | 112 | 130 |
|---|---|---|---|---|
| C1 | 0.0028 | 0.0000 | 0.0000 | 0.0000 |
| C2 | 0.0014 | 0.0000 | 0.0000 | 0.0000 |
| CO2 | 0.6915 | 0.4997 | 0.0000 | 0.2496 |
| H2S | 0.2276 | 0.0247 | 0.0000 | 0.0051 |
| N2 | 0.0000 | 0.1833 | 0.0000 | 0.6950 |
| H2O | 0.0762 | 0.2401 | 0.0650 | 0.0396 |
| O2 | 0.0000 | 0.0000 | 0.0000 | 0.0000 |
| SO2 | 0.0000 | 0.0000 | 0.0000 | 0.0000 |
| S2 | 0.0000 | 0.0000 | 0.0000 | 0.0000 |
| S-Vap | 0.0000 | 0.0000 | 0.0000 | 0.0000 |
| S-Liq | 0.0000 | 0.0000 | 0.9350 | 0.0000 |
| Benzene | 0.0000 | 0.0000 | 0.0000 | 0.0000 |
| Toluene | 0.0000 | 0.0000 | 0.0000 | 0.0000 |
| Xylene | 0.0000 | 0.0000 | 0.0000 | 0.0000 |
| E-Benzene | 0.0000 | 0.0000 | 0.0000 | 0.0000 |
| COS | 0.0000 | 0.0000 | 0.0000 | 0.0000 |
| CS2 | 0.0000 | 0.0000 | 0.0000 | 0.0000 |
| H2 | 0.0000 | 0.0402 | 0.0000 | 0.0083 |
| CO | 0.0000 | 0.0121 | 0.0000 | 0.0025 |
| %S/Sfd | 100.00 | 0.56 | 98.64 | 1.35 |
| Molar Flow (MMSCFD) | 65 | 3 | 16 | 40 |
| Mass Flow (lb/hr) | 284243 | 12051 | 53595 | 136670 |
| Pressure (psig) | 16 | 16 | 16 | 16 |
| Temp (° F.) | 135.0 | 531.5 | 342.2 | 124.8 |
| Comp (MW) | 1.9 | 1.9 | 1.9 | 1.9 |

The overall recovery of sulfur in Example 6 was 98.6%.

Example 7

Example 7 was simulated based on the configuration embodied in FIG. 5 and described previously. The simulation was based on sulfur recovery unit 10 having three Claus catalytic stages. The reaction furnace temperature outlet is 2042.8° F. (1117.1° C.). The membrane in hydrogen sulfide membrane 30 was a hydrogen sulfide-selective membrane with the permeability specified in Table 2 and with a total area of 31,399 m². Carbon dioxide rich stream 402 is used as the sweep for hydrogen sulfide membrane 30. The pressure of membrane feed 120 was 16 psig (280.6 kPa). The permeate pressure was set at 1 psig (108 kPa). Enrichment unit 40 uses MDEA as the amine. The resulting concentrations of components for selected streams are shown in Table 9.

TABLE 9

Heat and Mass Balance of Streams for Example 7.

| Stream | 100 | 134 | 112 | 130 | 402 |
|---|---|---|---|---|---|
| C1 | 0.0028 | 0.0040 | 0.0000 | 0.0002 | 0.0048 |
| C2 | 0.0014 | 0.0017 | 0.0000 | 0.0001 | 0.0024 |
| CO2 | 0.6915 | 0.7523 | 0.0000 | 0.3150 | 0.8746 |
| H2S | 0.2276 | 0.0095 | 0.0000 | 0.0045 | 0.0000 |
| N2 | 0.0000 | 0.1051 | 0.0000 | 0.6170 | 0.0203 |
| H2O | 0.0762 | 0.1055 | 0.0640 | 0.0530 | 0.0930 |
| O2 | 0.0000 | 0.0000 | 0.0000 | 0.0000 | 0.0000 |
| SO2 | 0.0000 | 0.0000 | 0.0000 | 0.0000 | 0.0000 |
| S2 | 0.0000 | 0.0000 | 0.0000 | 0.0000 | 0.0000 |
| S-Vap | 0.0000 | 0.0000 | 0.0000 | 0.0000 | 0.0000 |
| S-Liq | 0.0000 | 0.0000 | 0.9359 | 0.0000 | 0.0000 |
| Benzene | 0.0000 | 0.0000 | 0.0000 | 0.0000 | 0.0001 |
| Toluene | 0.0000 | 0.0000 | 0.0000 | 0.0000 | 0.0000 |
| Xylene | 0.0000 | 0.0000 | 0.0000 | 0.0000 | 0.0000 |
| E-Benzene | 0.0000 | 0.0000 | 0.0000 | 0.0000 | 0.0000 |
| COS | 0.0000 | 0.0000 | 0.0000 | 0.0000 | 0.0000 |
| CS2 | 0.0000 | 0.0000 | 0.0000 | 0.0000 | 0.0000 |
| H2 | 0.0000 | 0.0158 | 0.0000 | 0.0075 | 0.0030 |
| CO | 0.0000 | 0.0055 | 0.0000 | 0.0026 | 0.0011 |
| %S/Sfd | 100.00 | 0.55 | 98.66 | 1.34 | 0.00 |
| Molar Flow (MMSCFD) | 65 | 9 | 16 | 44 | 9 |
| Mass Flow (lb/hr) | 284243 | 36541 | 53571 | 157957 | 39807 |
| Pressure (psig) | 16 | 16 | 16 | 16 | 1 |
| Temp (° F.) | 135.0 | 248.0 | 341.9 | 120.0 | 125.0 |
| Comp (MW) | 1.6 | 1.6 | 1.6 | 1.6 | 1.6 |

The overall recovery of sulfur in Example 7 was 98.7%.

Example 8

Example 8 was simulated based on the configuration embodied in FIG. 5 and described previously. The simulation was based on sulfur recovery unit 10 having three Claus catalytic stages. The reaction furnace temperature outlet is 1941.3° F. (1060.7° C.). The membrane in hydrogen sulfide membrane 30 was a hydrogen sulfide-selective membrane with the permeability specified in Table 2 and with a total area of 31,399 m². Carbon dioxide rich stream 402 is used as the sweep for hydrogen sulfide membrane 30. The pressure of membrane feed 120 was 16 psig (280.6 kPa). The permeate pressure was set at 1 psig (108 kPa). The difference between Example 7 and Example 8 is the flowrate of 402. Enrichment unit 40 uses MDEA as the amine. The resulting concentrations of components for selected streams are shown in Table 10.

TABLE 10

Heat and Mass Balance of Streams for Example 8.

| Stream | 100 | 134 | 112 | 130 | 402 |
|---|---|---|---|---|---|
| C1 | 0.0028 | 0.0049 | 0.0000 | 0.0002 | 0.0052 |
| C2 | 0.0014 | 0.0023 | 0.0000 | 0.0001 | 0.0026 |
| CO2 | 0.6915 | 0.8307 | 0.0000 | 0.3492 | 0.8767 |
| H2S | 0.2276 | 0.0058 | 0.0000 | 0.0039 | 0.0000 |
| N2 | 0.0000 | 0.0401 | 0.0000 | 0.5867 | 0.0160 |
| H2O | 0.0762 | 0.1010 | 0.0629 | 0.0513 | 0.0928 |
| O2 | 0.0000 | 0.0000 | 0.0000 | 0.0000 | 0.0000 |
| SO2 | 0.0000 | 0.0000 | 0.0000 | 0.0000 | 0.0000 |
| S2 | 0.0000 | 0.0000 | 0.0000 | 0.0000 | 0.0000 |
| S-Vap | 0.0000 | 0.0000 | 0.0000 | 0.0000 | 0.0000 |
| S-Liq | 0.0000 | 0.0000 | 0.9371 | 0.0000 | 0.0000 |
| Benzene | 0.0000 | 0.0000 | 0.0000 | 0.0000 | 0.0001 |
| Toluene | 0.0000 | 0.0000 | 0.0000 | 0.0000 | 0.0000 |
| Xylene | 0.0000 | 0.0000 | 0.0000 | 0.0000 | 0.0000 |
| E-Benzene | 0.0000 | 0.0000 | 0.0000 | 0.0000 | 0.0000 |
| COS | 0.0000 | 0.0000 | 0.0000 | 0.0000 | 0.0000 |
| CS2 | 0.0000 | 0.0000 | 0.0000 | 0.0000 | 0.0000 |
| H2 | 0.0000 | 0.0098 | 0.0000 | 0.0059 | 0.0039 |
| CO | 0.0000 | 0.0045 | 0.0000 | 0.0027 | 0.0018 |
| %S/Sfd | 100.00 | 0.86 | 98.76 | 1.23 | 0.00 |
| Molar Flow (MMSCFD) | 65 | 22 | 16 | 47 | 22 |
| Mass Flow (lb/hr) | 284243 | 95981 | 53588 | 170705 | 97381 |
| Pressure (psig) | 16 | 16 | 16 | 16 | 1 |
| Temp (° F.) | 135.0 | 245.3 | 341.4 | 120.0 | 125.0 |
| Comp (MW) | 2.1 | 2.1 | 2.1 | 2.1 | 2.1 |

The overall recovery of sulfur in Example 8 was 98.7%.

Example 9

Example 9 was simulated based on the configuration embodied in FIG. 9 and described previously. The simulation was based on sulfur recovery unit 10 having three Claus catalytic stages. Hydrogen sulfide recycle 302 was mixed with enriched feed 400 and hydrogen sulfide retentate 500 to produce hydrogen sulfide rich feed 900 and hydrogen sulfide rich feed 900 is introduced to carbon dioxide membrane unit 50. The reaction furnace temperature outlet is 2091.5° F. (1144.2° C.). The membrane in hydrogen sulfide membrane 30 was a hydrogen sulfide-selective membrane with the permeability specified in Table 2 and with a total area of 36,600 m². Hydrogen sulfide membrane 30 is in the absence of a sweep stream. The pressure of membrane feed 120 was 20 psig (137.9 kPa). The permeate pressure in hydrogen sulfide recycle 302 was set at 0 psig (kPa). The membrane in carbon dioxide membrane unit 50 was a carbon dioxide-selective membrane with the permeability specified in Table 2 and with a total area of 106,700 m². The permeate pressure in carbon dioxide rich permeate 502 is 0 psig. The feed pressure in acid gas feed 100 was simulated to have been increased from 16.0 psig to 35 psig with the use of a compressor (not shown) to provide the driving force for separation in carbon dioxide membrane unit 50. Enrichment unit 40 uses MDEA as the amine. The resulting concentrations of components for selected streams are shown in Table 11.

TABLE 11

Heat and Mass Balance of Streams for Example 9.

| Stream | 100 | 300 | 502 | 402 | 900 | 130 | 120 | 134 |
|---|---|---|---|---|---|---|---|---|
| C1 | 0.001 | 0.000 | 0.000 | 0.0003 | 0.001 | 0.000 | 0.000 | 0.000 |
| C2 | 0.000 | 0.000 | 0.000 | 0.0001 | 0.000 | 0.000 | 0.000 | 0.000 |
| C3 | 0.000 | 0.000 | 0.000 | 0.0000 | 0.000 | 0.000 | 0.000 | 0.000 |
| CO2 | 0.639 | 0.000 | 0.865 | 0.9993 | 0.394 | 0.215 | 0.258 | 0.556 |
| H2S | 0.330 | 0.000 | 0.097 | 0.0002 | 0.510 | 0.003 | 0.006 | 0.021 |
| N2 | 0.000 | 0.792 | 0.000 | 0.0000 | 0.061 | 0.755 | 0.679 | 0.295 |
| O2 | 0.000 | 0.198 | 0.000 | 0.0000 | 0.000 | 0.000 | 0.000 | 0.000 |
| H2O | 0.031 | 0.010 | 0.037 | 0.0000 | 0.021 | 0.010 | 0.037 | 0.060 |
| S-Liq | 0.000 | 0.000 | 0.000 | 0.0000 | 0.000 | 0.000 | 0.000 | 0.000 |
| SO2 | 0.000 | 0.000 | 0.000 | 0.0000 | 0.000 | 0.000 | 0.000 | 0.000 |
| COS | 0.000 | 0.000 | 0.000 | 0.0000 | 0.000 | 0.000 | 0.000 | 0.000 |
| CS2 | 0.000 | 0.000 | 0.000 | 0.0000 | 0.000 | 0.000 | 0.000 | 0.000 |
| H2 | 0.000 | 0.000 | 0.000 | 0.0000 | 0.013 | 0.012 | 0.020 | 0.067 |
| S2 | 0.000 | 0.000 | 0.000 | 0.0000 | 0.000 | 0.000 | 0.000 | 0.000 |
| Molar Flow (MMSCFD) | 45.56 | 36.36 | 28.14 | 20.79 | 29.63 | 38.15 | 45.04 | 6.09 |
| Pressure (psig) | 16.0 | 16.0 | 20.0 | 20.0 | 20.0 | 60.0 | 20.0 | 0.0 |
| Temp (° F.) | 120.0 | 299.0 | 110.0 | 100.0 | 123.5 | 109.2 | 110.0 | 109.4 |
| Comp (MW) | 5.12 | 5.12 | 5.12 | 5.12 | 5.12 | 5.12 | 5.12 | 5.12 |

The overall recovery of sulfur in Example 9 was 99.1%.

Example 10

Example 10 was simulated based on the configuration embodied in FIG. 10 and described previously. The simulation was based on sulfur recovery unit 10 having three Claus catalytic stages. Hydrogen sulfide recycle 302 was mixed with acid gas feed 100 to produce mixed feed 700 and mixed feed 700 is introduced to carbon dioxide membrane unit 50. The reaction furnace temperature outlet is 2180.2° F. (1193.4° C.). The membrane in hydrogen sulfide membrane 30 was a hydrogen sulfide-selective membrane with the permeability specified in Table 2 and with a total area of 36,600 m². The membrane in carbon dioxide membrane unit 50 was a carbon dioxide-selective membrane with the permeability specified in Table 2 and with a total area of 112,800 m². Hydrogen sulfide membrane 30 is in the absence of a sweep stream. The pressure of membrane feed 120 was 20 psig (137.9 kPa). The permeate pressure in hydrogen sulfide recycle 302 was set at 0 psig (101.3 kPa). The feed pressure in acid gas feed 100 was simulated to have been increased from 16.0 psig to 35 psig with the use of a compressor (not shown) to provide the driving force for separation in carbon dioxide membrane unit 50. The permeate pressure in carbon dioxide rich permeate 502 was set at 0 psig. Enrichment unit 40 uses MDEA as the amine. The resulting concentrations of components for selected streams are shown in Table 12.

TABLE 12

Heat and Mass Balance of Streams for Example 10.

| Stream | 100 | 300 | 502 | 402 | 1000 | 130 | 120 | 134 |
|---|---|---|---|---|---|---|---|---|
| CO2 | 0.638 | 0 | 0.85 | 0.95 | 0.36 | 0.18 | 0.23 | 0.51 |
| H2S | 0.32 | 0 | 0.07 | 0.0 | 0.55 | 0.0 | 0.0 | 0.02 |
| N2 | 0 | 0.79 | 0.03 | 0.04 | 0.04 | 0.78 | 0.70 | 0.33 |
| O2 | 0 | 0.198 | 0 | 0 | 0 | 0 | 0 | 0 |
| H2O | 0.03 | 0.01 | 0.03 | 0.0 | 0.01 | 0.01 | 0.03 | 0.05 |
| S-Liq | 0 | 0 | 0 | 0 | 0 | 0 | 0 | 0 |
| SO2 | 0 | 0 | 0 | 0 | 0 | 0 | 0 | 0 |
| COS | 0 | 0 | 0 | 0 | 0 | 0 | 0 | 0 |
| CS2 | 0 | 0 | 0 | 0 | 0 | 0 | 0 | 0 |
| H2 | 0 | 0 | 0.002 | 0 | 0.013 | 0.012 | 0.02 | 0.07 |
| S2 | 0 | 0 | 0 | 0 | 0 | 0 | 0 | 0 |
| Molar Flow (MMSCFD) | 45.63 | 36.4 | 30.55 | 23.4 | 27.2 | 35.5 | 42.8 | 6.46 |
| Pressure (psig) | 16 | 16 | 20 | 20 | 20 | 60 | 20 | 35 |
| Temp (° F.) | 120 | 299.0 | 110 | 100 | 127.7 | 109.1 | 110 | 358.5 |
| Comp (MW) | 5.09 | 5.09 | 5.09 | 5.09 | 5.09 | 5.09 | 5.09 | 5.09 |

The overall recovery of sulfur in Example 10 was 99.1%.

Example 11

Example 11 was simulated based on the configuration embodied in FIG. 7 and described previously. The simulation was based on sulfur recovery unit 10 having three Claus catalytic stages. The reaction furnace temperature outlet is 2138.6° F. (1170.3° C.). Hydrogen sulfide recycle 302 was mixed with acid gas feed 100 to produce mixed feed 700 and mixed feed 700 is introduced to enrichment unit 40. The reaction furnace temperature outlet is 2180.2° F. (1193.4° C.). The membrane in hydrogen sulfide membrane 30 was a hydrogen sulfide-selective membrane with the permeability specified in Table 2 and with a total area of 42,700 m². Hydrogen sulfide membrane 30 is in the absence of a sweep stream. The pressure of membrane feed 120 was 20 psig (137.9 kPa). The permeate pressure in hydrogen sulfide recycle 302 was set at 0 psig (101.3 kPa). Enrichment unit 40 uses MDEA as the amine. The resulting concentrations of components for selected streams are shown in Table 13.

TABLE 13

Heat and Mass Balance of Streams for Example 11.

| Stream | 100 | 300 | 700 | 402 | 400 | 130 | 120 | 134 |
|---|---|---|---|---|---|---|---|---|
| C1 | 0.001 | 0.000 | 0.000 | 0.0010 | 0.000 | 0.000 | 0.000 | 0.000 |
| C2 | 0.000 | 0.000 | 0.000 | 0.0002 | 0.000 | 0.000 | 0.000 | 0.000 |
| C3 | 0.000 | 0.000 | 0.000 | 0.0002 | 0.000 | 0.000 | 0.000 | 0.000 |
| CO2 | 0.639 | 0.000 | 0.632 | 0.9101 | 0.408 | 0.209 | 0.263 | 0.569 |
| H2S | 0.330 | 0.000 | 0.291 | 0.0002 | 0.555 | 0.004 | 0.007 | 0.022 |
| N2 | 0.000 | 0.792 | 0.041 | 0.0883 | 0.000 | 0.767 | 0.682 | 0.313 |
| O2 | 0.000 | 0.198 | 0.000 | 0.0000 | 0.000 | 0.000 | 0.000 | 0.000 |
| H2O | 0.031 | 0.010 | 0.032 | 0.0000 | 0.037 | 0.009 | 0.037 | 0.058 |
| S-Liq | 0.000 | 0.000 | 0.000 | 0.0000 | 0.000 | 0.000 | 0.000 | 0.000 |
| SO2 | 0.000 | 0.000 | 0.000 | 0.0000 | 0.000 | 0.000 | 0.000 | 0.000 |
| COS | 0.000 | 0.000 | 0.000 | 0.0000 | 0.000 | 0.000 | 0.000 | 0.000 |

TABLE 13-continued

Heat and Mass Balance of Streams for Example 11.

| Stream | 100 | 300 | 700 | 402 | 400 | 130 | 120 | 134 |
|---|---|---|---|---|---|---|---|---|
| CS2 | 0.000 | 0.000 | 0.000 | 0.0000 | 0.000 | 0.000 | 0.000 | 0.000 |
| H2 | 0.000 | 0.000 | 0.005 | 0.0000 | 0.000 | 0.007 | 0.012 | 0.038 |
| S2 | 0.000 | 0.000 | 0.000 | 0.0000 | 0.000 | 0.000 | 0.000 | 0.000 |
| Molar Flow (MMSCFD) | 45.63 | 36.09 | 52.25 | 23.97 | 27.38 | 34.50 | 41.92 | 6.76 |
| Pressure (psig) | 16.0 | 16.0 | 20.0 | 20.0 | 20.0 | 60.0 | 20.0 | 0.0 |
| Temp (° F.) | 120.0 | 299.0 | 110.0 | 100.0 | 110.0 | 109.1 | 110.0 | 109.1 |
| Comp (MW) | 2.60 | 2.60 | 2.60 | 2.60 | 2.60 | 2.60 | 2.60 | 2.60 |

The overall recovery of sulfur in Example 11 was 98.2%.

Example 12

Example 12 was simulated based on the configuration embodied in FIG. 8 and described previously. The simulation was based on sulfur recovery unit 10 having three Claus catalytic stages. The reaction furnace temperature outlet is 2063.8° F. (1128.8° C.). Hydrogen sulfide recycle 302 was mixed with enriched feed 400 to produce mixed enriched feed 800 and mixed enriched feed 800 is introduced to the reaction furnace of enrichment unit 40. The membrane in hydrogen sulfide membrane 30 was a hydrogen sulfide-selective membrane with the permeability specified in Table 2 and with a total area of 21,300 m$^2$. Hydrogen sulfide membrane 30 is in the absence of a sweep stream. The pressure of membrane feed 120 was 20 psig (137.9 kPa). The permeate pressure in hydrogen sulfide recycle 302 was set at 0 psig (101.3 kPa). Enrichment unit 40 uses MDEA as the amine. The resulting concentrations of components for selected streams are shown in Table 14.

TABLE 14

Heat and Mass Balance of Streams for Example 12.

| Stream | 100 | 300 | 402 | 800 | 130 | 120 | 134 |
|---|---|---|---|---|---|---|---|
| C1 | 0.001 | 0.000 | 0.0012 | 0.000 | 0.000 | 0.000 | 0.000 |
| C2 | 0.000 | 0.000 | 0.0002 | 0.000 | 0.000 | 0.000 | 0.000 |
| C3 | 0.000 | 0.000 | 0.0002 | 0.000 | 0.000 | 0.000 | 0.000 |
| CO2 | 0.639 | 0.000 | 0.9981 | 0.412 | 0.249 | 0.274 | 0.589 |
| H2S | 0.330 | 0.000 | 0.0002 | 0.509 | 0.005 | 0.006 | 0.023 |
| N2 | 0.000 | 0.792 | 0.0000 | 0.034 | 0.718 | 0.667 | 0.267 |
| O2 | 0.000 | 0.198 | 0.0000 | 0.000 | 0.000 | 0.000 | 0.000 |
| H2O | 0.031 | 0.010 | 0.0000 | 0.037 | 0.012 | 0.037 | 0.065 |
| S-Liq | 0.000 | 0.000 | 0.0000 | 0.000 | 0.000 | 0.000 | 0.000 |
| SO2 | 0.000 | 0.000 | 0.0000 | 0.000 | 0.000 | 0.000 | 0.000 |
| COS | 0.000 | 0.000 | 0.0000 | 0.000 | 0.000 | 0.000 | 0.000 |
| CS2 | 0.000 | 0.000 | 0.0000 | 0.000 | 0.000 | 0.000 | 0.000 |
| H2 | 0.000 | 0.000 | 0.0000 | 0.007 | 0.012 | 0.015 | 0.056 |
| S2 | 0.000 | 0.000 | 0.0000 | 0.000 | 0.000 | 0.000 | 0.000 |
| Molar Flow (MMSCFD) | 45.63 | 35.93 | 19.18 | 29.73 | 39.63 | 44.18 | 3.83 |
| Pressure (psig) | 16.0 | 16.0 | 20.0 | 20.0 | 60.0 | 20.0 | 0.0 |
| Temp (° F.) | 120.0 | 299.0 | 100.0 | 110.0 | 109.5 | 110.0 | 109.6 |
| Comp (MW) | 2.56 | 2.56 | 2.56 | 2.56 | 2.56 | 2.56 | 2.56 |

The overall recovery of sulfur in Example 12 was 98.7%. As compared to Example 11, the carbon dioxide recovery is reduced, but advantageously, the nitrogen concentration in carbon dioxide rich stream 402 is reduced. Nitrogen is an inert gas and can reduce the flame temperature in the reaction furnace of sulfur recovery unit 10 resulting in less efficient sulfur recovery in sulfur recovery unit 10.

Example 13

Figure 13:
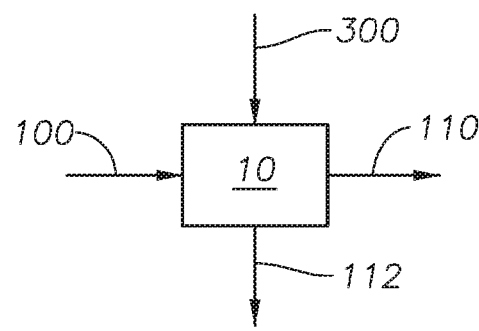
FIG. 13 is a process flow diagram of a sulfur recovery unit.

Example 13 was simulated based on the configuration embodied in FIG. 13 with reference to FIG. 1 described previously and is a comparative example. The simulation was based on sulfur recovery unit 10 having three Claus catalytic stages. The reaction furnace temperature outlet is 2251.2° F. (1232.9° C.). Example 13 is in the absence of a reducing unit and membranes. The resulting concentrations of components for selected streams are shown in Table 15.

TABLE 15

Heat and Mass Balance of Streams for Example 13.

| Stream | 100 | 300 | 110 | 112 |
|---|---|---|---|---|
| C1 | 0.0000 | 0.0000 | 0.0000 | 0.0000 |
| C2 | 0.0000 | 0.0000 | 0.0000 | 0.0000 |
| CO2 | 0.3347 | 0.0000 | 0.1545 | 0.0000 |
| H2S | 0.6168 | 0.0000 | 0.0061 | 0.0000 |
| N2 | 0.0000 | 0.7921 | 0.5457 | 0.0000 |
| H2O | 0.0442 | 0.0099 | 0.2739 | 0.0698 |
| O2 | 0.0000 | 0.1980 | 0.0000 | 0.0000 |
| SO2 | 0.0000 | 0.0000 | 0.0030 | 0.0000 |

TABLE 15-continued

Heat and Mass Balance of Streams for Example 13.

| Stream | 100 | 300 | 110 | 112 |
|---|---|---|---|---|
| S2 | 0.0000 | 0.0000 | 0.0000 | 0.0000 |
| S-Vap | 0.0000 | 0.0000 | 0.0000 | 0.0000 |

TABLE 15-continued

Heat and Mass Balance of Streams for Example 13.

| Stream | 100 | 300 | 110 | 112 |
|---|---|---|---|---|
| S-Liq | 0.0000 | 0.0000 | 0.0000 | 0.9301 |
| Benzene | 0.0013 | 0.0000 | 0.0000 | 0.0000 |
| Toluene | 0.0012 | 0.0000 | 0.0000 | 0.0000 |
| Xylene | 0.0000 | 0.0000 | 0.0000 | 0.0000 |
| E-Benzene | 0.0001 | 0.0000 | 0.0000 | 0.0000 |
| COS | 0.0000 | 0.0000 | 0.0004 | 0.0000 |
| CS2 | 0.0016 | 0.0000 | 0.0003 | 0.0000 |
| H2 | 0.0000 | 0.0000 | 0.0142 | 0.0000 |
| CO | 0.0000 | 0.0000 | 0.0019 | 0.0000 |
| %S/Sfd | 100.00 | 0.00 | 3.49 | 96.51 |
| Molar Flow (MMSCFD) | 65 | 97 | 140 | 42 |
| Mass Flow (lb/hr) | 264377 | 304147 | 425291 | 143253 |
| Pressure (psig) | 16 | 16 | 16 | 16 |
| Temp (° F.) | 135.0 | 316.7 | 260.6 | 340.3 |
| Comp (MW) | 4.0 | 4.0 | 4.0 | 4.0 |

The overall recovery of sulfur in Example 13 was 96.5%.

Example 14

Example 14 was simulated based on the configuration embodied in FIGS. 1 and 1a and described previously. The simulation was based on sulfur recovery unit 10 having three Claus catalytic stages. The reaction furnace temperature outlet is 2129.3° F. (1165.2° C.). The membrane in hydrogen sulfide membrane 30 was a hydrogen sulfide-selective membrane with the permeability specified in Table 2 and with a total area of 61,642 m². Air in sweep air feed 132 acted as the sweep air for hydrogen sulfide membrane 30. The resulting concentrations of components for selected streams are shown in Table 16.

TABLE 16

Heat and Mass Balance of Streams for Example 14.

| Stream | 100 | 300 | 126 | 120 | 134 | 112 | 130 |
|---|---|---|---|---|---|---|---|
| C1 | 0.0000 | 0.0000 | 0.0000 | 0.0000 | 0.0000 | 0.0000 | 0.0000 |
| C2 | 0.0000 | 0.0000 | 0.0000 | 0.0000 | 0.0000 | 0.0000 | 0.0000 |
| CO2 | 0.3347 | 0.0000 | 0.1680 | 0.2221 | 0.0340 | 0.0000 | 0.2062 |
| H2S | 0.6168 | 0.0000 | 0.0095 | 0.0125 | 0.0059 | 0.0000 | 0.0075 |
| N2 | 0.0000 | 0.7921 | 0.5249 | 0.6942 | 0.7316 | 0.0000 | 0.7482 |
| H2O | 0.0442 | 0.0099 | 0.2857 | 0.0554 | 0.0419 | 0.0724 | 0.0263 |
| O2 | 0.0000 | 0.1980 | 0.0000 | 0.0000 | 0.1791 | 0.0000 | 0.0024 |
| SO2 | 0.0000 | 0.0000 | 0.0000 | 0.0000 | 0.0000 | 0.0000 | 0.0000 |
| S2 | 0.0000 | 0.0000 | 0.0000 | 0.0000 | 0.0000 | 0.0000 | 0.0000 |
| S-Vap | 0.0000 | 0.0000 | 0.0000 | 0.0000 | 0.0000 | 0.0000 | 0.0000 |
| S-Liq | 0.0000 | 0.0000 | 0.0000 | 0.0000 | 0.0000 | 0.9275 | 0.0000 |
| Benzene | 0.0013 | 0.0000 | 0.0000 | 0.0000 | 0.0000 | 0.0000 | 0.0000 |
| Toluene | 0.0012 | 0.0000 | 0.0000 | 0.0000 | 0.0000 | 0.0000 | 0.0000 |
| Xylene | 0.0000 | 0.0000 | 0.0000 | 0.0000 | 0.0000 | 0.0000 | 0.0000 |
| E-Benzene | 0.0001 | 0.0000 | 0.0000 | 0.0000 | 0.0000 | 0.0000 | 0.0000 |
| COS | 0.0000 | 0.0000 | 0.0000 | 0.0000 | 0.0000 | 0.0000 | 0.0000 |
| CS2 | 0.0016 | 0.0000 | 0.0000 | 0.0000 | 0.0000 | 0.0000 | 0.0000 |
| H2 | 0.0000 | 0.0000 | 0.0083 | 0.0110 | 0.0052 | 0.0000 | 0.0066 |
| CO | 0.0000 | 0.0000 | 0.0036 | 0.0048 | 0.0023 | 0.0000 | 0.0029 |
| % S/Sfd | 100.00 | 0.00 | 3.54 | 3.54 | 1.59 | 98.05 | 1.95 |
| Molar Flow (MMSCFD) | 65 | 99 | 151 | 115 | 109 | 43 | 105 |
| Mass Flow (lb/hr) | 264377 | 312972 | 462068 | 389183 | 343450 | 145783 | 358703 |
| Pressure (psig) | 16 | 1 | 16 | 16 | 16 | 16 | 16 |
| Temperature (° F.) | 135.0 | 135.0 | 294.3 | 120.0 | 295.2 | 339.9 | 125.0 |
| Comp (MW) | 4.1 | 4.1 | 4.1 | 4.1 | 4.1 | 4.1 | 4.1 |
| H2S/CO2 | 4.4 | 4.4 | 4.4 | 4.4 | 4.4 | 4.4 | 4.4 |

The overall recovery of sulfur in Example 14 was 98.0%.

Example 15

Example 15 was simulated based on the configuration embodied in FIGS. 1 and 1a and described previously. The simulation was based on sulfur recovery unit 10 having three Claus catalytic stages. The reaction furnace temperature outlet is 1966.3° F. (1074.6° C.). The membrane in hydrogen sulfide membrane 30 was a hydrogen sulfide-selective membrane with the permeability specified in Table 2 and with a total area of 61,642 m². Sweep air feed 132 containing air was used as the sweep air for hydrogen sulfide membrane 30. The resulting concentrations of components for selected streams are shown in Table 17.

TABLE 17

Heat and Mass Balance of Streams for Example 15.

| Stream | 100 | 132 | 126 | 120 | 134 | 112 | 130 |
|---|---|---|---|---|---|---|---|
| C1 | 0.0000 | 0.0000 | 0.0000 | 0.0000 | 0.0000 | 0.0000 | 0.0000 |
| C2 | 0.0000 | 0.0000 | 0.0000 | 0.0000 | 0.0000 | 0.0000 | 0.0000 |
| CO2 | 0.3347 | 0.0000 | 0.2025 | 0.2576 | 0.0977 | 0.0000 | 0.2095 |
| H2S | 0.6168 | 0.0000 | 0.0097 | 0.0123 | 0.0106 | 0.0000 | 0.0029 |
| N2 | 0.0000 | 0.7921 | 0.4978 | 0.6335 | 0.6699 | 0.0000 | 0.7721 |
| H2O | 0.0442 | 0.0099 | 0.2579 | 0.0556 | 0.0274 | 0.0653 | 0.0035 |
| O2 | 0.0000 | 0.1980 | 0.0000 | 0.0000 | 0.1591 | 0.0000 | 0.0022 |
| SO2 | 0.0000 | 0.0000 | 0.0000 | 0.0000 | 0.0000 | 0.0000 | 0.0000 |
| S2 | 0.0000 | 0.0000 | 0.0000 | 0.0000 | 0.0000 | 0.0000 | 0.0000 |
| S-Vap | 0.0000 | 0.0000 | 0.0000 | 0.0000 | 0.0000 | 0.0000 | 0.0000 |
| S-Liq | 0.0000 | 0.0000 | 0.0000 | 0.0000 | 0.0000 | 0.9347 | 0.0000 |
| Benzene | 0.0013 | 0.0000 | 0.0000 | 0.0000 | 0.0000 | 0.0000 | 0.0000 |
| Toluene | 0.0012 | 0.0000 | 0.0000 | 0.0000 | 0.0000 | 0.0000 | 0.0000 |
| Xylene | 0.0000 | 0.0000 | 0.0000 | 0.0000 | 0.0000 | 0.0000 | 0.0000 |
| E-Benzene | 0.0001 | 0.0000 | 0.0000 | 0.0000 | 0.0000 | 0.0000 | 0.0000 |
| COS | 0.0000 | 0.0000 | 0.0000 | 0.0000 | 0.0000 | 0.0000 | 0.0000 |
| CS2 | 0.0016 | 0.0000 | 0.0000 | 0.0000 | 0.0000 | 0.0000 | 0.0000 |
| H2 | 0.0000 | 0.0000 | 0.0192 | 0.0244 | 0.0210 | 0.0000 | 0.0058 |
| CO | 0.0000 | 0.0000 | 0.0130 | 0.0165 | 0.0142 | 0.0000 | 0.0039 |
| % S/Sfd | 100.00 | 0.00 | 3.99 | 4.00 | 3.25 | 99.26 | 0.74 |
| Molar Flow (MMSCFD) | 65 | 100 | 167 | 132 | 124 | 43 | 103 |
| Mass Flow (lb/hr) | 264377 | 316439 | 524116 | 453643 | 406633 | 146916 | 354511 |
| Pressure (psig) | 16 | 1 | 16 | 16 | 16 | 16 | 75 |
| Temperature (° F.) | 135.0 | 135.0 | 291.6 | 120.0 | 289.3 | 339.4 | 125.0 |
| Comp (MW) | 12.6 | 12.6 | 12.6 | 12.6 | 12.6 | 12.6 | 12.6 |
| H2S/CO2 | 4.4 | 4.4 | 4.4 | 4.4 | 4.4 | 4.4 | 4.4 |

The overall recovery of sulfur in Example 15 was 99.3%.

Example 16

Example 16 was simulated based on the configuration embodied in FIGS. 1 and 1a and described previously. The simulation was based on sulfur recovery unit 10 having three Claus catalytic stages. The reaction furnace temperature outlet is 2101.5° F. (1149.7° C.). The membrane in hydrogen sulfide membrane 30 was a hydrogen sulfide-selective membrane with the permeability specified in Table 2 and with a total area of 31,399 m². Sweep air feed 132 containing air was used as the sweep air for hydrogen sulfide membrane 30. The resulting concentrations of components for selected streams are shown in Table 18.

TABLE 18

Heat and Mass Balance of Streams for Example 16.

| Stream | 100 | 132 | 126 | 120 | 134 | 112 | 130 |
|---|---|---|---|---|---|---|---|
| C1 | 0.0000 | 0.0000 | 0.0000 | 0.0000 | 0.0000 | 0.0000 | 0.0000 |
| C2 | 0.0000 | 0.0000 | 0.0000 | 0.0000 | 0.0000 | 0.0000 | 0.0000 |
| CO2 | 0.3347 | 0.0000 | 0.1791 | 0.2325 | 0.0531 | 0.0000 | 0.2110 |
| H2S | 0.6168 | 0.0000 | 0.0089 | 0.0115 | 0.0077 | 0.0000 | 0.0050 |
| N2 | 0.0000 | 0.7921 | 0.5224 | 0.6784 | 0.7228 | 0.0000 | 0.7674 |
| H2O | 0.0442 | 0.0099 | 0.2726 | 0.0554 | 0.0258 | 0.0688 | 0.0059 |
| O2 | 0.0000 | 0.1980 | 0.0000 | 0.0000 | 0.1758 | 0.0000 | 0.0012 |
| SO2 | 0.0000 | 0.0000 | 0.0000 | 0.0000 | 0.0000 | 0.0000 | 0.0000 |
| S2 | 0.0000 | 0.0000 | 0.0000 | 0.0000 | 0.0000 | 0.0000 | 0.0000 |
| S-Vap | 0.0000 | 0.0000 | 0.0000 | 0.0000 | 0.0000 | 0.0000 | 0.0000 |
| S-Liq | 0.0000 | 0.0000 | 0.0000 | 0.0000 | 0.0000 | 0.9312 | 0.0000 |
| Benzene | 0.0013 | 0.0000 | 0.0000 | 0.0000 | 0.0000 | 0.0000 | 0.0000 |
| Toluene | 0.0012 | 0.0000 | 0.0000 | 0.0000 | 0.0000 | 0.0000 | 0.0000 |
| Xylene | 0.0000 | 0.0000 | 0.0000 | 0.0000 | 0.0000 | 0.0000 | 0.0000 |
| E-Benzene | 0.0001 | 0.0000 | 0.0000 | 0.0000 | 0.0000 | 0.0000 | 0.0000 |
| COS | 0.0000 | 0.0000 | 0.0000 | 0.0000 | 0.0000 | 0.0000 | 0.0000 |
| CS2 | 0.0016 | 0.0000 | 0.0000 | 0.0000 | 0.0000 | 0.0000 | 0.0000 |
| H2 | 0.0000 | 0.0000 | 0.0113 | 0.0146 | 0.0098 | 0.0000 | 0.0063 |
| CO | 0.0000 | 0.0000 | 0.0057 | 0.0075 | 0.0050 | 0.0000 | 0.0032 |
| % S/Sfd | 100.00 | 0.00 | 3.39 | 3.39 | 2.12 | 98.74 | 1.26 |
| Molar Flow (MMSCFD) | 65 | 99 | 154 | 119 | 112 | 43 | 103 |

TABLE 18-continued

Heat and Mass Balance of Streams for Example 16.

| Stream | 100 | 132 | 126 | 120 | 134 | 112 | 130 |
|---|---|---|---|---|---|---|---|
| Mass Flow (lb/hr) | 264378 | 313287 | 476104 | 406085 | 358167 | 146463 | 353122 |
| Pressure (psig) | 16 | 1 | 16 | 16 | 16 | 16 | 75 |
| Temp (° F.) | 135.0 | 135.0 | 294.3 | 120.0 | 293.7 | 339.7 | 125.0 |
| Comp (MW) | 11.4 | 11.4 | 11.4 | 11.4 | 11.4 | 11.4 | 11.4 |
| H2S/CO2 | 4.4 | 4.4 | 4.4 | 4.4 | 4.4 | 4.4 | 4.4 |

The overall recovery of sulfur in Example 16 was 98.7%. The sulfur recovery system according to the embodiment in Example 16 had a greater overall recovery of sulfur than the sulfur recovery system according to the embodiment in Example 13.

Example 17

Example 17 was simulated based on the configuration embodied in FIG. 13 with reference to FIG. 1 described previously and is a comparative example. The simulation was based on sulfur recovery unit 10 having three Claus catalytic stages. The reaction furnace temperature outlet is 2649.7° F. (1454.3° C.). Example 17 is in the absence of a reducing unit and membranes. The resulting concentrations of components for selected streams are shown in Table 19.

TABLE 19

Heat and Mass Balance of Streams for Example 17.

| Stream | 100 | 300 | 110 | 112 |
|---|---|---|---|---|
| C1 | 0.0000 | 0.0000 | 0.0000 | 0.0000 |
| C2 | 0.0000 | 0.0000 | 0.0000 | 0.0000 |
| CO2 | 0.0914 | 0.0000 | 0.0338 | 0.0000 |
| H2S | 0.9085 | 0.0000 | 0.0073 | 0.0000 |
| N2 | 0.0000 | 0.7921 | 0.6413 | 0.0000 |
| H2O | 0.0000 | 0.0099 | 0.2946 | 0.0744 |
| O2 | 0.0000 | 0.1980 | 0.0000 | 0.0000 |
| SO2 | 0.0000 | 0.0000 | 0.0039 | 0.0000 |
| S2 | 0.0000 | 0.0000 | 0.0000 | 0.0000 |
| S-Vap | 0.0000 | 0.0000 | 0.0000 | 0.0000 |
| S-Liq | 0.0000 | 0.0000 | 0.0000 | 0.9255 |
| Benzene | 0.0000 | 0.0000 | 0.0000 | 0.0000 |
| Toluene | 0.0000 | 0.0000 | 0.0000 | 0.0000 |
| Xylene | 0.0000 | 0.0000 | 0.0000 | 0.0000 |
| E-Benzene | 0.0000 | 0.0000 | 0.0000 | 0.0000 |
| COS | 0.0000 | 0.0000 | 0.0001 | 0.0000 |
| CS2 | 0.0000 | 0.0000 | 0.0000 | 0.0000 |
| H2 | 0.0000 | 0.0000 | 0.0186 | 0.0000 |
| CO | 0.0000 | 0.0000 | 0.0004 | 0.0000 |
| %S/Sfd | 100.00 | 0.00 | 3.36 | 96.64 |
| Molar Flow (MMSCFD) | 65 | 142 | 175 | 62 |
| Mass Flow (lb/hr) | 250692 | 446923 | 486820 | 210823 |
| Pressure (psig) | 16 | 16 | 16 | 16 |
| Temp (° F.) | 135.0 | 316.7 | 260.6 | 340.0 |
| Comp (MW) | 5.9 | 5.9 | 5.9 | 5.9 |

The overall recovery of sulfur in Example 17 was 96.6%.

Example 18

Example 18 was simulated based on the configuration embodied in FIGS. 1 and 1a described previously. The simulation was based on sulfur recovery unit 10 having three Claus catalytic stages. The reaction furnace temperature outlet is 2545.5° F. (1396.4° C.). The membrane in hydrogen sulfide membrane 30 was a hydrogen sulfide-selective membrane with the permeability specified in Table 2 and with a total area of 82,831 m². Sweep air feed 132 containing air was used as the sweep air for hydrogen sulfide membrane 30. The resulting concentrations of components for selected streams are shown in Table 20.

TABLE 20

Heat and Mass Balance of Streams for Example 18.

| Stream | 100 | 132 | 120 | 134 | 112 | 130 |
|---|---|---|---|---|---|---|
| C1 | 0.0000 | 0.0000 | 0.0000 | 0.0000 | 0.0000 | 0.0000 |
| C2 | 0.0000 | 0.0000 | 0.0000 | 0.0000 | 0.0000 | 0.0000 |
| CO2 | 0.0914 | 0.0000 | 0.0520 | 0.0074 | 0.0000 | 0.0466 |
| H2S | 0.9085 | 0.0000 | 0.0145 | 0.0063 | 0.0000 | 0.0079 |
| N2 | 0.0000 | 0.7921 | 0.8578 | 0.7543 | 0.0000 | 0.9084 |
| H2O | 0.0000 | 0.0099 | 0.0552 | 0.0388 | 0.0772 | 0.0233 |
| O2 | 0.0000 | 0.1980 | 0.0000 | 0.1844 | 0.0000 | 0.0027 |
| SO2 | 0.0000 | 0.0000 | 0.0000 | 0.0000 | 0.0000 | 0.0000 |
| S2 | 0.0000 | 0.0000 | 0.0000 | 0.0000 | 0.0000 | 0.0000 |
| S-Vap | 0.0000 | 0.0000 | 0.0000 | 0.0000 | 0.0000 | 0.0000 |
| S-Liq | 0.0000 | 0.0000 | 0.0000 | 0.0000 | 0.9227 | 0.0000 |
| Benzene | 0.0000 | 0.0000 | 0.0000 | 0.0000 | 0.0000 | 0.0000 |
| Toluene | 0.0000 | 0.0000 | 0.0000 | 0.0000 | 0.0000 | 0.0000 |
| Xylene | 0.0000 | 0.0000 | 0.0000 | 0.0000 | 0.0000 | 0.0000 |
| E-Benzene | 0.0000 | 0.0000 | 0.0000 | 0.0000 | 0.0000 | 0.0000 |
| COS | 0.0000 | 0.0000 | 0.0000 | 0.0000 | 0.0000 | 0.0000 |
| CS2 | 0.0000 | 0.0000 | 0.0000 | 0.0000 | 0.0000 | 0.0000 |
| H2 | 0.0000 | 0.0000 | 0.0192 | 0.0083 | 0.0000 | 0.0105 |
| CO | 0.0000 | 0.0000 | 0.0012 | 0.0005 | 0.0000 | 0.0007 |
| % S/Sfd | 100.00 | 0.00 | 3.33 | 1.64 | 98.31 | 1.69 |
| Molar Flow (MMSCFD) | 65 | 146 | 136 | 155 | 63 | 127 |

TABLE 20-continued

Heat and Mass Balance of Streams for Example 18.

| Stream | 100 | 132 | 120 | 134 | 112 | 130 |
|---|---|---|---|---|---|---|
| Mass Flow (lb/hr) | 250692 | 459215 | 416256 | 480509 | 214835 | 394963 |
| Pressure (psig) | 16 | 1 | 16 | 16 | 16 | 16 |
| Temp (° F.) | 135.0 | 135.0 | 120.0 | 297.6 | 340.4 | 125.0 |
| Comp (MW) | 5.8 | 5.8 | 5.8 | 5.8 | 5.8 | 5.8 |
| H2S/CO2 | 4.4 | 4.4 | 4.4 | 4.4 | 4.4 | 4.4 |

The overall recovery of sulfur in Example 18 was 98.3%.

Example 19

Example 19 was simulated based on the configuration embodied in FIGS. 1 and 1a and described previously. The simulation was based on sulfur recovery unit 10 having three Claus catalytic stages. The reaction furnace temperature outlet is 2444.8° F. (1340.4° C.). The pressure of membrane feed 120 was 16 psig (280.6 kPa). The membrane in hydrogen sulfide membrane 30 was a hydrogen sulfide-selective membrane with the permeability specified in Table 2 and with a total area of 82,831 m². Sweep air feed 132 containing air was used as the sweep air for hydrogen sulfide membrane 30. The resulting concentrations of components for selected streams are shown in Table 21.

TABLE 21

Heat and Mass Balance of Streams for Example 19.

| Stream | 100 | 132 | 126 | 120 | 134 | 112 | 130 |
|---|---|---|---|---|---|---|---|
| C1 | 0.0000 | 0.0000 | 0.0000 | 0.0000 | 0.0000 | 0.0000 | 0.0000 |
| C2 | 0.0000 | 0.0000 | 0.0000 | 0.0000 | 0.0000 | 0.0000 | 0.0000 |
| CO2 | 0.0914 | 0.0000 | 0.0485 | 0.0641 | 0.0229 | 0.0000 | 0.0471 |
| H2S | 0.9085 | 0.0000 | 0.0097 | 0.0128 | 0.0098 | 0.0000 | 0.0023 |
| N2 | 0.0000 | 0.7921 | 0.6059 | 0.8010 | 0.7206 | 0.0000 | 0.9330 |
| H2O | 0.0000 | 0.0099 | 0.2853 | 0.0552 | 0.0253 | 0.0700 | 0.0029 |
| O2 | 0.0000 | 0.1980 | 0.0000 | 0.0000 | 0.1701 | 0.0000 | 0.0026 |
| SO2 | 0.0000 | 0.0000 | 0.0000 | 0.0000 | 0.0000 | 0.0000 | 0.0000 |
| S2 | 0.0000 | 0.0000 | 0.0000 | 0.0000 | 0.0000 | 0.0000 | 0.0000 |
| S-Vap | 0.0000 | 0.0000 | 0.0000 | 0.0000 | 0.0000 | 0.0000 | 0.0000 |
| S-Liq | 0.0000 | 0.0000 | 0.0000 | 0.0000 | 0.0000 | 0.9299 | 0.0000 |
| Benzene | 0.0000 | 0.0000 | 0.0000 | 0.0000 | 0.0000 | 0.0000 | 0.0000 |
| Toluene | 0.0000 | 0.0000 | 0.0000 | 0.0000 | 0.0000 | 0.0000 | 0.0000 |
| Xylene | 0.0000 | 0.0000 | 0.0000 | 0.0000 | 0.0000 | 0.0000 | 0.0000 |
| E-Benzene | 0.0000 | 0.0000 | 0.0000 | 0.0000 | 0.0000 | 0.0000 | 0.0000 |
| COS | 0.0000 | 0.0000 | 0.0000 | 0.0000 | 0.0000 | 0.0000 | 0.0000 |
| CS2 | 0.0000 | 0.0000 | 0.0000 | 0.0000 | 0.0000 | 0.0000 | 0.0000 |
| H2 | 0.0000 | 0.0000 | 0.0467 | 0.0617 | 0.0473 | 0.0000 | 0.0111 |
| CO | 0.0000 | 0.0000 | 0.0039 | 0.0052 | 0.0040 | 0.0000 | 0.0009 |
| % S/Sfd | 100.00 | 0.00 | 3.29 | 3.29 | 2.80 | 99.51 | 0.48 |
| Molar Flow (MMSCFD) | 65 | 147 | 202 | 152 | 169 | 63 | 125 |
| Mass Flow (lb/hr) | 250692 | 463785 | 548451 | 451345 | 514226 | 216498 | 390556 |
| Pressure (psig) | 16 | 1 | 16 | 16 | 16 | 16 | 75 |
| Temp (° F.) | 135.0 | 135.0 | 298.3 | 120.0 | 297.1 | 340.8 | 125.0 |
| Comp (MW) | 15.7 | 15.7 | 15.7 | 15.7 | 15.7 | 15.7 | 15.7 |
| H2S/CO2 | 4.4 | 4.4 | 4.4 | 4.4 | 4.4 | 4.4 | 4.4 |

The overall recovery of sulfur in Example 19 was 99.5%.

Example 20

Example 20 was simulated based on the configuration embodied in FIGS. 1 and 1a and described previously. The simulation was based on sulfur recovery unit 10 having three Claus catalytic stages. The reaction furnace temperature outlet is 2389.6° F. (1309.8° C.). The membrane in hydrogen sulfide membrane 30 was an acid gas-selective membrane with the permeability specified in Table 2 and with a total area of 82,831 m². Sweep air feed 132 containing air was used as the sweep air for hydrogen sulfide membrane 30. The resulting concentrations of components for selected streams are shown in Table 22.

TABLE 22

Heat and Mass Balance of Streams for Example 20.

| Stream | 100 | 132 | 126 | 120 | 112 |
|---|---|---|---|---|---|
| C1 | 0.0000 | 0.0000 | 0.0000 | 0.0000 | 0.0000 |
| C2 | 0.0000 | 0.0000 | 0.0000 | 0.0000 | 0.0000 |
| CO2 | 0.0914 | 0.0000 | 0.1029 | 0.1387 | 0.0000 |
| h2S | 0.9085 | 0.0000 | 0.0100 | 0.0134 | 0.0000 |
| N2 | 0.0000 | 0.7921 | 0.5798 | 0.7821 | 0.0000 |
| H2O | 0.0000 | 0.0099 | 0.2996 | 0.0552 | 0.0745 |
| O2 | 0.0000 | 0.1980 | 0.0000 | 0.0000 | 0.0000 |
| SO2 | 0.0000 | 0.0000 | 0.0000 | 0.0000 | 0.0000 |
| S2 | 0.0000 | 0.0000 | 0.0000 | 0.0000 | 0.0000 |
| S-Vap | 0.0000 | 0.0000 | 0.0000 | 0.0000 | 0.0000 |
| S-Liq | 0.0000 | 0.0000 | 0.0000 | 0.0000 | 0.9255 |
| Benzene | 0.0000 | 0.0000 | 0.0000 | 0.0000 | 0.0000 |

TABLE 22-continued

Heat and Mass Balance of Streams for Example 20.

| Stream | 100 | 132 | 126 | 120 | 112 |
|---|---|---|---|---|---|
| Toluene | 0.0000 | 0.0000 | 0.0000 | 0.0000 | 0.0000 |
| Xylene | 0.0000 | 0.0000 | 0.0000 | 0.0000 | 0.0000 |
| E-Benzene | 0.0000 | 0.0000 | 0.0000 | 0.0000 | 0.0000 |
| COS | 0.0000 | 0.0000 | 0.0000 | 0.0000 | 0.0000 |
| CS2 | 0.0000 | 0.0000 | 0.0000 | 0.0000 | 0.0000 |
| H2 | 0.0000 | 0.0000 | 0.0065 | 0.0088 | 0.0000 |
| CO | 0.0000 | 0.0000 | 0.0012 | 0.0017 | 0.0000 |
| %S/Sfd | 100.00 | 0.00 | 3.35 | 3.35 | 99.06 |
| Molar Flow (MMSCFD) | 65 | 145 | 199 | 148 | 63 |
| Mass Flow (lb/hr) | 250692 | 457954 | 581129 | 479114 | 216107 |
| Pressure (psig) | 16 | 1 | 16 | 16 | 16 |
| Temp (° F.) | 135.0 | 135.0 | 298.1 | 120.0 | 340.6 |
| Comp (MW) | 6.2 | 6.2 | 6.2 | 6.2 | 6.2 |
| H2S/CO2 | 1.0 | 1.0 | 1.0 | 1.0 | 1.0 |

The overall recovery of sulfur in Example 20 was 99.1%.

Example 21

Example 21 was simulated based on the configuration embodied in FIGS. 1 and 1a and described previously. The simulation was based on sulfur recovery unit 10 having three Claus catalytic stages. The reaction furnace temperature outlet is 2310.8° F. (1266° C.). The membrane in hydrogen sulfide membrane 30 was an acid gas-selective membrane with the permeability specified in Table 2 and with a total area of 82,831 m². Sweep air feed 132 containing air was used as the sweep air for hydrogen sulfide membrane 30. The resulting concentrations of components for selected streams are shown in Table 23.

TABLE 23

Heat and Mass Balance of Streams for Example 21.

| Stream | 100 | 132 | 126 | 120 | 112 |
|---|---|---|---|---|---|
| C1 | 0.0000 | 0.0000 | 0.0000 | 0.0000 | 0.0000 |
| C2 | 0.0000 | 0.0000 | 0.0000 | 0.0000 | 0.0000 |
| CO2 | 0.0914 | 0.0000 | 0.1663 | 0.2199 | 0.0000 |
| H2S | 0.9085 | 0.0000 | 0.0091 | 0.0121 | 0.0000 |
| N2 | 0.0000 | 0.7921 | 0.5316 | 0.7032 | 0.0000 |
| H2O | 0.0000 | 0.0099 | 0.2857 | 0.0552 | 0.0716 |
| O2 | 0.0000 | 0.1980 | 0.0000 | 0.0000 | 0.0000 |
| SO2 | 0.0000 | 0.0000 | 0.0000 | 0.0000 | 0.0000 |
| S2 | 0.0000 | 0.0000 | 0.0000 | 0.0000 | 0.0000 |
| S-Vap | 0.0000 | 0.0000 | 0.0000 | 0.0000 | 0.0000 |
| S-Liq | 0.0000 | 0.0000 | 0.0000 | 0.0000 | 0.9283 |
| Benzene | 0.0000 | 0.0000 | 0.0000 | 0.0000 | 0.0000 |
| Toluene | 0.0000 | 0.0000 | 0.0000 | 0.0000 | 0.0000 |
| Xylene | 0.0000 | 0.0000 | 0.0000 | 0.0000 | 0.0000 |
| E-Benzene | 0.0000 | 0.0000 | 0.0000 | 0.0000 | 0.0000 |
| COS | 0.0000 | 0.0000 | 0.0000 | 0.0000 | 0.0000 |
| CS2 | 0.0000 | 0.0000 | 0.0000 | 0.0000 | 0.0000 |
| H2 | 0.0000 | 0.0000 | 0.0053 | 0.0070 | 0.0000 |
| CO | 0.0000 | 0.0000 | 0.0020 | 0.0027 | 0.0000 |
| %S/Sfd | 100.00 | 0.00 | 3.36 | 3.36 | 99.49 |
| Molar Flow (MMSCFD) | 65 | 146 | 218 | 165 | 64 |
| Mass Flow (lb/hr) | 250692 | 458899 | 664285 | 558973 | 216651 |
| Pressure (psig) | 16 | −7 | 16 | 16 | 16 |
| Temp (° F.) | 135.0 | 135.0 | 294.1 | 120.0 | 340.5 |
| Comp (MW) | 15.3 | 15.3 | 15.3 | 15.3 | 15.3 |
| H2S/CO2 | 1.0 | 1.0 | 1.0 | 1.0 | 1.0 |

The overall recovery of sulfur in Example 21 was 99.5%.

Example 22

Example 22 was simulated based on the configuration embodied in FIG. 15 with reference to FIG. 1 described previously and is a comparative example. The simulation was based on sulfur recovery unit 10 having three Claus catalytic stages. The reaction furnace temperature outlet is 2603.48° F. (1428.6° C.). Example 22 is in the absence of a reducing unit and membranes. The resulting concentrations of components for selected streams are shown in Table 24.

TABLE 24

Heat and Mass Balance of Streams for Example 22.

| Stream | 100 | 300 | 400 | 402 | 110 | 112 |
|---|---|---|---|---|---|---|
| C1 | 0.0027 | 0.0000 | 0.0000 | 0.0097 | 0.0000 | 0.0000 |
| C2 | 0.0014 | 0.0000 | 0.0000 | 0.0049 | 0.0000 | 0.0000 |
| CO2 | 0.2968 | 0.0000 | 0.1030 | 0.7951 | 0.0394 | 0.0000 |
| H2S | 0.6232 | 0.0000 | 0.8655 | 0.00011 | 0.0059 | 0.0000 |
| N2 | 0.0000 | 0.7921 | 0.0000 | 0.0000 | 0.6313 | 0.0000 |
| H2O | 0.0754 | 0.0099 | 0.0314 | 0.1885 | 0.3105 | 0.0723 |
| O2 | 0.0000 | 0.1980 | 0.0000 | 0.0000 | 0.0000 | 0.0000 |
| SO2 | 0.0000 | 0.0000 | 0.0000 | 0.0000 | 0.0000 | 0.0000 |
| S2 | 0.0000 | 0.0000 | 0.0000 | 0.0000 | 0.0000 | 0.0000 |
| S-Vap | 0.0000 | 0.0000 | 0.0000 | 0.0000 | 0.0000 | 0.0000 |
| S-Liq | 0.0000 | 0.0000 | 0.0000 | 0.0000 | 0.0000 | 0.9276 |
| Benzene | 0.0000 | 0.0000 | 0.0000 | 0.0001 | 0.0000 | 0.0000 |
| Toluene | 0.0000 | 0.0000 | 0.0000 | 0.0000 | 0.0000 | 0.0000 |
| Xylene | 0.0000 | 0.0000 | 0.0000 | 0.0000 | 0.0000 | 0.0000 |
| E-Benzene | 0.0000 | 0.0000 | 0.0000 | 0.0000 | 0.0000 | 0.0000 |
| COS | 0.0000 | 0.0000 | 0.0000 | 0.0000 | 0.0000 | 0.0000 |
| CS2 | 0.0000 | 0.0000 | 0.0000 | 0.0000 | 0.0000 | 0.0000 |
| H2 | 0.0000 | 0.0000 | 0.0000 | 0.0000 | 0.0125 | 0.0000 |
| CO | 0.0000 | 0.0000 | 0.0000 | 0.0000 | 0.0005 | 0.0000 |
| % S/Sfd | 100.00 | 0.00 | 99.99 | 0.00 | 1.76 | 98.23 |
| Molar Flow (MMSCFD) | 65.3 | 96.9 | 47.0 | 18.3 | 121.6 | 43.1 |
| Mass Flow (lb/hr) | 256245 | 305471 | 178473 | 77772 | 337150 | 146813 |
| Pressure (psig) | 16 | 16 | 1 | 16 | 16 | 16 |

TABLE 24-continued

Heat and Mass Balance of Streams for Example 22.

| Stream | 100 | 300 | 400 | 402 | 110 | 112 |
|---|---|---|---|---|---|---|
| Temp (° F.) | 135.0 | 135.0 | 159.6 | 159.6 | 283.5 | 342.4 |
| Comp (MW) | 3.6 | 3.6 | 3.6 | 3.6 | 3.6 | 3.6 |

The overall recovery of sulfur in Example 22 was 98.2%.

Example 23

Example 23 was simulated based on the configuration embodied in FIG. 12 and described previously. The simulation was based on sulfur recovery unit 10 having three Claus catalytic stages. The reaction furnace temperature outlet is 2435.6° F. (1335.3° C.). The membrane in acid gas membrane unit 60 was an acid gas-selective membrane with the permeability specified in Table 2 and with a total area of 2,176,000 m². Steam feed 1100 containing low pressure deaerated steam was used as the sweep stream for acid gas membrane unit 60. The membrane in hydrogen sulfide membrane 30 was a hydrogen sulfide-selective membrane with the permeability specified in Table 2 and with a total area of 2,176,000 m². Sweep air feed 132 containing air was used as the sweep air for hydrogen sulfide membrane 30. The resulting concentrations of components for selected streams are shown in Table 25.

TABLE 25

Heat and Mass Balance of Streams for Example 23.

| Stream | 100 | 400 | 402 | 112 |
|---|---|---|---|---|
| C1 | 0.0027 | 0.0000 | 0.0080 | 0.0000 |
| C2 | 0.0014 | 0.0000 | 0.0040 | 0.0000 |
| CO2 | 0.2968 | 0.1231 | 0.8126 | 0.0000 |
| H2S | 0.6232 | 0.8446 | 0.0001 | 0.0000 |
| N2 | 0.0000 | 0.0000 | 0.0075 | 0.0000 |
| H2O | 0.0754 | 0.0322 | 0.1654 | 0.0784 |
| O2 | 0.0000 | 0.0000 | 0.0000 | 0.0000 |
| SO2 | 0.0000 | 0.0000 | 0.0000 | 0.0000 |
| S2 | 0.0000 | 0.0000 | 0.0000 | 0.0000 |
| S-Vap | 0.0000 | 0.0000 | 0.0000 | 0.0000 |
| S-Liq | 0.0000 | 0.0000 | 0.0000 | 0.9215 |
| Benzene | 0.0000 | 0.0000 | 0.0001 | 0.0000 |
| Toluene | 0.0000 | 0.0000 | 0.0000 | 0.0000 |
| Xylene | 0.0000 | 0.0000 | 0.0000 | 0.0000 |
| E-Benzene | 0.0000 | 0.0000 | 0.0000 | 0.0000 |
| COS | 0.0000 | 0.0000 | 0.0000 | 0.0000 |
| CS2 | 0.0000 | 0.0000 | 0.0000 | 0.0000 |
| H2 | 0.0000 | 0.0000 | 0.0009 | 0.0000 |
| CO | 0.0000 | 0.0000 | 0.0000 | 0.0000 |
| %S/Sfd | 100.00 | 100.96 | 0.01 | 99.70 |
| Molar Flow (MMSCFD) | 65.3 | 48.6 | 22.1 | 44.0 |
| Mass Flow (lb/hr) | 256245 | 185652 | 95268 | 149573 |
| Pressure (psig) | 16 | 16 | 16 | 16 |
| Temp (° F.) | 135.0 | 155.1 | 155.1 | 342.6 |
| Comp (MW) | 3.9 | 3.9 | 3.9 | 3.9 |

The overall recovery of sulfur in Example 23 was 99.7%.

Example 24

Example 24 was simulated based on the configuration embodied in FIGS. 1 and 1a and described previously. The simulation was based on sulfur recovery unit 10 having three Claus catalytic stages. The reaction furnace temperature outlet is 2313.3° F. (1267.4° C.). The membrane in hydrogen sulfide membrane 30 was an acid gas-selective membrane with the permeability specified in Table 2 and with a total area of 2,176,000 m². Sweep air feed 132 containing air was used as the sweep air for hydrogen sulfide membrane 30. The resulting concentrations of components for selected streams are shown in Table 26.

TABLE 26

Heat and Mass Balance of Streams for Example 24.

| Stream | 100 | 400 | 402 | 112 |
|---|---|---|---|---|
| C1 | 0.0027 | 0.0000 | 0.0097 | 0.0000 |
| C2 | 0.0014 | 0.0000 | 0.0049 | 0.0000 |
| CO2 | 0.2968 | 0.1030 | 0.7951 | 0.0000 |
| H2S | 0.6232 | 0.8655 | 0.0001 | 0.0000 |
| N2 | 0.0000 | 0.0000 | 0.0000 | 0.0000 |
| H2O | 0.0754 | 0.0314 | 0.1885 | 0.0700 |
| O2 | 0.0000 | 0.0000 | 0.0000 | 0.0000 |
| SO2 | 0.0000 | 0.0000 | 0.0000 | 0.0000 |
| S2 | 0.0000 | 0.0000 | 0.0000 | 0.0000 |
| S-Vap | 0.0000 | 0.0000 | 0.0000 | 0.0000 |
| S-Liq | 0.0000 | 0.0000 | 0.0000 | 0.9300 |
| Benzene | 0.0000 | 0.0000 | 0.0001 | 0.0000 |
| Toluene | 0.0000 | 0.0000 | 0.0000 | 0.0000 |
| Xylene | 0.0000 | 0.0000 | 0.0000 | 0.0000 |
| E-Benzene | 0.0000 | 0.0000 | 0.0000 | 0.0000 |
| COS | 0.0000 | 0.0000 | 0.0000 | 0.0000 |
| CS2 | 0.0000 | 0.0000 | 0.0000 | 0.0000 |
| H2 | 0.0000 | 0.0000 | 0.0000 | 0.0000 |
| CO | 0.0000 | 0.0000 | 0.0000 | 0.0000 |
| %S/Sfd | 100.00 | 99.99 | 0.00 | 99.39 |
| Molar Flow (MMSCFD) | 65.3 | 47.0 | 18.3 | 43.5 |
| Mass Flow (lb/hr) | 256245 | 178473 | 77772 | 148322 |
| Pressure (psig) | 16 | 16 | 16 | 16 |
| Temp (° F.) | 135.0 | 159.6 | 159.6 | 342.7 |
| Comp (MW) | 4.0 | 4.0 | 4.0 | 4.0 |

The overall recovery of sulfur in Example 24 was 99.4%.

Example 25

Example 25 was simulated based on the configuration embodied in FIG. 11 and described previously. The simulation was based on sulfur recovery unit 10 having three Claus catalytic stages. The reaction furnace temperature outlet is 2564.6° F. (1407° C.). The membrane in acid gas membrane unit 60 was an acid gas-selective membrane with the permeability specified in Table 2 and with a total area of 2,176,000 m². Steam feed 1100 containing low pressure deaerated steam was used as the sweep for acid gas membrane unit 60. The resulting concentrations of components for selected streams are shown in Table 27.

TABLE 27

Heat and Mass Balance of Streams for Example 25.

| Stream | 100 | 400 | 402 | 112 |
|---|---|---|---|---|
| C1 | 0.0027 | 0.0000 | 0.0084 | 0.0000 |
| C2 | 0.0014 | 0.0000 | 0.0042 | 0.0000 |
| CO2 | 0.2968 | 0.1171 | 0.8058 | 0.0000 |
| h2S | 0.6232 | 0.8508 | 0.0001 | 0.0000 |

TABLE 27-continued

Heat and Mass Balance of Streams for Example 25.

| Stream | 100 | 400 | 402 | 112 |
|---|---|---|---|---|
| N2 | 0.0000 | 0.0000 | 0.0079 | 0.0000 |
| H2O | 0.0754 | 0.0320 | 0.1711 | 0.0719 |
| O2 | 0.0000 | 0.0000 | 0.0000 | 0.0000 |
| SO2 | 0.0000 | 0.0000 | 0.0000 | 0.0000 |
| S2 | 0.0000 | 0.0000 | 0.0000 | 0.0000 |
| S-Vap | 0.0000 | 0.0000 | 0.0000 | 0.0000 |
| S-Liq | 0.0000 | 0.0000 | 0.0000 | 0.9280 |
| Benzene | 0.0000 | 0.0000 | 0.0001 | 0.0000 |
| Toluene | 0.0000 | 0.0000 | 0.0000 | 0.0000 |
| Xylene | 0.0000 | 0.0000 | 0.0000 | 0.0000 |
| E-Benzene | 0.0000 | 0.0000 | 0.0000 | 0.0000 |
| COS | 0.0000 | 0.0000 | 0.0000 | 0.0000 |
| CS2 | 0.0000 | 0.0000 | 0.0000 | 0.0000 |
| H2 | 0.0000 | 0.0000 | 0.0009 | 0.0000 |
| CO | 0.0000 | 0.0000 | 0.0000 | 0.0000 |
| %S/Sfd | 100.00 | 101.00 | 0.01 | 99.25 |
| Molar Flow (MMSCFD) | 65.3 | 48.3 | 21.0 | 43.5 |
| Mass Flow (lb/hr) | 256245 | 184063 | 90385 | 148292 |
| Pressure (psig) | 16 | 16 | 16 | 16 |
| Temp (° F.) | 135.0 | 156.2 | 156.2 | 342.5 |
| Comp (MW) | 3.6 | 3.6 | 3.6 | 3.6 |

The overall recovery of sulfur in Example 22 was 99.3%.

TABLE 28

Results of Examples

| Ex | Hydrogen Sulfide Enrichment unit 40 | Membrane unit 30 | Membrane Type in Membrane unit 30 | Carbon Dioxide Membrane unit 50 | Membrane Type in Membrane unit 50 | Acid Gas Membrane unit 60 | Membrane Type in Membrane unit 60 | Sulfur recovery (%) | FIG. |
|---|---|---|---|---|---|---|---|---|---|
| 1 | No | No | N/A | No | N/A | No | N/A | 94.1 | 14 |
| 2 | No | Yes | H2S-selective | No | N/A | No | N/A | 97.3 | 2 |
| 3 | No | Yes | H2S-selective | No | N/A | No | N/A | 97.8 | 3 |
| 4 | No | Yes | H2S-selective | No | N/A | No | N/A | 98.0 | 2 |
| 5 | Yes | No | N/A | No | N/A | No | N/A | 98.1 | 15 |
| 6 | Yes | Yes | H2S-selective | No | N/A | No | N/A | 98.6 | 6 |
| 7 | Yes | Yes | H2S-selective | No | N/A | No | N/A | 98.7 | 5 |
| 8 | Yes | Yes | H2S-selective | No | N/A | No | N/A | 98.8 | 5 |
| 9 | Yes | Yes | H2S-selective | Yes | CO2-selective | No | N/A | 99.1 | 9 |
| 10 | Yes | Yes | H2S-selective | Yes | CO2-selective | No | N/A | 99.1 | 10 |
| 11 | Yes | Yes | H2S-selective | No | N/A | No | N/A | 99.1 | 7 |
| 12 | Yes | Yes | H2S-selective | No | N/A | No | N/A | 98.7 | 8 |
| 13 | No | No | N/A | No | N/A | No | N/A | 96.5 | 13 |
| 14 | No | Yes | H2S-selective | No | N/A | No | N/A | 98.0 | 1 |
| 15 | No | Yes | H2S-selective | No | N/A | No | N/A | 99.3 | 1 |
| 16 | No | Yes | H2S-selective | No | N/A | No | N/A | 98.7 | 1 |
| 17 | No | No | N/A | No | N/A | No | N/A | 96.6 | 13 |
| 18 | No | Yes | H2S-selective | No | N/A | No | N/A | 98.3 | 1 |
| 19 | No | Yes | H2S-selective | No | N/A | No | N/A | 99.5 | 1 |
| 20 | No | Yes | Acid Gas-selective | No | N/A | No | N/A | 99.1 | 1 |
| 21 | No | Yes | Acid Gas-selective | No | N/A | No | N/A | 99.5 | 1 |
| 22 | Yes | No | N/A | No | N/A | No | N/A | 98.2 | 15 |
| 23 | Yes | Yes | H2S-selective | No | N/A | Yes | Acid Gas-selective | 99.7 | 12 |
| 24 | Yes | Yes | Acid Gas-selective | No | N/A | No | N/A | 99.4 | 4 |
| 25 | Yes | No | N/A | No | N/A | Yes | Acid Gas-selective | 99.3 | 11 |

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

What is claimed is:

1. A method for removing sulfur-containing compounds from a sulfur recovery unit (SRU) tail gas stream, the method comprising the steps of:
    introducing the SRU tail gas stream to a reducing unit to produce a membrane feed, the reducing unit configured to reduce the sulfur-containing compounds to hydrogen sulfide;
    introducing the membrane feed to a hydrogen sulfide membrane unit, the hydrogen sulfide membrane unit comprising a membrane, wherein the membrane feed comprises hydrogen sulfide;
    allowing the membrane feed to contact a feed side of the membrane such that hydrogen sulfide permeates through the membrane to a permeate side; and
    collecting the retentate gases that fail to permeate through the membrane to produce a stack feed, wherein the stack feed comprises retentate gases.

2. The method of claim 1, wherein the membrane is selected from the group consisting of a hydrogen sulfide-selective membrane and an acid gas-selective membrane.

3. The method of claim 1 wherein the step of introducing the SRU tail gas stream to a reducing unit to produce a membrane feed, further comprises the steps of:
    introducing the SRU tail gas stream to a reduction reactor of the reducing unit;
    introducing a reducing agent to the reduction reactor;
    allowing the sulfur-containing compounds to react with the reducing agent in reduction reactions to produce a reduced stream, wherein the reduction reactions reduce the sulfur-containing compounds to hydrogen sulfide, wherein the reduced stream comprises non-condensing gases and water vapor;
    introducing the reduced stream to a reduction separator; and
    separating the non-condensing gases from the water vapor in the reduction separator to produce the membrane feed and a waste water stream, wherein the membrane feed comprises the non-condensed gases, wherein the non-condensed gases comprise hydrogen sulfide, and wherein the waste water stream comprises condensed water.

4. The method of claim 1 further comprising the step of:
    supplying a sweep air feed to the permeate side of the membrane;
    collecting the hydrogen sulfide that permeates the membrane in the sweep air feed to produce a hydrogen sulfide enriched air; and
    introducing the hydrogen sulfide enriched air to a sulfur recovery unit, the sulfur recovery unit configured to produce the SRU tail stream.

5. The method of claim 4 further comprising the steps of:
    introducing an acid gas feed to an enrichment unit, wherein the acid gas feed comprises hydrogen sulfide and carbon dioxide;
    allowing the hydrogen sulfide to separate from the carbon dioxide to produce an enriched feed and a carbon dioxide rich stream, wherein the enriched feed comprises hydrogen sulfide, wherein the carbon dioxide rich stream comprises carbon dioxide; and
    introducing the enriched feed to the sulfur recovery unit.

6. The method of claim 5 further comprising the steps of:
    introducing an acid gas feed to an enrichment unit, wherein the acid gas feed comprises hydrogen sulfide and carbon dioxide;
    introducing a membrane recycle to the enrichment unit, wherein the membrane recycle comprises hydrogen sulfide and carbon dioxide;
    allowing the hydrogen sulfide to separate from the carbon dioxide in the enrichment unit to produce an enriched feed and a carbon dioxide rich stream, wherein the enriched feed comprises hydrogen sulfide, wherein the carbon dioxide rich stream comprises carbon dioxide;
    supplying the carbon dioxide rich stream to the permeate side of the membrane of hydrogen sulfide membrane unit;
    collecting the hydrogen sulfide that permeates through the membrane to the permeate side in the carbon dioxide rich stream to produce the membrane recycle; and
    introducing the enriched feed to a sulfur recovery unit, the sulfur recovery unit configured to produce the SRU tail gas stream.

7. The method of claim 1 further comprising the steps of:
    forming a hydrogen sulfide recycle stream from the hydrogen sulfide that permeates the membrane of the hydrogen sulfide membrane unit, wherein the hydrogen sulfide recycle stream comprises hydrogen sulfide.

8. The method of claim 7 further comprising the steps of:
    mixing the hydrogen sulfide recycle stream with an air feed to form a diluted recycle stream, where the diluted recycle stream comprises hydrogen sulfide and air; and
    introducing the diluted recycle stream to a sulfur recovery unit, the sulfur recovery unit configured to produce the SRU tail gas stream.

9. The method of claim 7 further comprising the steps of:
    introducing the hydrogen sulfide recycle stream to an enrichment unit;
    introducing an acid gas feed to the enrichment unit, wherein the acid gas feed comprises hydrogen sulfide and carbon dioxide;

allowing the hydrogen sulfide to separate from the carbon dioxide in the enrichment unit to produce an enriched feed and a carbon dioxide rich stream, wherein the enriched feed comprises hydrogen sulfide, wherein the carbon dioxide rich stream comprises carbon dioxide; and introducing the enriched feed to a sulfur recovery unit, the sulfur recovery unit configured to produce the SRU tail gas stream.

10. The method of claim 7 further comprising the steps of:
mixing the hydrogen sulfide recycle stream with an acid gas feed to produce a mixed feed, wherein the mixed feed comprises hydrogen sulfide and carbon dioxide; and
introducing the mixed feed to an enrichment unit; and
allowing the hydrogen sulfide to separate from the carbon dioxide in the enrichment unit to produce an enriched feed and a carbon dioxide rich stream, wherein the enriched feed comprises hydrogen sulfide, wherein the carbon dioxide rich stream comprises carbon dioxide.

11. The method of claim 7 further comprising the steps of:
introducing an acid gas feed to an enrichment unit, where the acid gas feed comprises hydrogen sulfide and carbon dioxide;
allowing the hydrogen sulfide to separate from the carbon dioxide in the enrichment unit to produce an enriched feed and carbon dioxide rich stream, where the enriched feed comprises hydrogen sulfide, where the carbon dioxide rich stream comprises carbon dioxide;
mixing the hydrogen sulfide recycle stream with the enriched feed to produce a mixed enriched feed; and
introducing the mixed enriched feed to a sulfur recovery unit, the sulfur recovery unit configured to produce the SRU tail gas stream.

12. The method of claim 7, further comprising the steps of:
introducing an acid gas feed to a carbon dioxide membrane unit, the carbon dioxide membrane unit comprising a carbon dioxide-selective membrane, where the acid gas feed comprises carbon dioxide and hydrogen sulfide;
allowing the acid gas feed to contact a feed side of the carbon dioxide-selective membrane such that carbon dioxide permeates through the carbon dioxide-selective membrane to a permeate side;
collecting the carbon dioxide that permeates the carbon dioxide-selective membrane to form a carbon dioxide permeate, where the carbon dioxide permeate comprises carbon dioxide and hydrogen sulfide;
collecting feed gases that fail to permeate the carbon dioxide-selective membrane to form a hydrogen sulfide retentate, where the hydrogen sulfide retentate comprises hydrogen sulfide;
introducing the carbon dioxide permeate to an enrichment unit;
allowing the hydrogen sulfide to separate from the carbon dioxide in the enrichment unit to produce an enriched feed and carbon dioxide rich stream, where the enriched feed comprises hydrogen sulfide, where the carbon dioxide rich stream comprises carbon dioxide;
mixing the hydrogen sulfide recycle stream, the enriched feed and the hydrogen sulfide retentate to produce a hydrogen sulfide rich feed; and
introducing the hydrogen sulfide rich feed to a sulfur recovery unit, the sulfur recovery unit configured to produce the SRU tail gas stream.

13. The method of claim 7 further comprising the steps of:
mixing the hydrogen sulfide recycle stream and an acid gas feed to produce a mixed feed, wherein the mixed feed comprises hydrogen sulfide and carbon dioxide;
introducing the mixed feed to a carbon dioxide membrane unit, the carbon dioxide membrane unit comprising a carbon dioxide-selective membrane;
allowing the acid gas feed to contact a feed side of the carbon dioxide-selective membrane such that carbon dioxide permeates through the carbon dioxide-selective membrane to a permeate side,
collecting the carbon dioxide that permeates the carbon dioxide-selective membrane to form a carbon dioxide permeate;
collecting feed gases that fail to permeate the carbon dioxide-selective membrane to form a hydrogen sulfide retentate, where the hydrogen sulfide retentate comprises hydrogen sulfide;
introducing the carbon dioxide permeate to an enrichment unit to produce an enriched feed and a carbon dioxide rich stream, wherein the enriched feed comprises hydrogen sulfide, wherein the carbon dioxide rich stream comprises carbon dioxide;
mixing the enriched feed and the hydrogen sulfide retentate to produce a combined feed; and
introducing the combined feed to a sulfur recovery unit, the sulfur recovery unit configured to produce the SRU tail gas stream.

14. A method for removing sulfur-containing compounds from a sulfur recovery unit (SRU) tail gas stream, the method comprising the steps of:
introducing the SRU tail gas stream to a reducing unit to produce a membrane feed, the reducing unit configured to reduce the sulfur-containing compounds to hydrogen sulfide;
introducing the membrane feed to an acid gas membrane unit to produce an acid gas retentate, the acid gas membrane unit comprising an acid gas-selective membrane;
allowing the membrane feed to contact the acid gas-selective membrane such that acid gases permeate the acid gas-selective membrane to a permeate side;
supplying a steam feed to the permeate side of the acid gas-selective membrane, wherein the steam feed comprises a low pressure de-aerated steam;
collecting the acid gases that permeate the acid gas-selective membrane in the steam feed to produce an acid gas permeate, wherein the acid gas permeate comprises acid gases and water vapor;
collecting the retentate gases that fail to permeate the membrane in an acid gas retentate, wherein the acid gas retentate comprises the retentate gases;
introducing the acid gas permeate to a water condenser, the water condenser configured to separate water vapor from the acid gases;
allowing the water vapor to condense in the water condenser to produce a sour water stream and an acid gas rich stream, wherein the sour water stream comprises condensed water and the acid gas rich stream comprises acid gases, wherein the acid gases comprise carbon dioxide and hydrogen sulfide;
introducing the acid gas rich stream to an enrichment unit;
allowing the hydrogen sulfide to separate from the carbon dioxide in the enrichment unit to produce an enriched feed and a carbon dioxide rich stream, where the enriched feed comprises hydrogen sulfide, where the carbon dioxide rich stream comprises carbon dioxide;

introducing the enriched feed to a sulfur recovery unit, the sulfur recovery unit configured to produce the SRU tail gas stream.

15. The method of claim 14 further comprising the steps of:
   introducing the acid gas retentate to a feed side of a hydrogen sulfide membrane unit, the hydrogen sulfide membrane unit comprising a membrane;
   allowing the acid gas retentate to contact the membrane such that hydrogen sulfide permeates the membrane to a permeate side;
   supplying a sweep air feed to the permeate side of the membrane;
   collecting the hydrogen sulfide that permeates membrane in the sweep air feed to produce a sulfur recovery unit feed; and
   introducing the sulfur recovery unit feed to the sulfur recovery unit.

16. An apparatus to remove sulfur-containing compounds from a sulfur recovery unit tail gas stream, the apparatus comprising:
   a reducing unit, the reducing unit configured to reduce the sulfur-containing compounds to hydrogen sulfide to produce a membrane feed; and
   a hydrogen sulfide membrane unit fluidly connected to the reducing unit, the hydrogen sulfide membrane unit comprising a membrane, wherein the membrane feed contacts a feed side of the membrane such that hydrogen sulfide present in the membrane feed permeates through the membrane to a permeate side, wherein the retentate gases that fail to permeate the membrane exit the hydrogen sulfide membrane unit as a stack feed.

17. The apparatus of claim 16, wherein the reducing unit comprises:
   a reduction reactor, the reduction reactor configured to react sulfur-containing compounds present in the SRU tail gas stream and a reducing agent to produce a reduced stream, where the reduced stream comprises hydrogen sulfide and water vapor;
   a reduction separator, the reduction separator configured to condense the water vapor in the reduced stream to produce a waste water stream and the membrane feed.

18. The apparatus of claim 16 further comprising:
   an enrichment unit fluidly connected to a sulfur recovery unit, the enrichment unit configured to produce an enriched feed; and
   the sulfur recovery unit, the sulfur recovery unit fluidly connected to the reducing unit, the sulfur recovery unit configured to produce the SRU tail gas stream.

19. The apparatus of claim 18 further comprising:
   a carbon dioxide membrane unit in fluid communication with the enrichment unit, the carbon dioxide membrane unit comprising a carbon dioxide-selective membrane, the carbon dioxide membrane unit configured to produce a carbon dioxide permeate and a hydrogen sulfide retentate.

20. An apparatus to remove sulfur-containing compounds from a sulfur recovery unit tail gas stream, the apparatus comprising:
   a reducing unit, the reducing unit configured to reduce the sulfur-containing compounds to hydrogen sulfide to produce a membrane feed; and
   an acid gas membrane unit fluidly connected to the reducing unit, the acid gas membrane unit comprising an acid gas-selective membrane, wherein the membrane feed contacts a feed side of the acid gas-selective membrane such that acid gases permeate through the acid gas-selective membrane to a permeate side, wherein the retentate gases that fail to permeate the acid gas-selective membrane exit the acid gas membrane unit as an acid gas retentate.

21. The apparatus of claim 20 further comprising:
   an enrichment unit fluidly connected to a sulfur recovery unit, the enrichment unit configured to produce an enriched feed; and
   the sulfur recovery unit, the sulfur recovery unit fluidly connected to the reducing unit, the sulfur recovery unit configured to produce the SRU tail gas stream.

22. The apparatus of claim 21 further comprising:
   a carbon dioxide membrane unit in fluid communication with the enrichment unit, the carbon dioxide membrane unit comprising a carbon dioxide-selective membrane, the carbon dioxide membrane unit configured to produce a carbon dioxide permeate and a hydrogen sulfide retentate.

23. The apparatus of claim 20 further comprising a hydrogen sulfide membrane unit fluidly connected to the acid gas membrane unit, the hydrogen sulfide membrane unit comprising a membrane, wherein the acid gas retentate contacts a feed side of the membrane such that hydrogen sulfide permeates through the membrane to a permeate side, wherein the retentate gases that fail to permeate the membrane exit the hydrogen sulfide membrane as a stack feed.

* * * * *